(12) United States Patent
Tkaczyk et al.

(10) Patent No.: US 8,654,328 B2
(45) Date of Patent: Feb. 18, 2014

(54) IMAGE MAPPING SPECTROMETERS

(75) Inventors: Tomasz S. Tkaczyk, Houston, TX (US);
Robert T. Kester, Pearland, TX (US);
Liang Gao, Houston, TX (US)

(73) Assignee: William Marsh Rice University, Houston, TX (US)

( * ) Notice: Subject to any disclaimer, the term of this patent is extended or adjusted under 35 U.S.C. 154(b) by 3 days.

(21) Appl. No.: 13/127,401

(22) PCT Filed: Nov. 4, 2009

(86) PCT No.: PCT/US2009/063259
§ 371 (c)(1),
(2), (4) Date: Jul. 25, 2011

(87) PCT Pub. No.: WO2010/053979
PCT Pub. Date: May 14, 2010

(65) Prior Publication Data
US 2011/0285995 A1    Nov. 24, 2011

Related U.S. Application Data

(60) Provisional application No. 61/111,182, filed on Nov. 4, 2008.

(51) Int. Cl.
*G01J 3/28* (2006.01)
(52) U.S. Cl.
USPC .......................................... 356/326; 356/328
(58) Field of Classification Search
USPC ...................... 356/326, 328; 359/850, 851
See application file for complete search history.

(56) References Cited

U.S. PATENT DOCUMENTS

| 4,678,332 | A | 7/1987 | Rock et al. |
| 6,614,533 | B1 | 9/2003 | Hata |
| 2003/0025917 | A1 | 2/2003 | Suhami |
| 2003/0187330 | A1 | 10/2003 | Abe |
| 2003/0232445 | A1 * | 12/2003 | Fulghum, Jr. ................... 436/63 |
| 2005/0270528 | A1 | 12/2005 | Geshwind et al. |
| 2006/0033026 | A1 | 2/2006 | Treado et al. |
| 2006/0072109 | A1 * | 4/2006 | Bodkin et al. ................ 356/328 |
| 2008/0043314 | A1 | 2/2008 | Hagler |
| 2008/0266686 | A1 * | 10/2008 | Dengel ......................... 359/851 |

FOREIGN PATENT DOCUMENTS

| JP | 04-031720 A | 2/1992 |
| JP | 08-193884 A | 7/1996 |
| JP | 2000-329617 A | 11/2000 |
| JP | 2003-284687 A | 10/2003 |

(Continued)

OTHER PUBLICATIONS

Henault et al., "Slicing the Universe at affordable cost: The Quest for the MUSE Immage Slicer," Proceedings of SPIE, vol. 5249, 2004, 134-145, 12 pages.

(Continued)

*Primary Examiner* — Kara E Geisel
*Assistant Examiner* — Shawn Decenzo
(74) *Attorney, Agent, or Firm* — Osha Liang LLP

(57) ABSTRACT

Devices and methods for hyperspectral and multispectral imaging are discussed. In particular, Image Mapping Spectrometer systems, methods of use, and methods of manufacture are presented. Generally, an image mapping spectrometer comprises an image mapping field unit, a spectral separation unit, and a selective imager. Image mapping spectrometers may be used in spectral imaging of optical samples. In some embodiments, the image mapping field unit of an image mapping spectrometer may be manufactured with surface shaped diamond tools.

20 Claims, 45 Drawing Sheets

(56) References Cited

FOREIGN PATENT DOCUMENTS

| JP | 2005062104 A | 3/2005 |
|---|---|---|
| JP | 2006-504140 A | 2/2006 |
| JP | 2007-199572 A | 8/2007 |
| RU | 70575 U1 | 1/2008 |
| WO | 2004038461 A2 | 5/2004 |

OTHER PUBLICATIONS

Soufli et al., "Smoothing of diamond-turned substrates for extreme ultraviolet illuminators," Society of Photo-Optical Instrumentation Engineers, vol. 43, No. 12, Dec. 2004, 3089-3095, 7 pages.
Johnson et al., "Snapshot hyperspectral imaging in ophthalmology," Journal of Biomedical Optics, vol. 12, No. 1, Jan./Feb. 2007, 7 pages.
Gao et al., "Snapshot Image Mapping Spectrometer (IMS) with high sampling desity for hyperspectral microscopy," Optics Express, vol. 18, No. 14, Jul. 5, 2010, 14330-14344, 15 pages.
Zimmerman et al., "Minireview: Spectral imaging and its applications in live cell microscopy," FEBS letters, vol. 546, 2003, 87-92, 6 pages.
Tecza et al. "SWIFT Image Slicer: large format, compact, low scatter image slicing," Proceedings of SPIE, vol. 6273, 2006, 10 pages.
Richmond et al., "Critical PO2 of skeletal muscle in vivo," Am J. Physiol., vol. 277(5 Pt 2), 1999, H1831-H1840, 10 pages.
Cambridge Research & Instrumentation, Inc., "VARISPEC: Liquid Crystal Tunable Filters," Product Informational Brochure, Date Unknown, 2 pages.
Wagadarikar et al., "Video rate spectral imaging using a coded aperture snapshot spectral imager," Optics Express, Vo. 17, No. 8, Apr. 13, 2009, 6368-6388, 21 pages.
Zuzak et al., "Visible Reflectance Hyperspectral Imaging: Characterization of a Noninvasive, in Vivo System for Determining Tissue Perfusion," Analytical Chemistry, vol. 74, No. 9, May 1, 2002, 2021-2028, 8 pages.
Kruse, "Visible-Infrared Sensors and Case Studies," in Remote Sensing for the Earch Science: Manual of Remote Sensing (3 rd ed.), Renz and N. Andrew, eds. (John Wiley & Sons, NY, 1999), 69 pages.
Belmont, "Visualizing chromosome dynamics with GFP," Trends in Cell Biology, vol. 11, No. 6, Jun. 2001, 250-257, 8 pages.
Ye et al., "Whole spectrum fluorescence detection with ultrafast white light excitation," Optics Express, vol. 15, No. 16, Aug. 6, 2007, 10439-10445, 7 pages.
Hsu et al., "Wide-range tunable Fabry-Perot array filter for wavelength-division multiplexing applications," Applied Optics, vol. 44, No. 9, Mar. 20, 2005, 1529-1532, 4 pages.
Ritchie et al., "Detection of Non-Brownian Diffusion in the Cell Membrane in Single Molecule Traccking," Biophysical Journal, vol. 88, Mar. 2005, 2266-2277, 12 pages.
Gao et al., "Snapshot Image-Mapping Spectrometer for Hyperspectral Fluorescence Microscopy," Optics & Photonics News, 2010, vol. 21, No. 12, 50-50, 1 page.
International Search Report from PCT/US2009/063259 dated Apr. 23, 2010 (4 pages).
Written Opinion from PCT/US2009/063259 dated Apr. 23, 2010 (8 pages).
PCT International Preliminary Report on Patentability dated May 10, 2011 received in corresponding PCT Application No. PCT/US2009/063259; 10 pages.
Weitzel, et al., "3D: The next generation near-infrared imaging spectrometer," Astron. Astrophys. Suppl. Ser. 119, 531-546, 1996, 16 pages.
Todd, et al., "A cryogenic image slicing IFU for UKIRT—namufacture, alignment, laboratory testing and data reduction," Proc. of SPIE vol. 4842, O2003, 151-161, 11 pages.
Vo-Dinh, et al., "A Hyperspectral Imaging System for in Vivo Optical Diagnostics," IEEE Engineering in Medicine and Biology Magazine, Sep./Oct. 2004, pp. 40-49, 10 pages.
Sutherland et al., "Advanced imaging of multiple mRNAs in brain tissue using a custom hyperspectral imager and mulivariate curve resolution," Journal of Neuroscience Methods 160 (2007) 144-148, 5 pages.
Allington-Smith, "Basic principles of integral field spectroscopy," New Astronomy Reviews 50 (2006) 24-251, 8 pages.
JR Lacowicz, "Chapter 10: Fuorescence Anistropy," Principles of Fluorescence Spectroscopy, 2006, 353-382, 30 pages.
M. Pluta, "Advanced Light Microscopy," Elsevier, 1988, vol. 1, 349-355, 7 pages.
Barret et al., "Diffraction Theory and Imaging," Foundations of image science (2004) 457-550, 98 pages.
Ford et al., "Computed Tomography-Based Spectral Imaging for Fluorescence Microscopy," Biophysical Journal, vol. 80, Feb. 2001, 986-993, 8 pages.
Mathews, "Design and fabrication of a low-cost, multispectral imaging system," Applied Optics, Oct. 1, 2008, vol. 47, No. 28, F71-F76, 6 pages.
Laurent et al., "Design of an Integral Field Unit for MUSE, and Results from Prototyping," Publications of the Astronomical Society of the Pacific, 118, 1564-1573, Nov. 2006, 10 pages.
Bonneville et al., "Design, prototypes and performances of an image slicer system for integral field spectroscopy," Specialized Optical Developments in Astronomy, Proceedings of SPIE, Vo. 4842 (2003), 162-173, 12 pages.
Kester, et al. "Development of image mappers for hyperspectral biomedical imaging applications," Applied Optics, vol. 49, No. 10, Apr. 1, 2010, 1886-1899, 14 pages.
Berg, "Evaluation of spectral imaging for plant cell analysis," Journal of Microscopy, vol. 214, Pt 2, May 2004, 174-181, 8 pages.
Fernandez, "Fluorescence microscopy with a coded aperture snapshot spectral imager," Proc. of SPIE, vol. 7184, 2009, 11 pages.
Malik et al., "Fourier transform multipixel spectroscopy for quantitative cytology," Journal of Microscopy, vol. 182, Pt 2, May 1996, 133-40, 8 pages.
Dubbeldam et al., "Freeform Diamond Machining fo Complex Monolithic Metal Optics for Integral Field Systems," Proceedings of SPIE vol. 5494, 2004, 163-175, 14 pages.
Janicki et al., "From Silencing to Gene Expression: Real-Time Analysis in Single Cells," Cell, vol. 116, Mar. 5, 2004, 683-698, 16 pages.
Booth et al., "Full spectrum filterless fluorescence microsopy," Journal of Microscopy, vol. 237, Pt 1, 2010, 103-109, 7 pages.
Gao et al., "Compact Image Slicing Spectrometer (ISS) for hyperspectral fluorescence microscopy," Opt. Express, vol. 17, 2009, 12293-12308, 16 pages.
Gorman et al., "Generalization of the Lyot filter and its application to snapshot spectral imaging," Optics Express, vol. 18, No. 6, Mar. 15, 2010, 5602-5608, 7 pages.
ChromoDynamics, Inc., "Hyperspectral Imaging Solutions for the Life Sciences," Informational product brochure, Date unknown.
Zuzak et al., "Hyperspectral Imaging Utilizing LCTF and DLP Technology for Surgical and Clinical Applications," Proc. of Spie, vol. 7170, 2009, 9 pages.
Cull et al., "Identification of fluorescent beads using a coded aperture snapshot spectral imager," Applied Optics, vol. 49, No. 10, Apr. 1, 2010, B59-B70, 12 pages.
Vermaas et al., "In vivo hyperspectral confocal fluorescence imaging to determine pigment localization and distribution in cyanobacterial cells," PNAS, vol. 105, No. 10, 4050-4055, 6 pages.
Landgrebe, "Information Extraction Principles and Methods for Multispectral and Hperspectral Image Data," Information Processing for Remote Sensing, Nov. 9, 1998, 30 pages.
Bennett et al., "Infrared Reflectance of Evaporated Aluminum Films," Journal of the Optical Society of America, vol. 52, No. 11, Nov. 1962, 1245-1250, 6 pages.
Kester et al., "Real-Time Hyperspectral Endoscope for Early Cancer Diagnostics," Proc. of SPIE, vol. 7555, 2010, 12 pages.
Ford et al., "Large-image-format computed tomography imaging spectrometer for fluorescence microscopy," Optics Express, vol. 9, No. 9, Oct. 22, 2001, 444-453, 10 pages.

(56) References Cited

OTHER PUBLICATIONS

Ntziachristos et al., "Looking and listening to light: the evolutin of whole-body photonic imaging," Nature Biotechnology, vol. 23, No. 3, Mar. 2005, 313-320, 8 pages.

Carl Ziess MicroImaging GmbH, "LSM 510 META Mk4—Progressional Excitation Laser Module Flexibility for the Next Generation of Fluorescent Dyes," Informational product brochure, date unknown, 4 pages.

Carl Zeiss MicroImaging GmbH, "LSM 710 the Power of Sensitivity: A New Dimension in Confocal Laser Scanning Microscopy," Date unknown, 32 pages.

Spiller et al., "Measurement of single-cell dynamics," Nature, vol. 465, Jun. 10, 2010, 736-745, 10 pages.

Pacific Northwest National Laboratory, Biological Sciences Division Research Highlights, "Mechanisms of 3D intercellular signaling in mammary epithelial cells in response to low dose, low-LET radiation: Implications for the radiation-induced bystander effect," Nov. 2004, 264-265, 2 pages.

Dubbeldam et al., "Prototyping of Diamond Machined Optics for the KMOS and JWST NIRSpec Integral Field Units," Proceedings of SPIE vol. 6273, Jul. 6, 2006, 14 pages.

Hiraoka, "Multispectral Imaging Fluorescence Microscopy for Living Cells," Cell Structure and Function, vol. 27, 2002, 367-374, 8 pages.

Haaland et al., "Multivariate Curve Resolution for Hyperspectral Image Analysis: Applications to Microarray Technology," Proc. of SPIE vol. 4959, 2003, 55-66, 12 pages.

Allington-Smith et al., "New developments in Integral Field Spectroscopy," Part of the SPIE Conference on Optical Astronomical Instrumentation, SPIE vol. 3355, Mar. 1998, 196-205, 10 pages.

Vives et al., "New technological developments in Integral Field Spectroscopy," Proc. of the SPIE, vol. 7018, 70182N-70182N-10, 2008, 10 pages.

Schwarz et al., "Noninvasive Evaluation of Oral Lesions Using Depth-sensitive Optical Spectroscopy," Cancer, vol. 15, No. 8, Jan. 23, 2009, 1669-1679, 11 pages.

Schmoll et al., "Optical replication techniques for image slicers," New Astronomy Reviews 50, 2006, 263-266, 4 pages.

Vives et al., "Original image slicer designed for integral field spectroscopy with teh newar-infrared spectrograph for the James Webb Space Telescope," Optical Engineering vol. 45, No. 9, Sep. 2006, 6 pages.

Patterson et al., "Photobleaching in Two-Photon Excitation Microscopy," Biophysical Journal, vol. 78, Apr. 2000, 2159-2162, 4 pages.

Preuss et al., "Precision machining of integral field units," New Astronomy Reviews, vol. 50, 2006, 332-336, 5 pages.

Lansford et al., "Resolution of multiple green fluorescent protein color variants and dyes using two-photon microscopy and imaging spectroscopy," Journal of Biomedical Optics, vol. 6, No. 3, Jul. 2001, 311-318, 8 pages.

Coates et al., "sCMOS Scientific CMOS Technology: A High-Performance Imaging Breakthrough," White Paper—www.scmos.com, Jun. 16, 2009, 16 pages.

Wagadarikar et al., "Single disperser design for coded aperture snapshot spectral imaging," Applied Optics, vol. 47, No. 10, Apr. 1, 2008, B44-B51, 8 pages.

Matsuoka et al., "Single-cell viability assessment with a novel spectro-imaging system," Journal of Biotechnology, vol. 94, 2002, 299-308, 10 pages.

Gehm et al., "Single-shot compressive spectral imaging with a dual-disperser architecture," Optics Express, vol. 15, No. 21, Oct. 17, 2007, 14013-14027, 15 pages.

Content, "Slicer system of KMOS," New Astronomy Reviews, vol. 50, 2006, 374-377, 4 pages.

Office Action issued in corresponding Japanese Application No. 2011534898 with English Translation dated Mar. 27, 2013 (13 pages).

Patent Abstracts of Japan, Puiblication No. 2005-062104 Dated: Mar. 10, 2005 (1 page).

Patent Abstracts of Japan, Publication No. 04-031720, Dated: Feb. 3, 1992 (1 page).

Patent Abstracts of Japan, Publication No. 08-193884, Dated: Jul. 30, 1996 (1 page).

Patent Abstracts of Japan, Publication No. 2000-329617, Dated: Nov. 30, 2000 (1 page).

Patent Abstracts of Japan, Publication No. 2003-284687, Dated: Oct. 7, 2003 (1 page).

Espacenet English Abstract for JP-2006-504140, Dated: Feb. 2, 2006 (1 page).

Patent Abstracts of Japan, Puiblication No. 2007-199572, Dated: Aug. 9, 2007 (1 page).

Office Action issued in corresponding Chinese Application No. 200980151779.4 with English Translation dated Mar. 28, 2013 (8 pages).

Office Action in Israel Patent Application No. 212613 dated Apr. 7, 2013 with English Translation (7 pages).

Aumiller, R., Vanderlugt, C., Dereniak, E.L., Sampson, R., and Mcmillan, R.W; "Snapshot imagingf of spectropolarimetry in the visible and infrared" Proceedings of the SPIE, 20080101 SPIE-ISSN 0277-786X, Mar. 31, 2008 (9 pages).

Office Action issued in corresponding Russian Application No. 2011122642 with English Translation dated Aug. 16, 2013 (14 pages).

\* cited by examiner

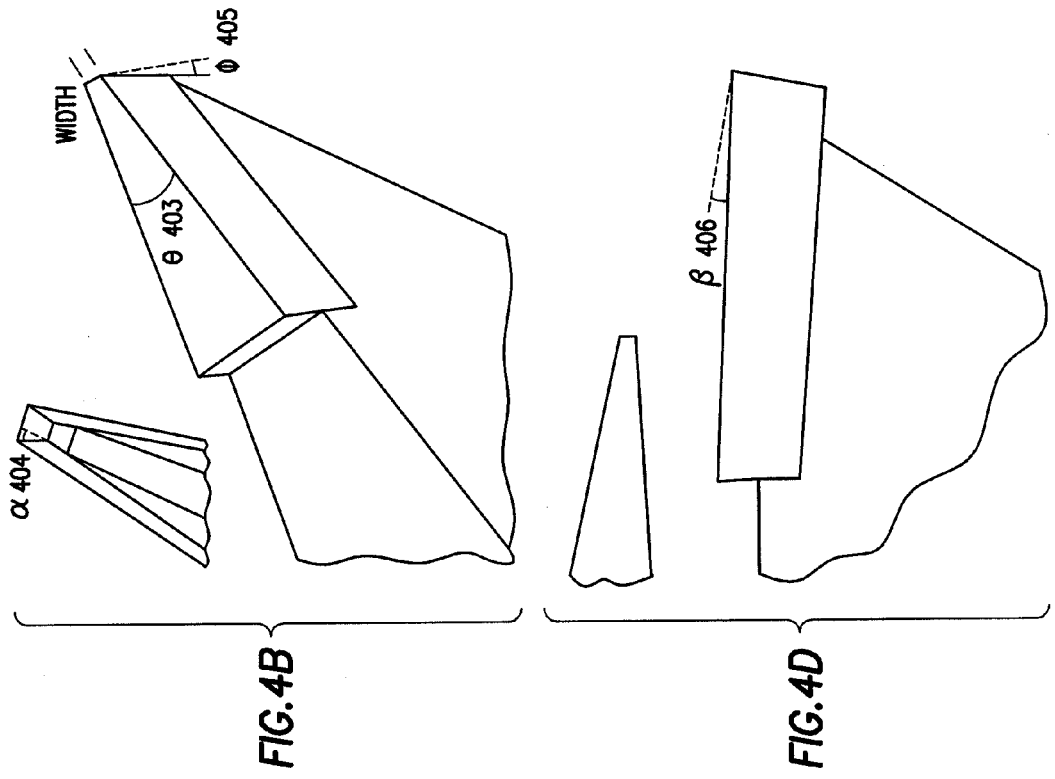
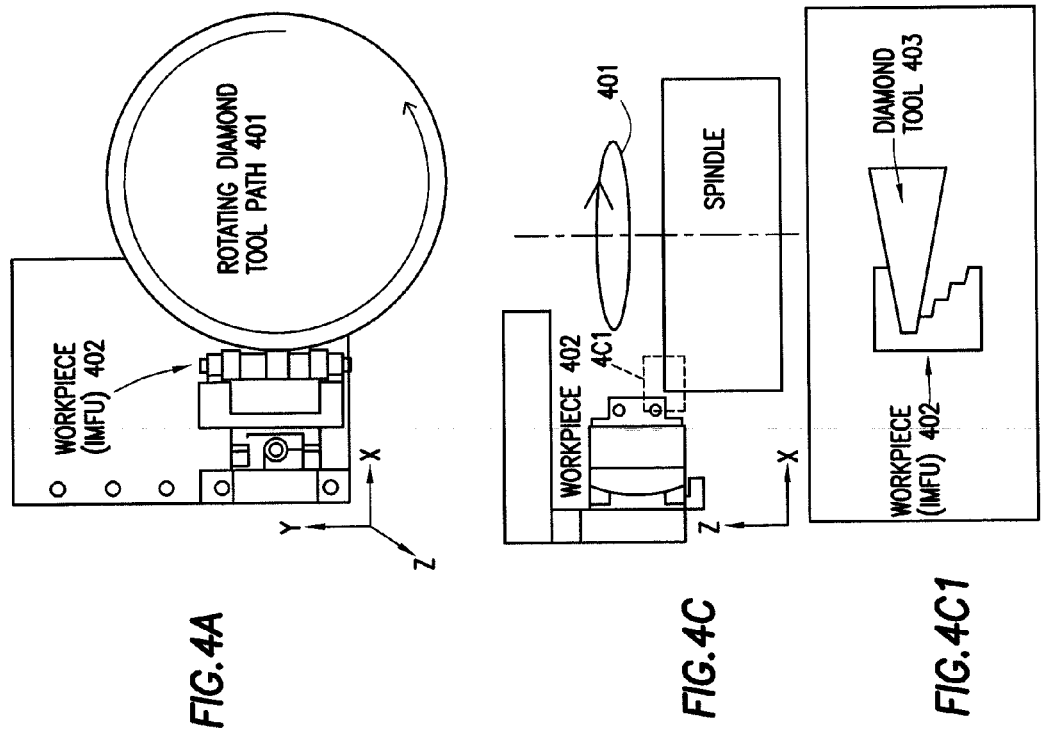
FIG.4B
FIG.4D
FIG.4A
FIG.4C
FIG.4C1

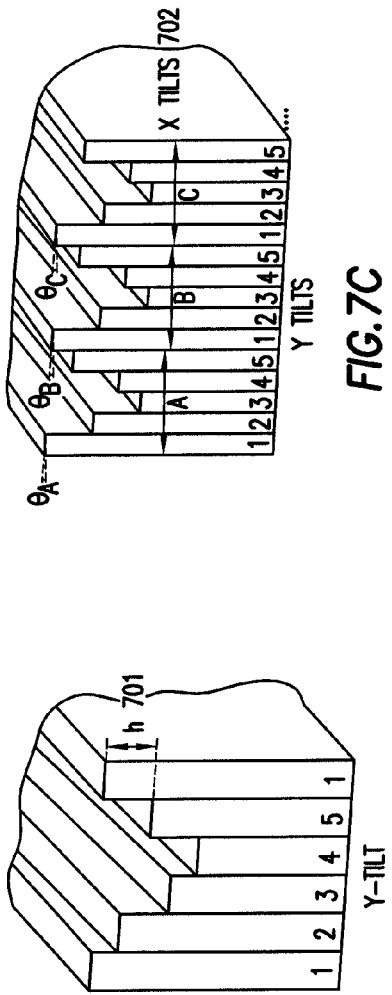
FIG.7A
FIG.7B
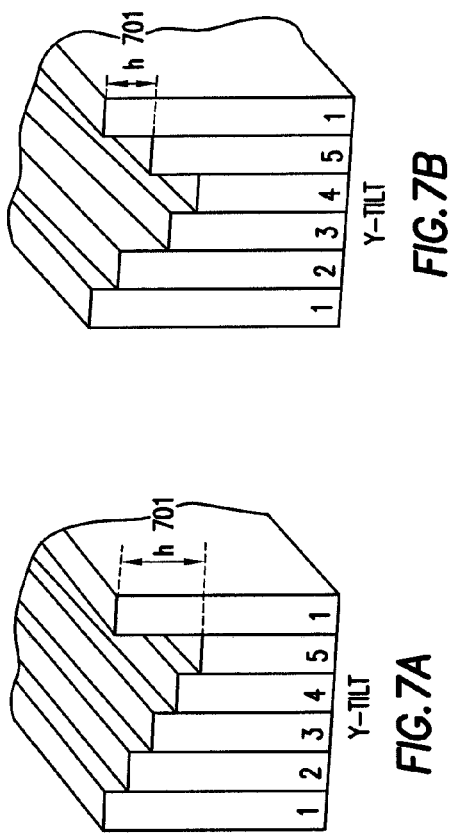
FIG.7C
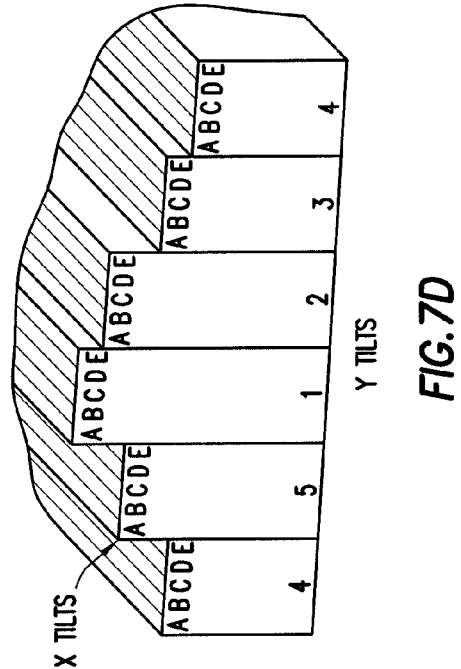
FIG.7D
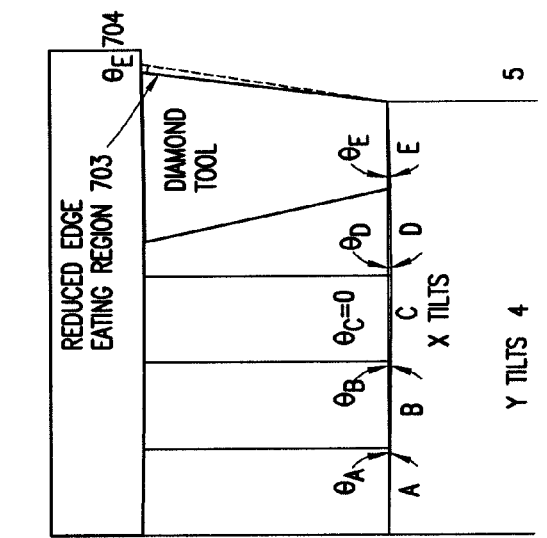
FIG.7E

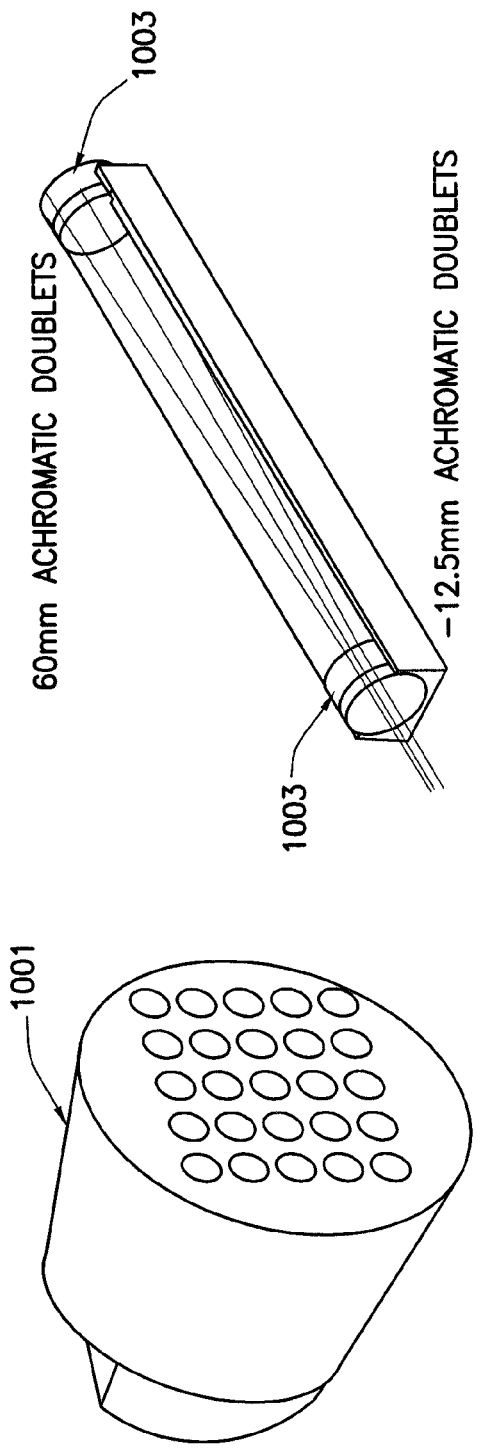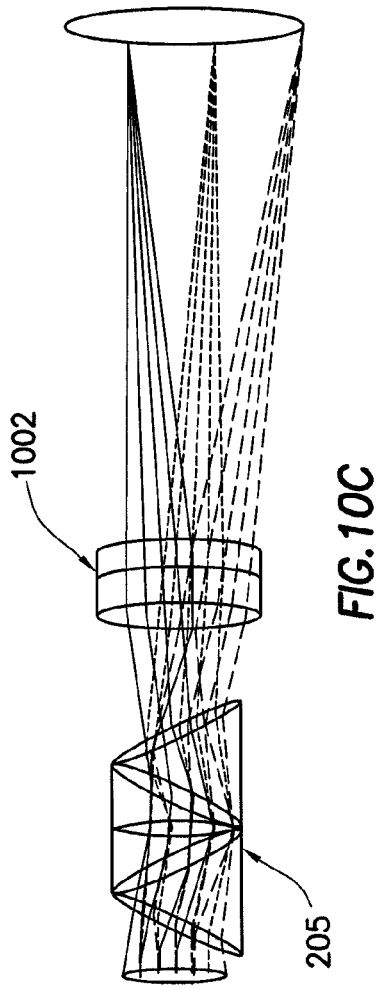
FIG. 10A
FIG. 10B
FIG. 10C

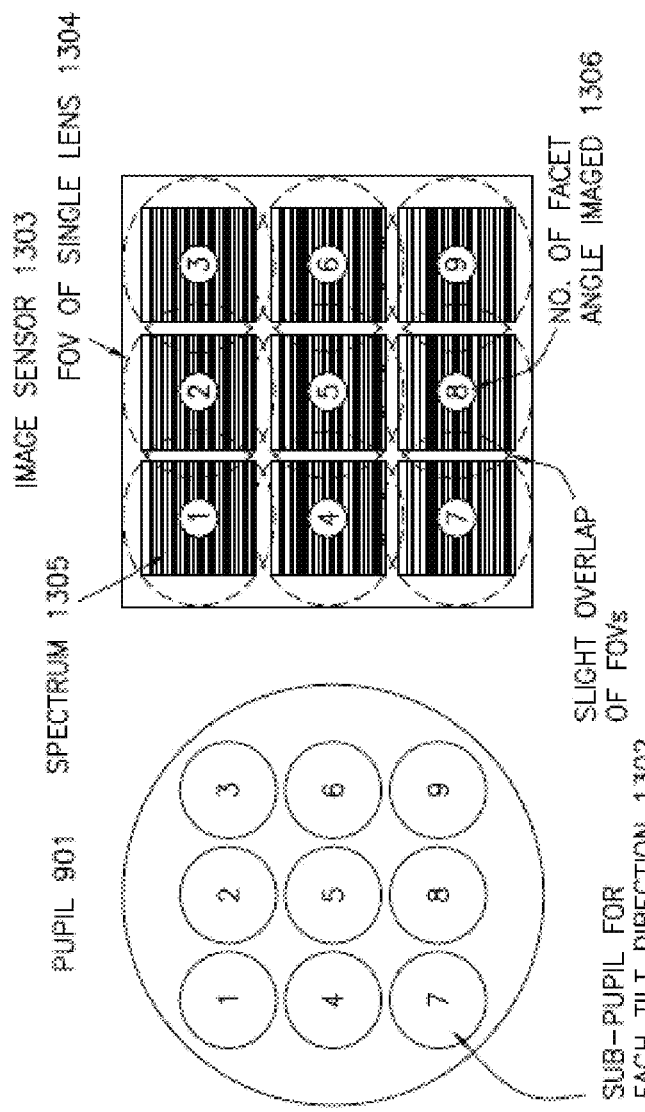
FIG. 13C
FIG. 13B
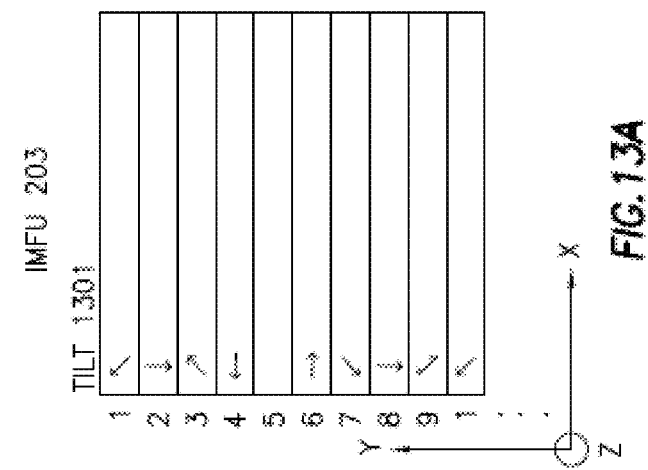
FIG. 13A

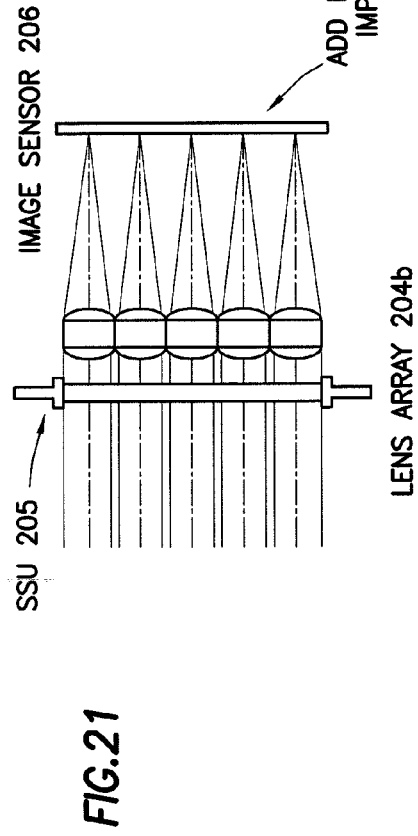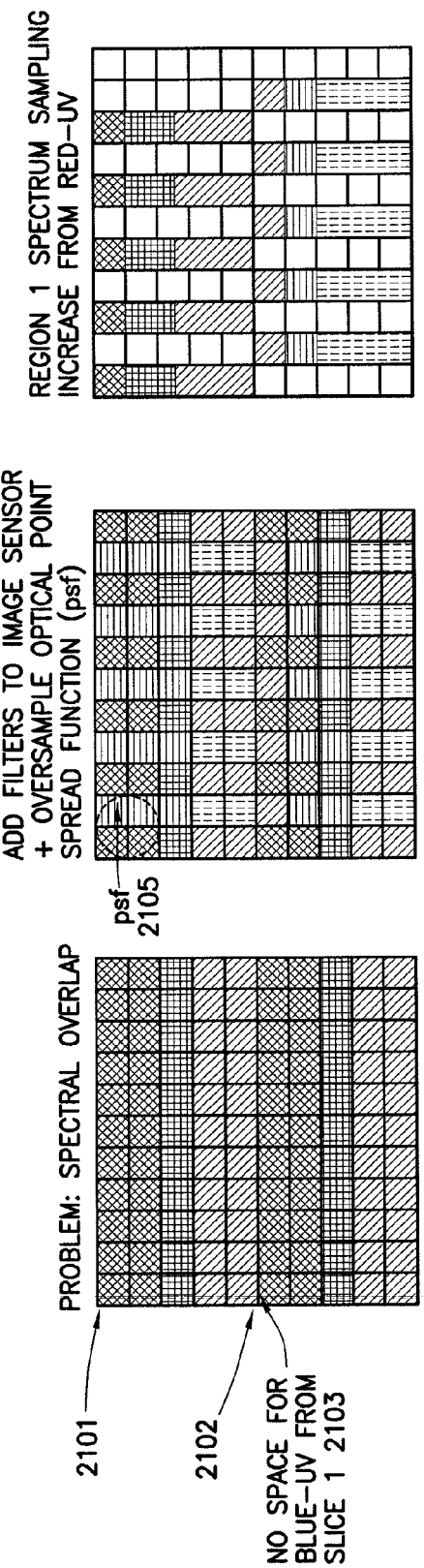

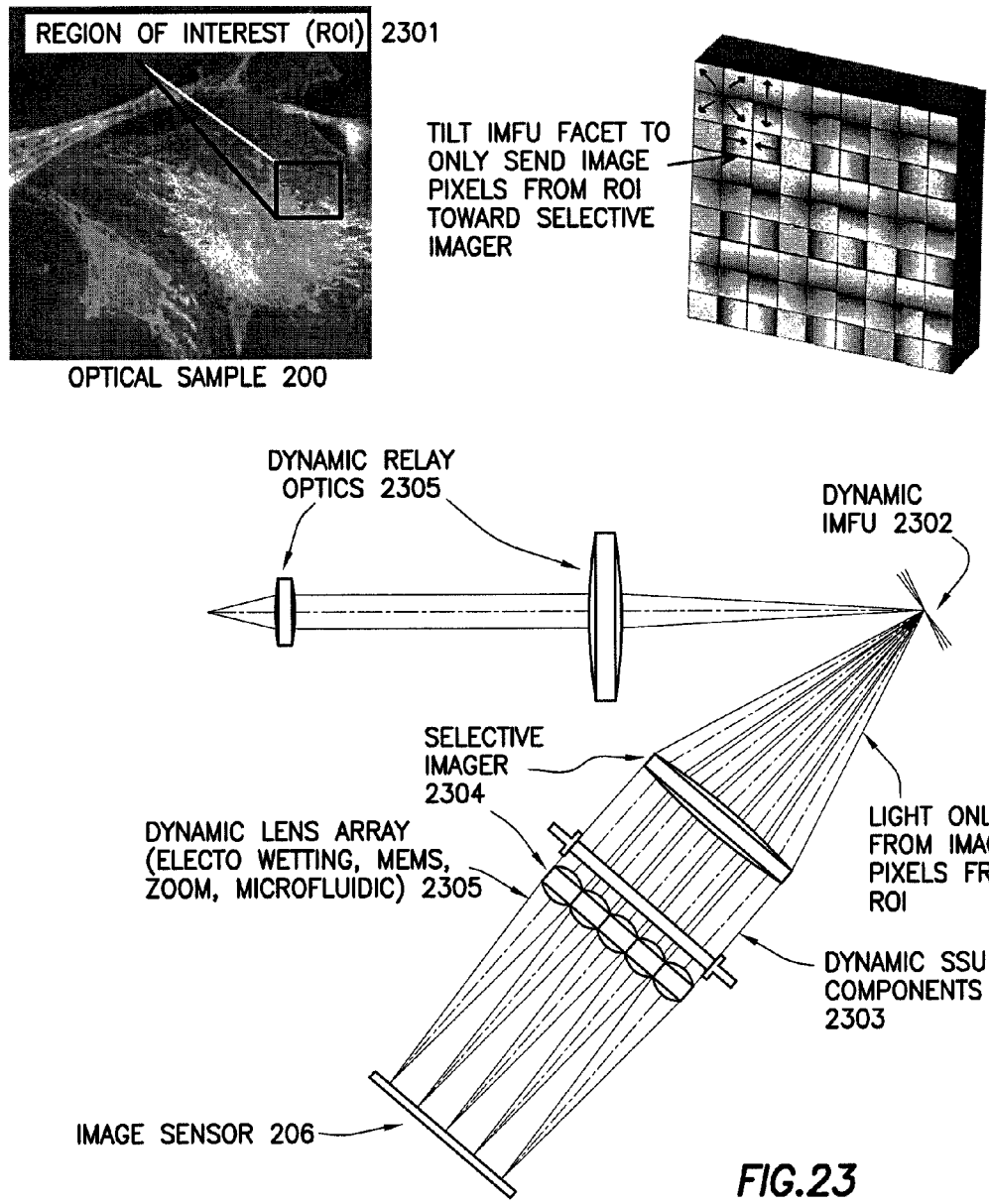
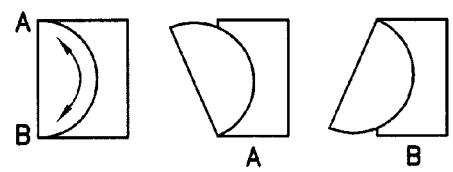
FIG.23
FIG.23A

*FIG.29B*
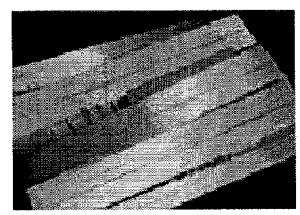
*FIG.29C*
*FIG.29A*
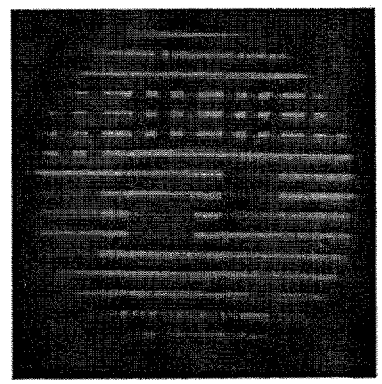
*FIG.30A*
*FIG.30B*
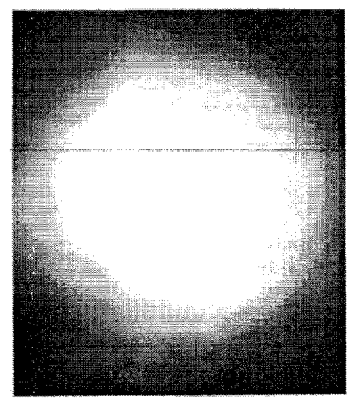
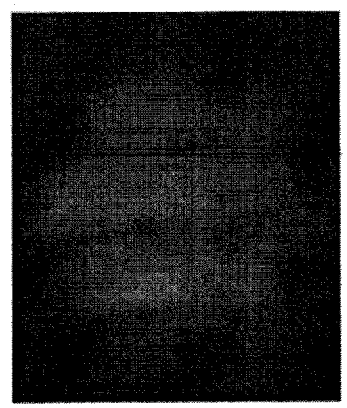
*FIG.30D*
*FIG.30C*

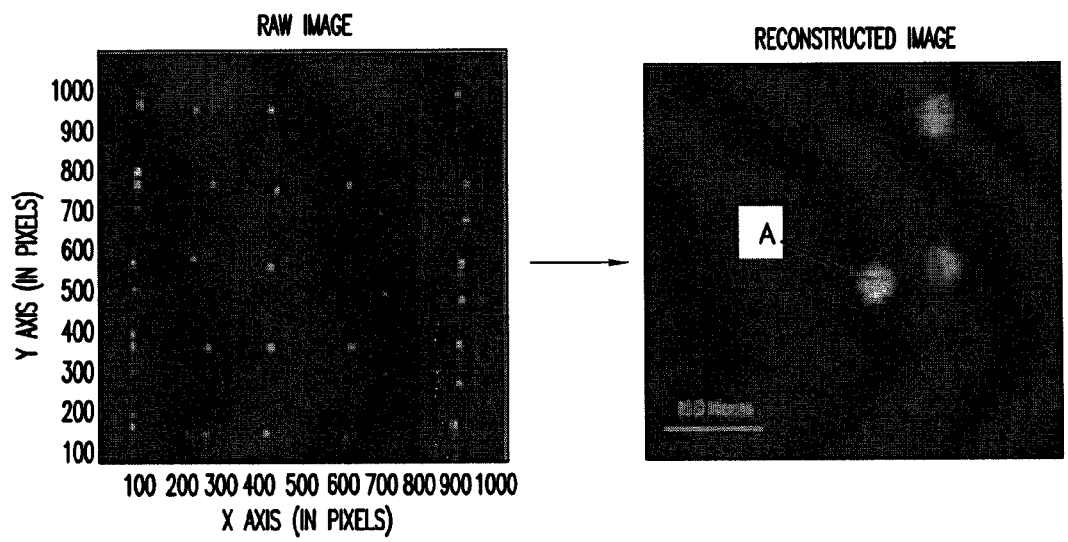
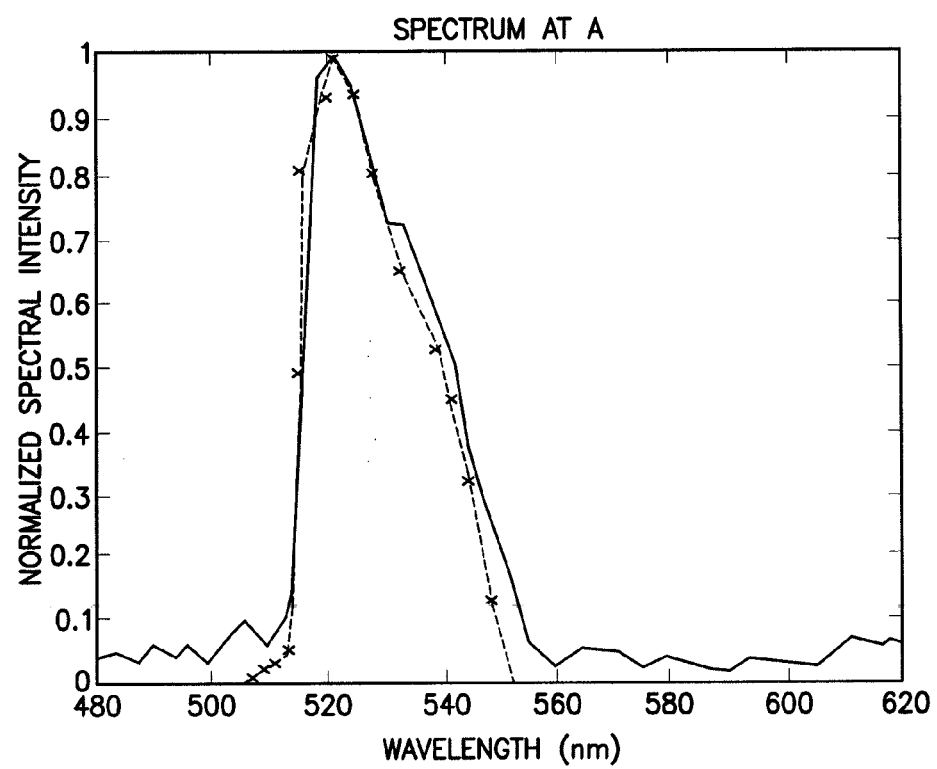
FIG. 35

IMAGE MAPPING SPECTROMETERS

CROSS-REFERENCE TO RELATED APPLICATIONS

This application claims benefit of U.S. Provisional Patent Application Ser. No. 61/111,182, filed Nov. 4, 2008, which is herein incorporated by reference.

STATEMENT REGARDING FEDERALLY SPONSORED RESEARCH OR DEVELOPMENT

This invention was made with government support under Grant Number R21EB009186 awarded by the National Institutes of Health. The government has certain rights in the invention.

BACKGROUND

A hyperspectral imager is a known device that is commonly used to examine the spectral, or wavelength dependent, content of an object or scene. (Hyperspectral imagers are also referred to as imaging spectrometers.) In a hyperspectral imager, light emitted or reflected by a given object or scene is imaged onto the entrance of a spectrometer, usually a slit element that transmits a single line image of the object or scene. The spectrometer in turn re-images this light to another location while dispersing this light according to its wavelength in a direction orthogonal to the orientation of the slit element, where it can readily be observed or recorded. In this manner, each line image of the object or scene is decomposed into a two-dimensional data array, and by scanning the object or scene in line-by-line increments, a three-dimensional datacube is formed.

Fluorescence microscopy is used extensively to gain a deeper understanding of varying cellular dynamics. A major impetus towards the widespread application of this analytical tool is the ongoing development of fluorescent proteins, nanocrystals, and organic fluorophores with a range of sensitivities for physiological analytes. Development and application of fluorescent probes has revolutionized studies of cell and tissue physiology. However, to fully utilize the potential information yielded by these probes, detection systems must simultaneously monitor the spectroscopic variations of a combination of fluorophores. This requirement comes from the fact that most cellular responses do not occur in isolation, rather there is a complex sequence of events that occurs in response to cellular effectors. Furthermore, samples of physiological interest often consist of a heterogeneous population of cells, each potentially coupled to other cells and responding to a perturbation with a unique pattern. In order to determine the time sequence of such events with fluorescence techniques, a spectral imaging system must exhibit an appropriate combination of high spatial, spectral, and temporal resolution. Due to the scanning requirements of currently available systems, one or more of these parameters is often sacrificed for the improvement of another. This leads to spatial or temporal ambiguities in the time course of biological processes. These same limitations are also present for endogenous fluorescence signals where there are often unique combinations of different molecules in the sample with unique temporal interactions that are difficult to detect with scanning techniques. In addition, many endogenous and exogenous fluorescence contrast agents photobleach over time and would benefit from non-scanning approaches that can collect the signal over the full integration period. Reflectance and absorption based signals also experience similar detection tradeoffs with scanning based imaging spectrometers.

A growing trend in endoscopic imaging techniques for early and pre-cancer detection has been to enhance their diagnostic capabilities by improving the spectral content of their images. Spectroscopy techniques have demonstrated that endogenous cancer bio-markers such as nicotinamide adenine dinucleotide ("NADH"), flavin adenine dinucleotide ("FAD"), collagen, and oxy- and deoxy-hemoglobin have distinct fluorescence and reflectance based spectral signatures. These molecular bio-markers may serve as important indicators in identifying pre- and early cancerous regions to more traditional morphologic and architectural features. Imaging spectrometers have been proposed but drawbacks have limited their use as affordable, real-time screening tools. The main limitation of these approaches has been their reliance on expensive tunable filters, such as liquid crystal or acousto-optic, for acquiring the increased spectral bandwidth. Not only are these filters prohibitively expensive, but they also delay imaging acquisition times (>about 23 seconds) due to the serial fashion in which the spectral data is collected. Snapshot techniques such as the Computed Tomography Imaging Spectrometer ("CTIS") avoid this limitation, however these have long post-acquisition processing (about 30 to 60 min) which is also ill-suited for in vivo imaging.

Remote sensing is a valuable tool for acquiring information from dangerous or inaccessible areas such as war zones, glaciers, ocean depths, hurricanes, gas plumes, biological weapons, etc. Imaging spectrometers enhance remote sensing techniques providing critical information based on subtle spectral features from a sample. These devices are often used on vehicles that travel at high speeds, such as satellites and planes, consequently requiring fast data collection. Scanning-based approaches often compromise on image size, contrast, and/or spectral resolution to meet these fast temporal acquisition requirements. In some cases, the event in question, such as verification that a missile has hit its target, transpires so fast that it is virtually impossible for scanning approaches to be used, such as verification that a missile has hit its target. Therefore, non-scanning, snapshot spectral imaging techniques would be desirable.

Food inspection plays an important role in assuring the quality of the food that is consumed within our country. However, this process is typically a human-based manual observation of the food for visually-apparent defects. This approach has several limitations, including the fact that many defects are not observable with the human eye. It can also be a slow process, prone to human errors and sampling inaccuracies. Spectral imaging techniques can play a significant role in this area by being able to evaluate food for multiple defects in a quick and quantitative manner based on unique spectral signatures. To have minimal impact on the time to market, these inspection stations must acquire and analysis information very fast, limiting the usefulness of scanning based approaches.

SUMMARY

The present disclosure is generally in the field of hyperspectral and multispectral imaging. More particularly, the present disclosure, according to certain embodiments, relates to compact Image Mapping Spectrometer ("IMS") systems and methods.

One embodiment of the present disclosure provides an image mapping spectrometer. The image mapping spectrometer comprises an image mapping field unit. The image mapping spectrometer further comprises a spectral separation unit. The image mapping spectrometer further comprises a selective imager.

Another embodiment of the disclosure provides a method of spectral imaging. The method of spectral imaging comprises providing an optical sample. The method of spectral imaging further comprises providing an image mapping spectrometer, wherein the image mapping spectrometer comprises an image mapping field unit, a spectral separation unit, and a selective imager. The method of spectral imaging further comprises imaging the optical sample with the image mapping spectrometer.

Yet another embodiment of the disclosure provides a method of fabricating image mapping field units. The method of fabricating image mapping field units comprises providing an image mapping field unit substrate. The method further comprises providing an optical component cross section profile. The method further comprises providing a surface shaped diamond tool specific to the optical component cross section profile. The method further comprises utilizing the surface shaped diamond tool to create the optical component cross section profile in the image mapping field unit substrate to form a mapping element.

The features and advantages of the present invention will be apparent to those skilled in the art. While numerous changes may be made by those skilled in the art, such changes are within the spirit of the disclosure.

DRAWINGS

Some specific example embodiments of the disclosure may be understood by referring, in part, to the following description and the accompanying drawings.

FIGS. 4A-4D illustrate a diamond machining configuration (raster fly cutting) for fabrication of IMFUs using design-specific surface-shaped diamond tools, according to embodiments of the disclosure.

FIGS. 7A-7D present several IMFU design configurations that may minimize the effect of edge-eating, according to embodiments of the disclosure.

Figure 8A:
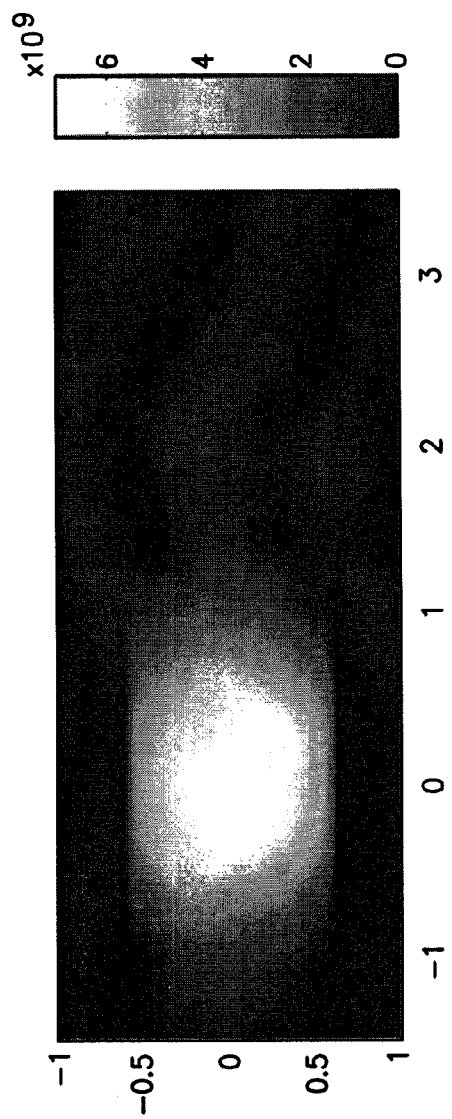
Figure 8B:
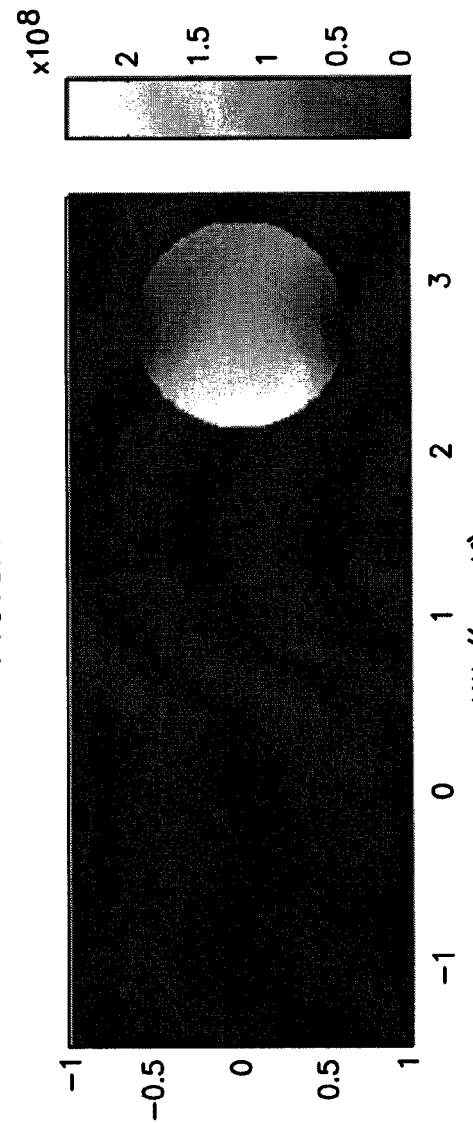

FIG. 8 illustrates (a) simulated diffraction effects caused by the miniature optical components in an IMFU, and (b) optimum placement of an adjacent sub-pupil for minimum crosstalk of approximately 1%, according to embodiments of the disclosure.

FIG. 9 illustrates (a) an image created by an actual pupil from an IMS system, according to embodiments of the disclosure, with 25 tilts (5 x-tilts and 5 y-tilts), and showing the elliptical pupil caused by diffraction. This is compared to the image created by a simulated pupil (b). Cross sections through the y-axis and x-axis of actual and simulated pupils are shown in (c) and (d), respectively.

FIGS. 10A-10C illustrate different Selective Imager configurations for the lens array component, according to embodiments of the disclosure.

FIGS. 11A-11F illustrate results from a simulation, verifying the chromatic aberration correction for the Selective Imager using optical modeling software, according to embodiments of the disclosure.

Figure 12:
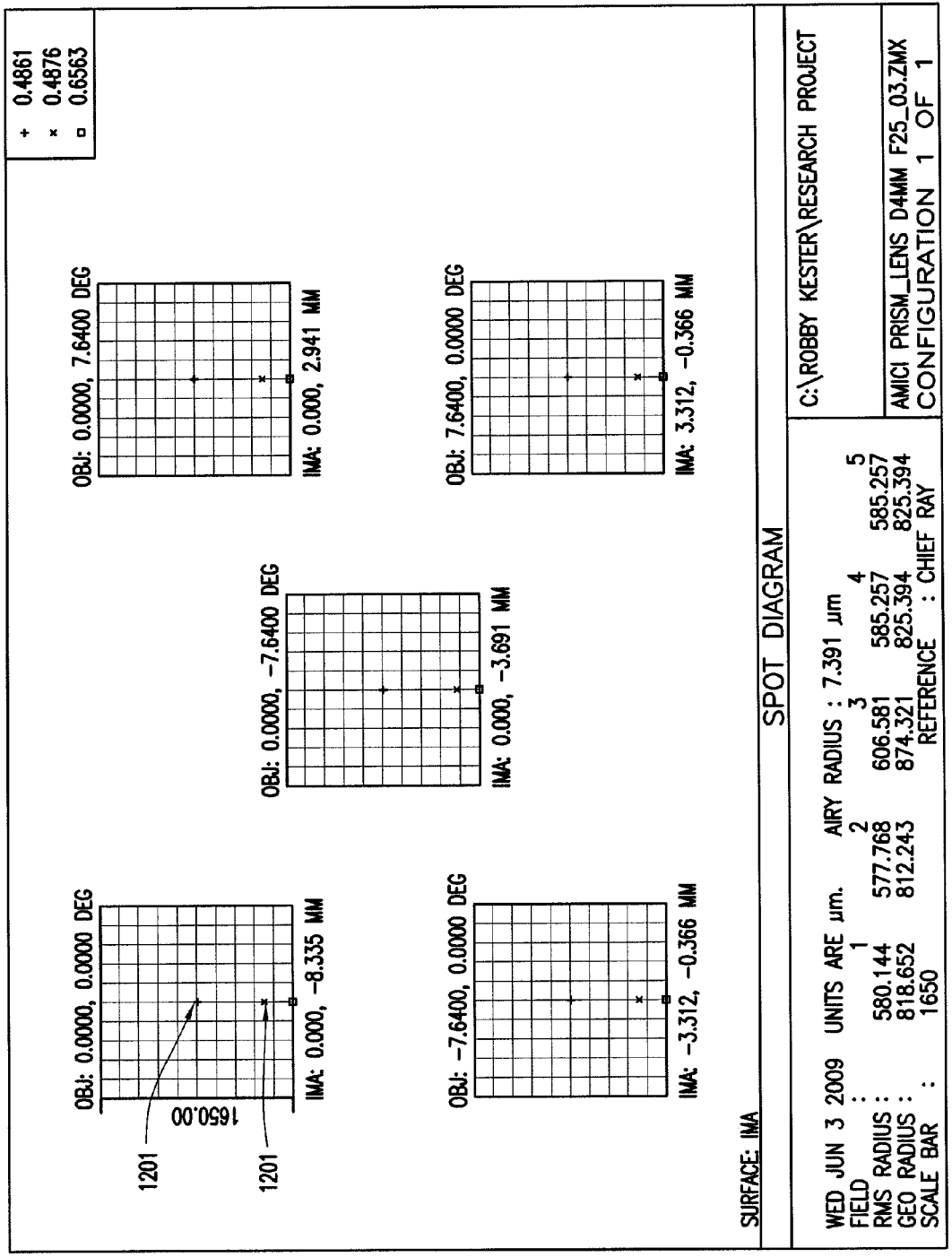

FIG. 12 illustrates results from a simulation, verifying the spectral separation for the ISM system at the final image plane using optical modeling software, according to embodiments of the disclosure.

FIGS. 13A-13C illustrate one example of an image mapper that has three tilt angles for the y-axis and three for the x-axis, according to an embodiment of the disclosure. The total number of tilts is 9, which corresponds to number of sub-systems of the Selective Imager, and also relates to the separation between image lines at the surface of image sensor.

Figure 14:
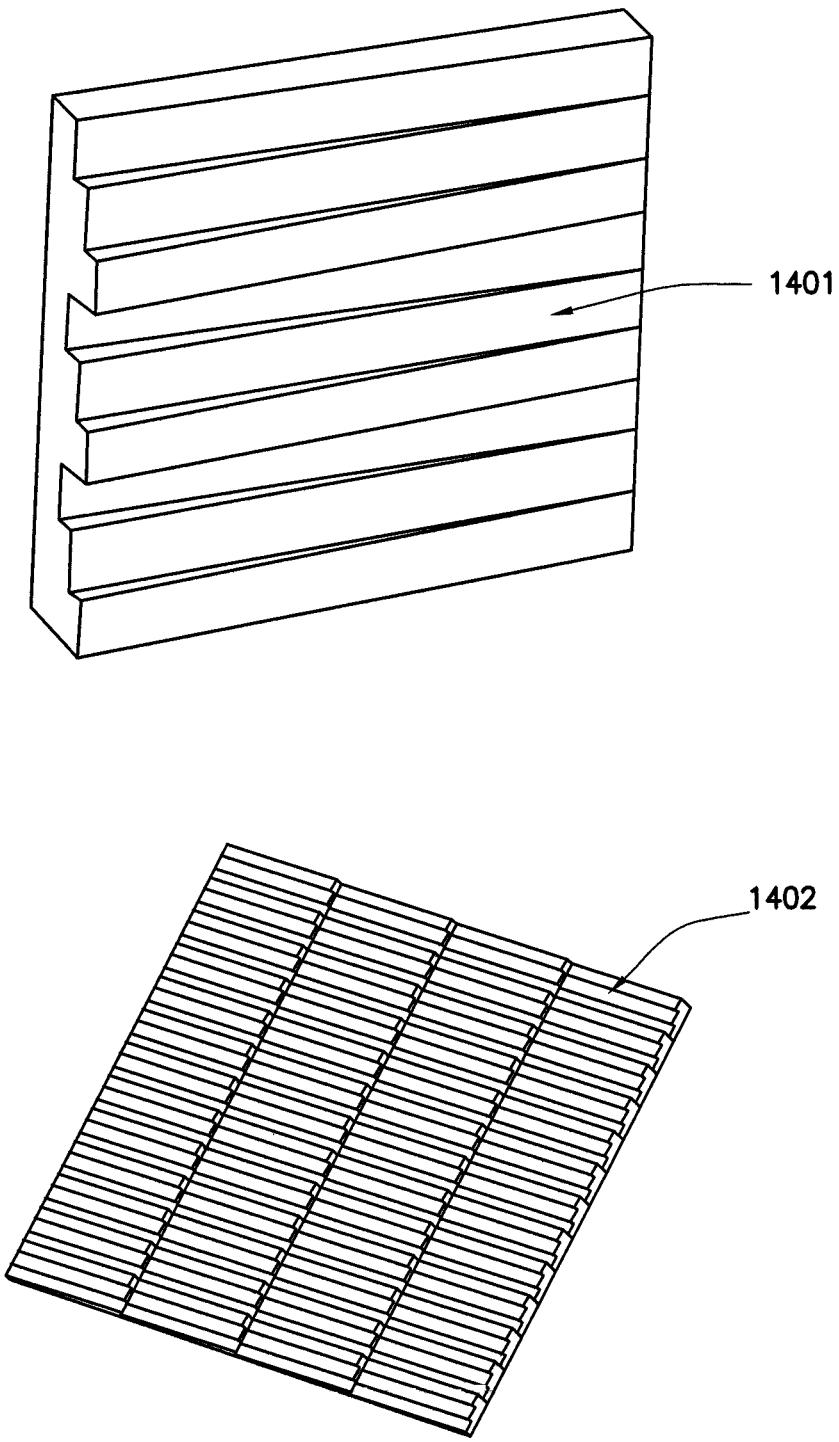

FIG. 14 illustrates a single axis tilted image mapper, according to one embodiment of the disclosure.

Figure 15:
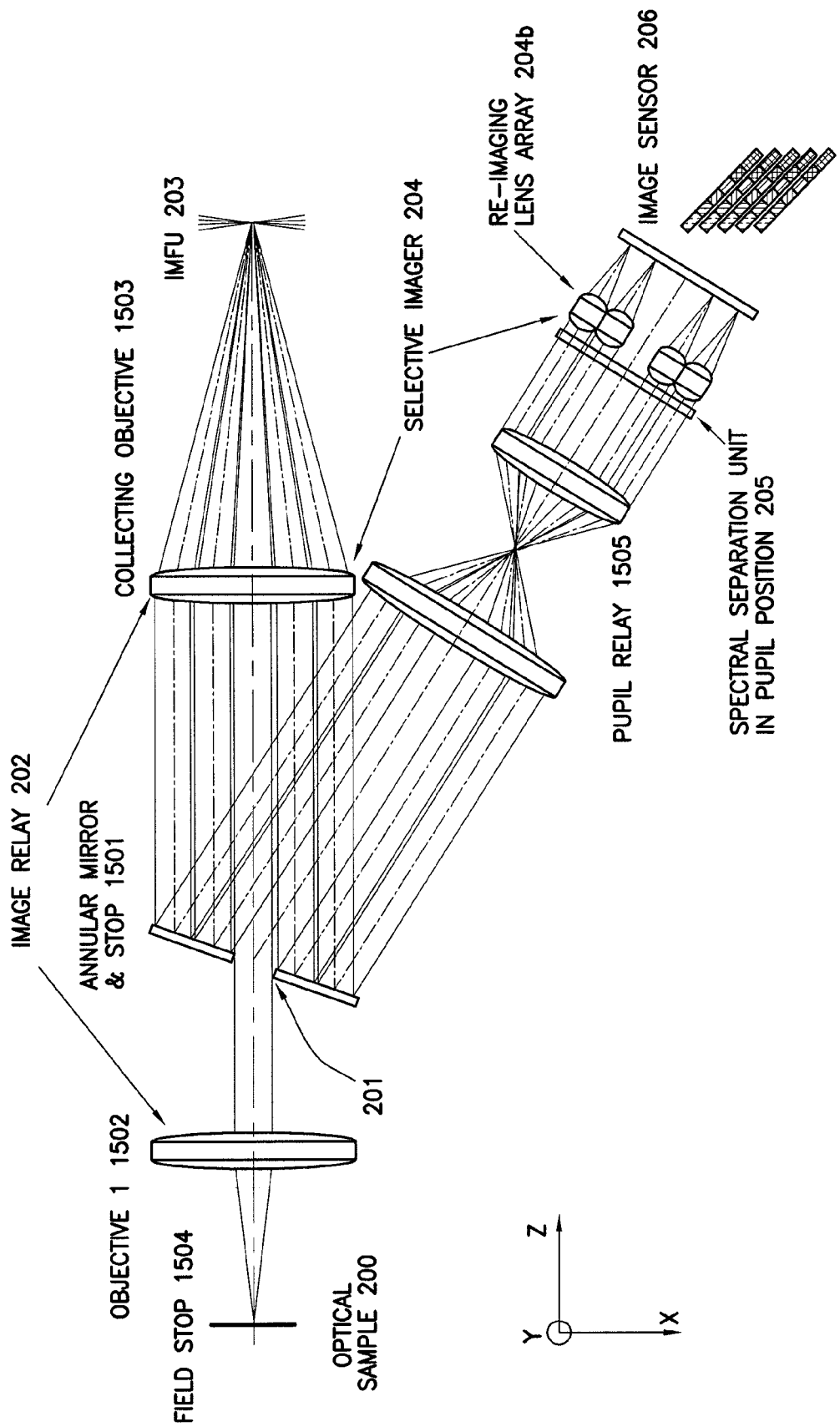

FIG. 15 illustrates a reflective IMS system with annular mirror, according to one embodiment of the disclosure.

Figure 16:
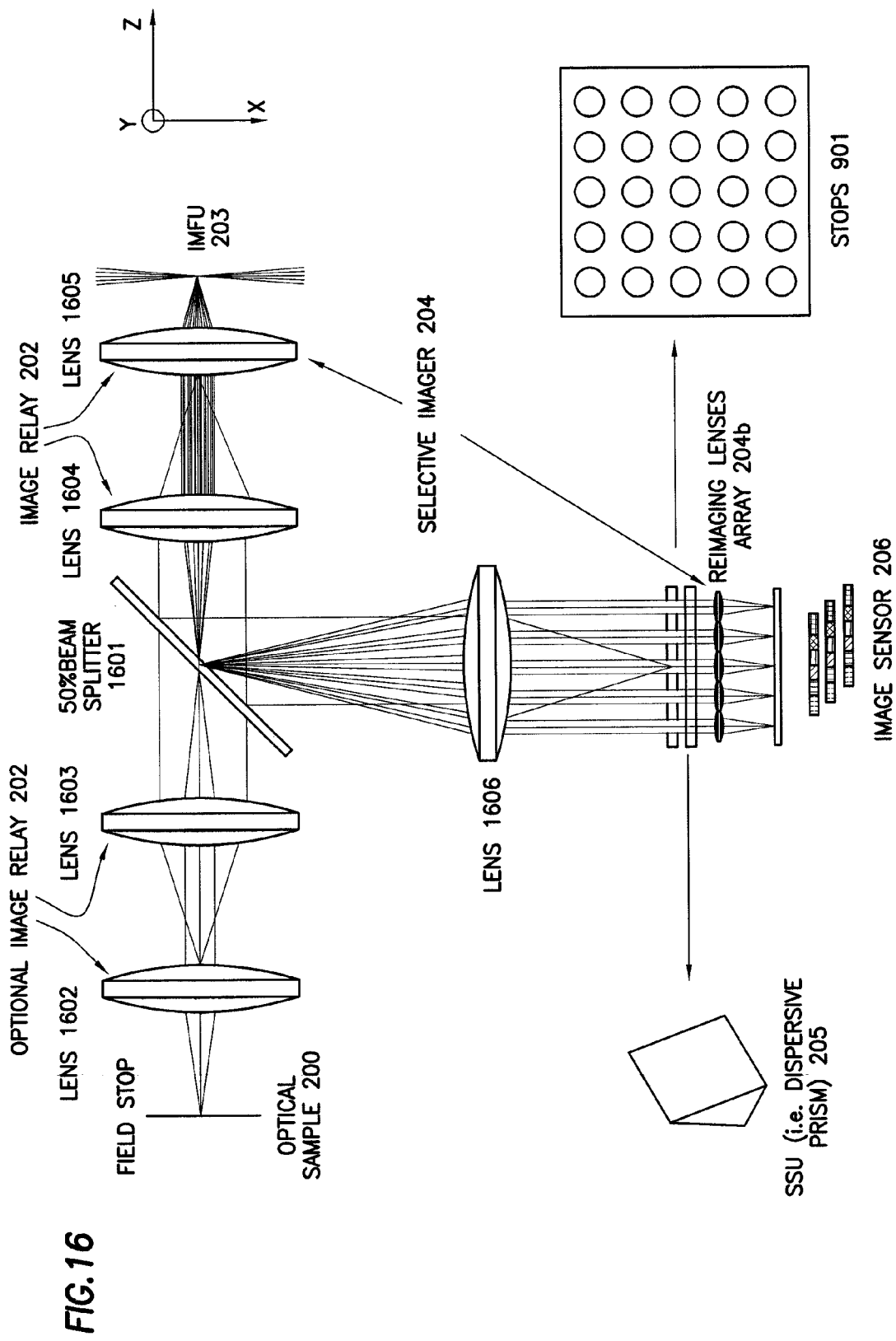

FIG. 16 illustrates a reflective IMS system with beam splitter, according to one embodiment of the disclosure.

Figure 17:
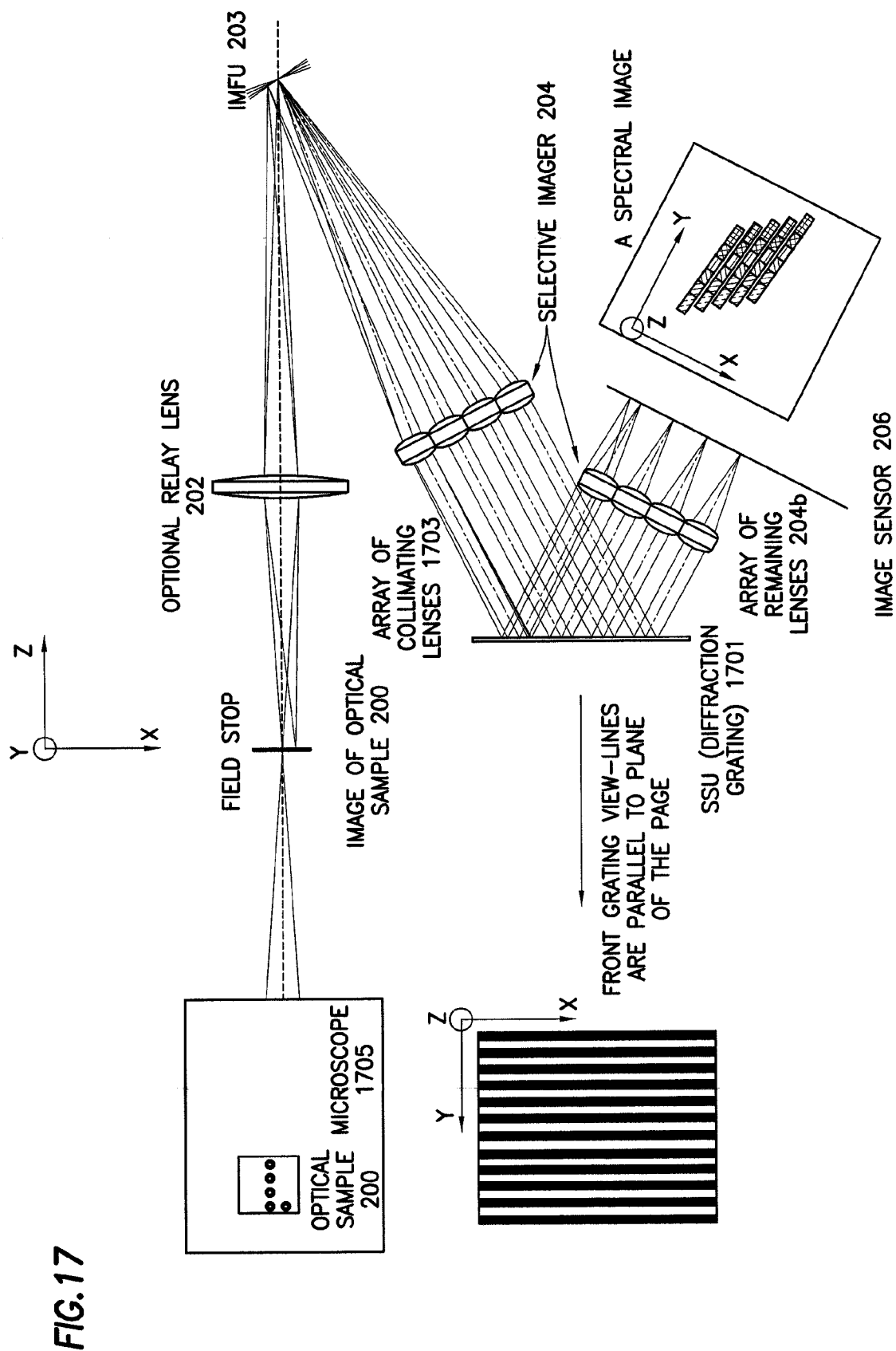

FIG. 17 illustrates a reflective and tilted IMS system, according to one embodiment of the disclosure.

Figure 18:
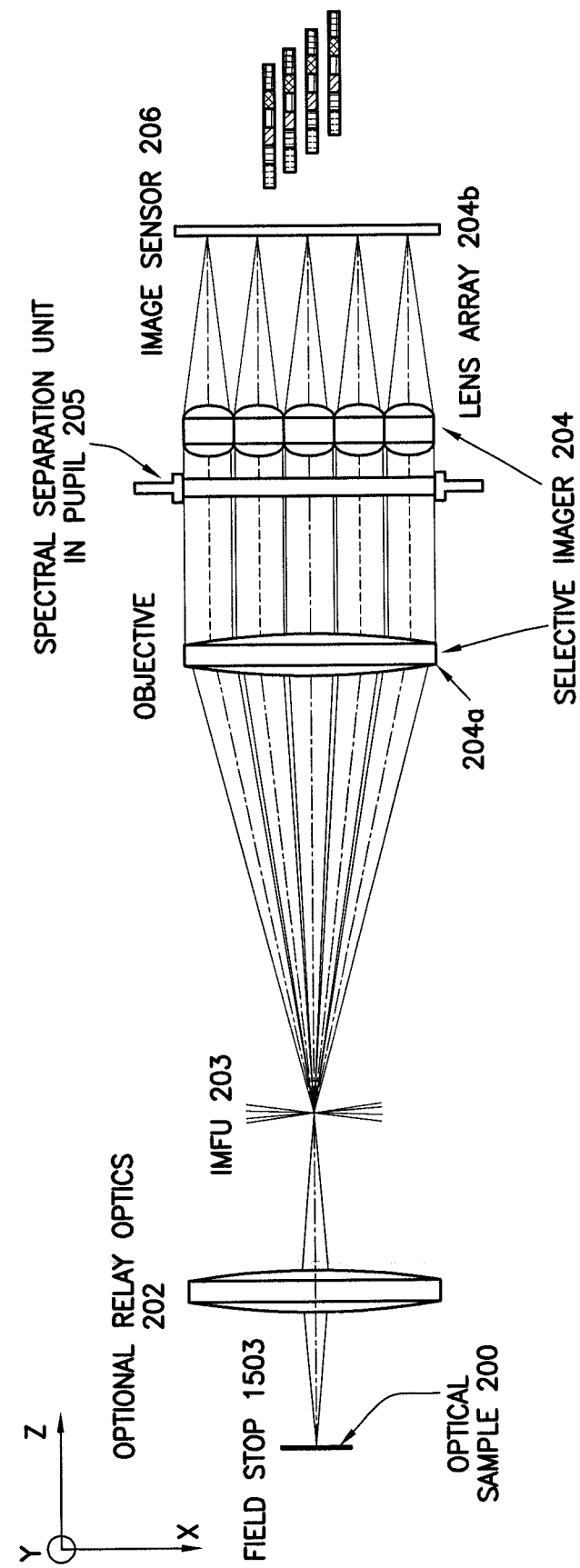

FIG. 18 illustrates a refractive IMS system, according to one embodiment of the disclosure.

Figure 19:
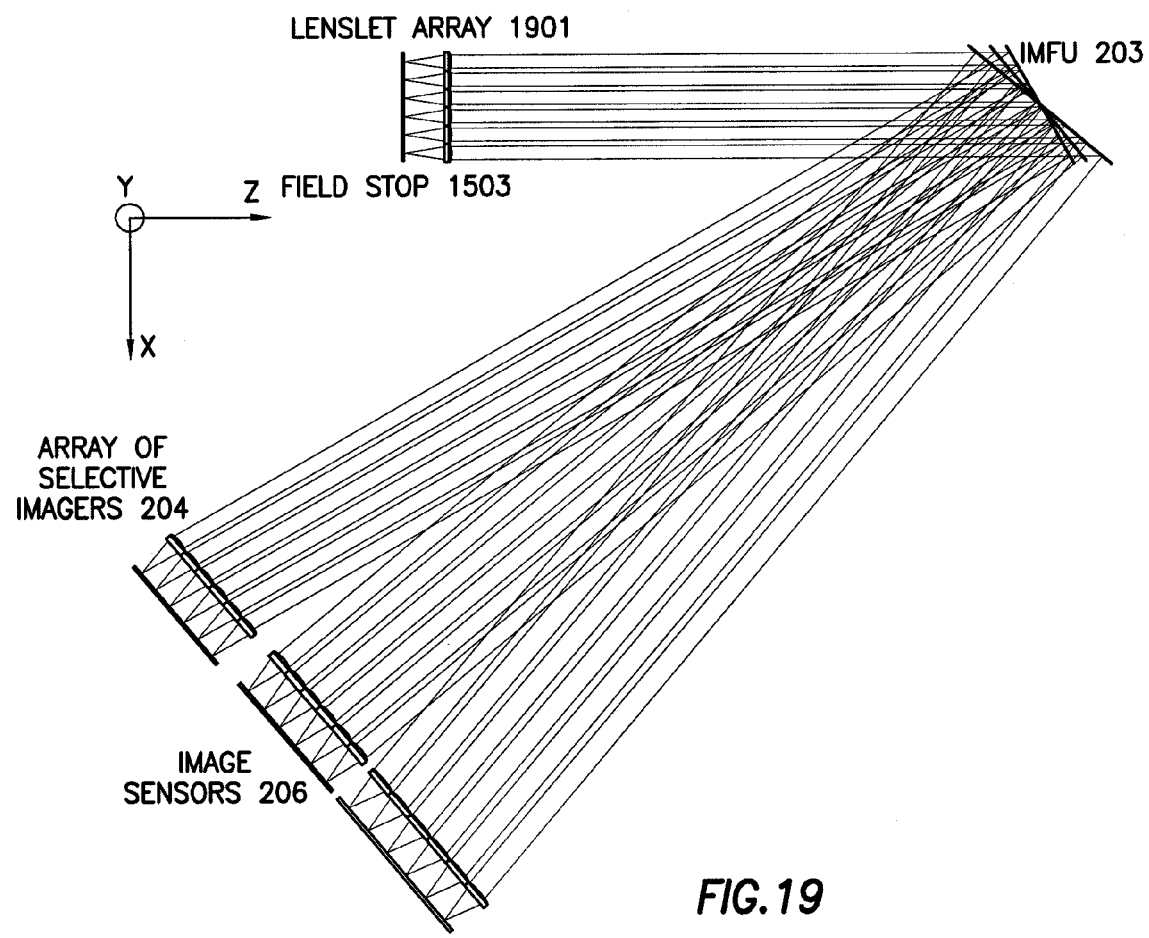

FIG. 19 illustrates an array of IMS lenses, according to one embodiment of the disclosure.

Figure 20:
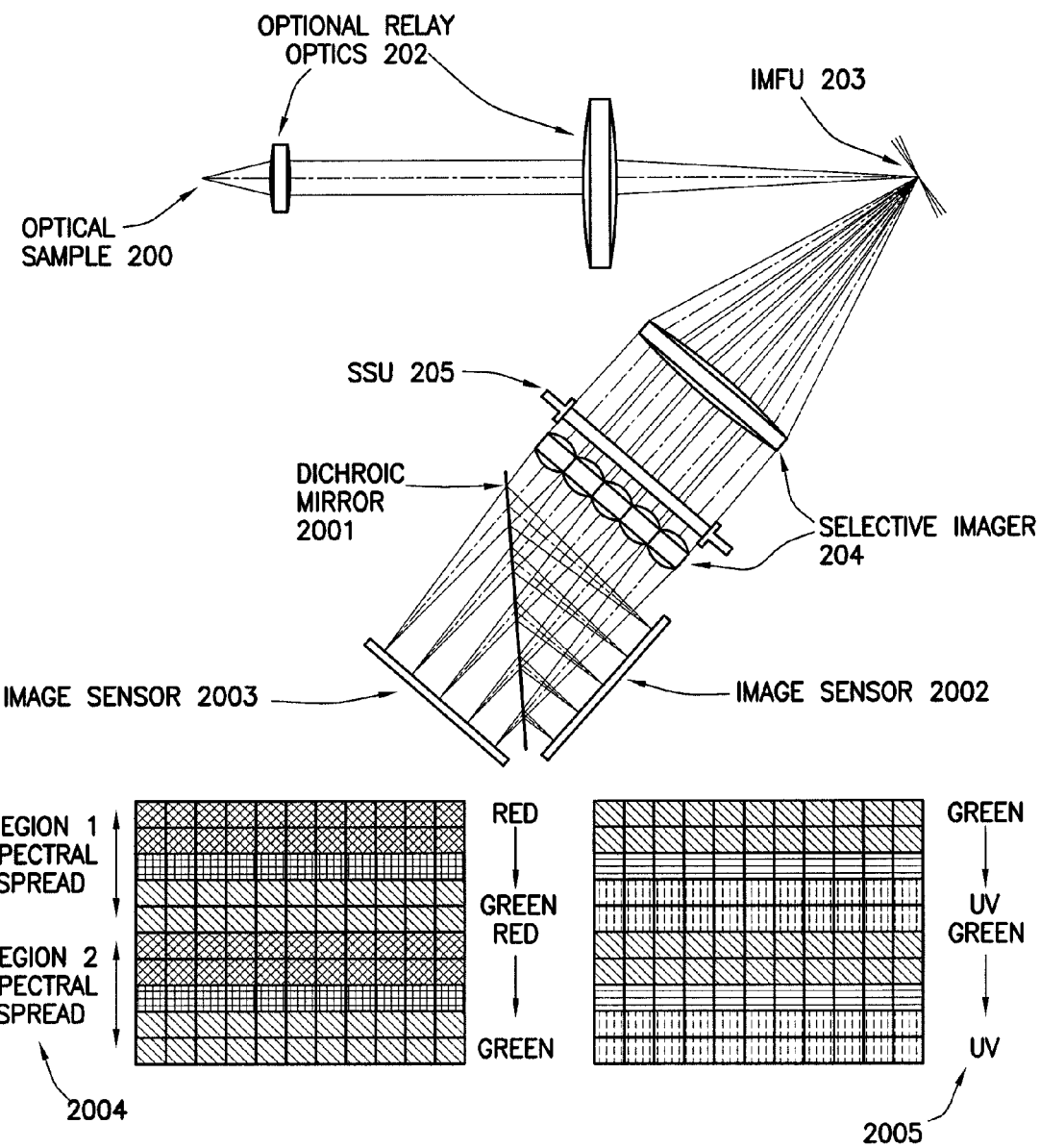

FIG. 20 illustrates a multi-spectral, or "increased range," IMS system, according to one embodiment of the disclosure.

FIG. 21 illustrates a multi-spectral, or "increased spectral range," IMS system using a single image detector, according to one embodiment of the disclosure. FIG. 21A illustrates an example of an unfiltered Image Sensor; FIG. 21B illustrates an example of a filtered image sensor; FIG. 21B illustrates an example of a filtered image sensor.

Figure 22:
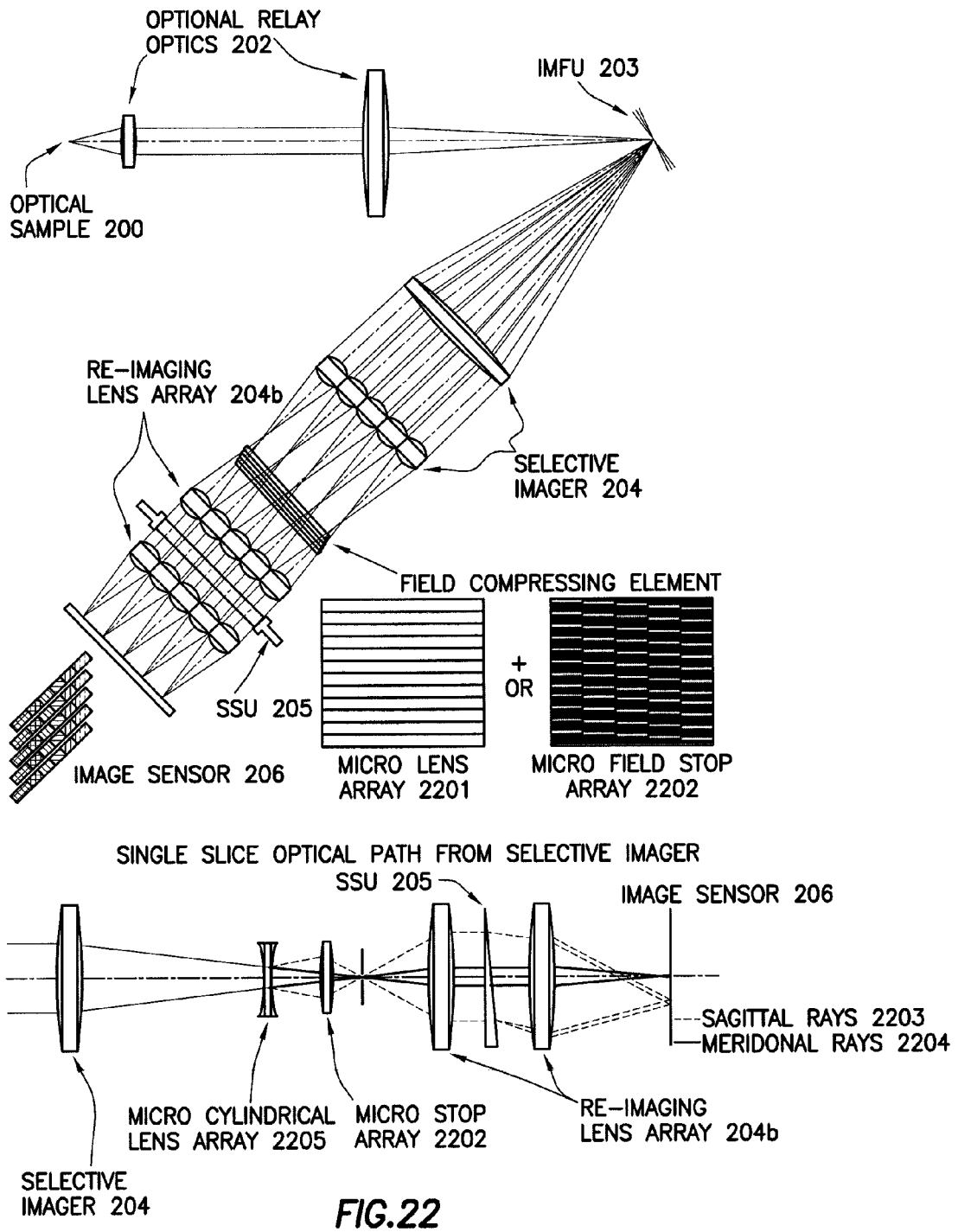

FIG. 22 illustrates an increased spectral sampling IMS system using field compressing components, according to one embodiment of the disclosure.

FIGS. 23 and 23A illustrate a dynamic IMS system, according to one embodiment of the disclosure.

Figure 24A:
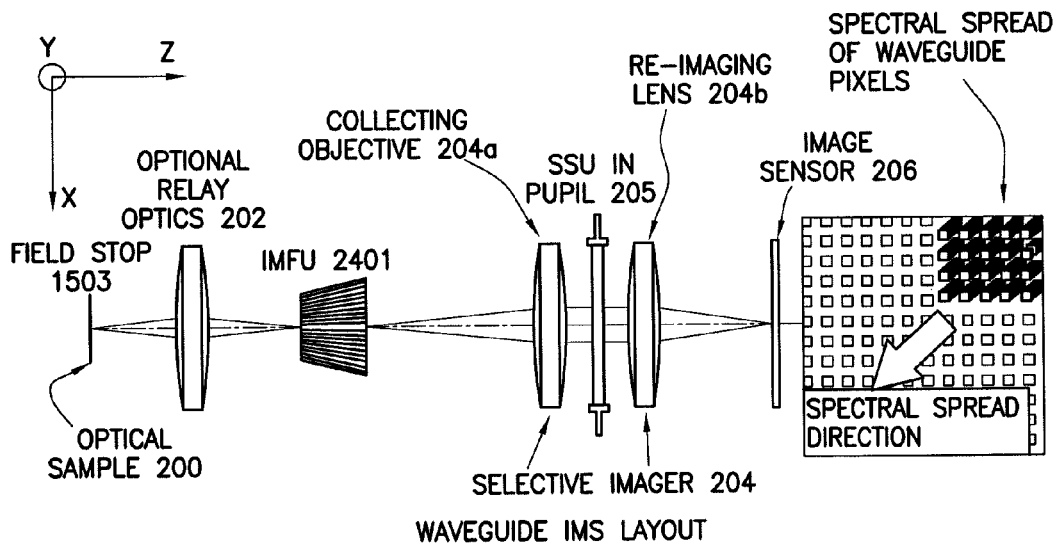
Figure 24B:
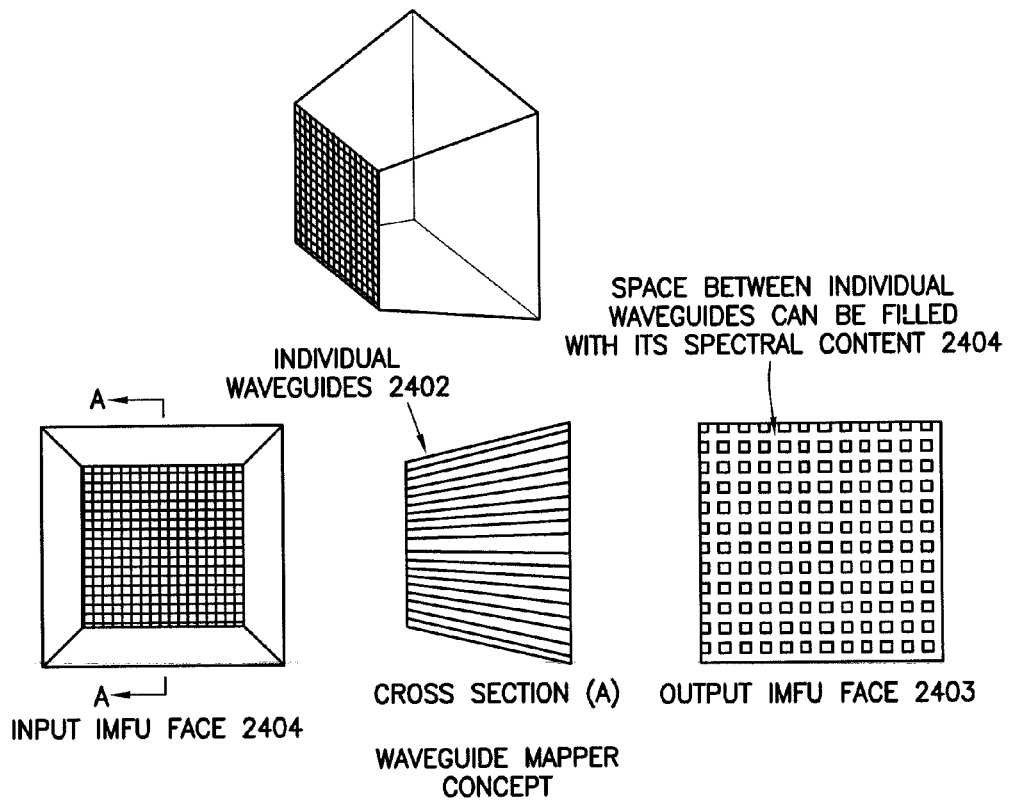

FIGS. 24A and 24B illustrate a waveguide IMS, according to one embodiment of the disclosure.

Figure 25:
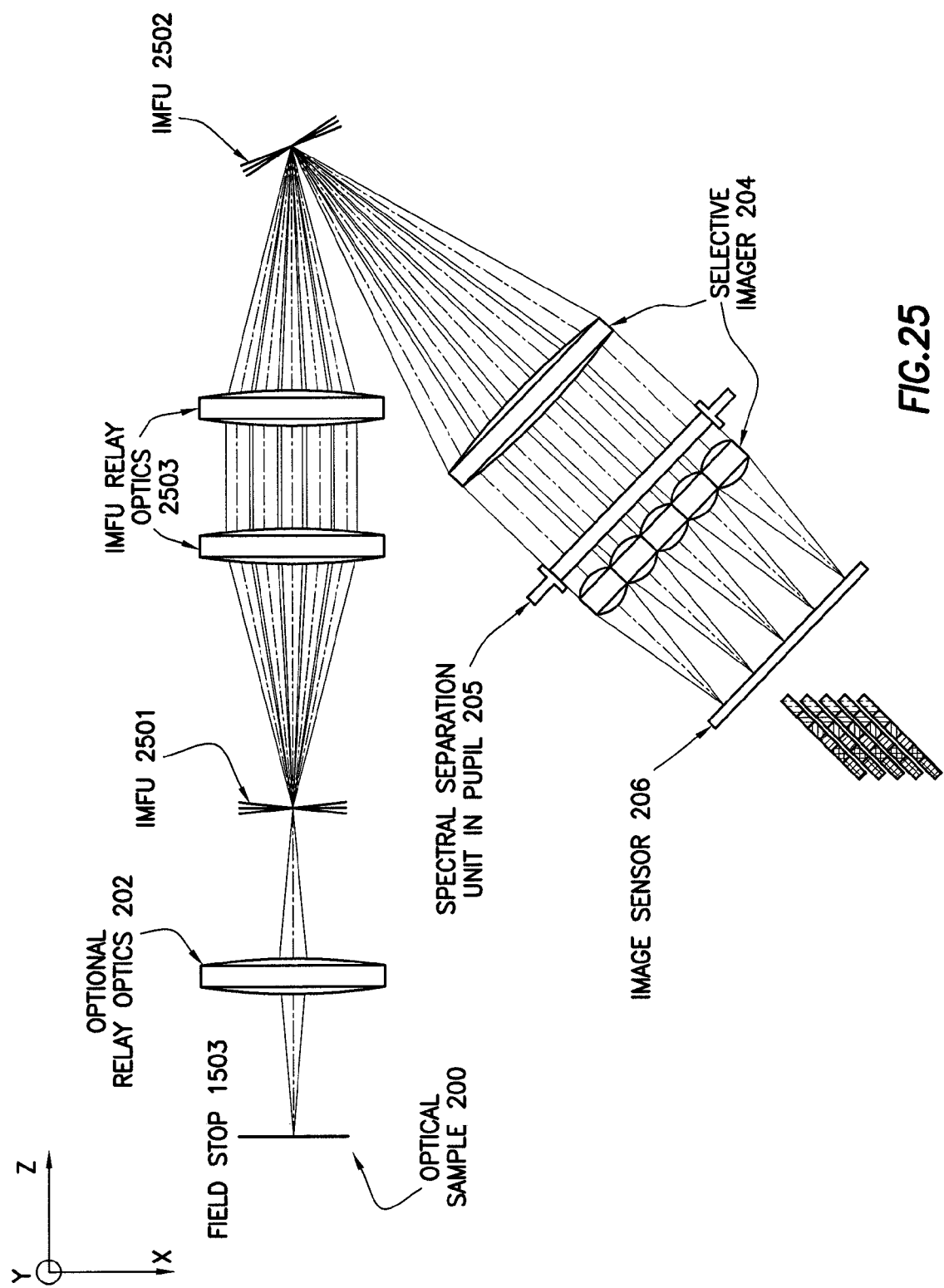

FIG. 25 illustrates an IMS system with multiple IMFUs, according to one embodiment of the disclosure.

Figure 26:
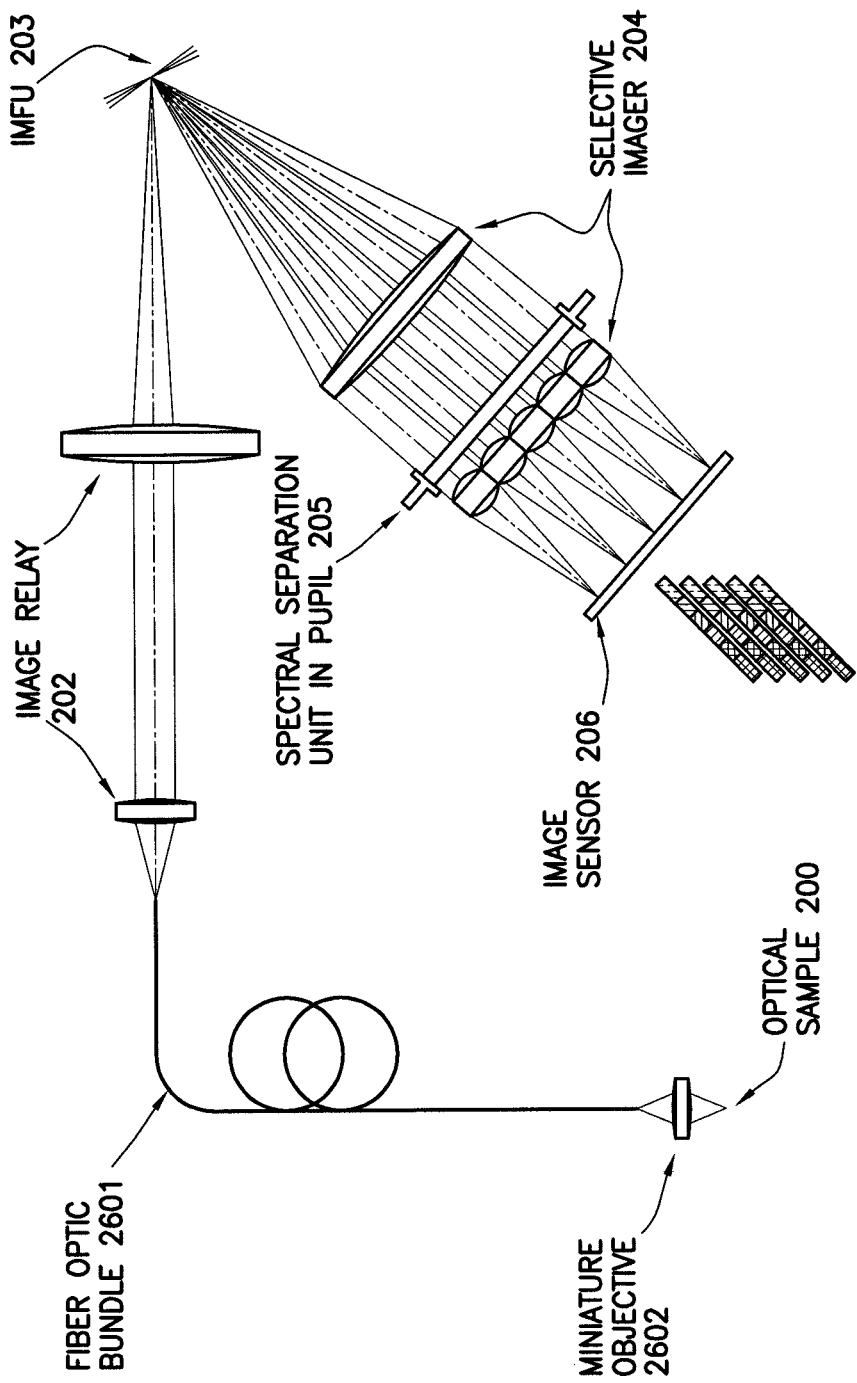

FIG. 26 illustrates an IMS system which may be well suited for endoscopic applications, according to one embodiment of the disclosure.

Figure 27:
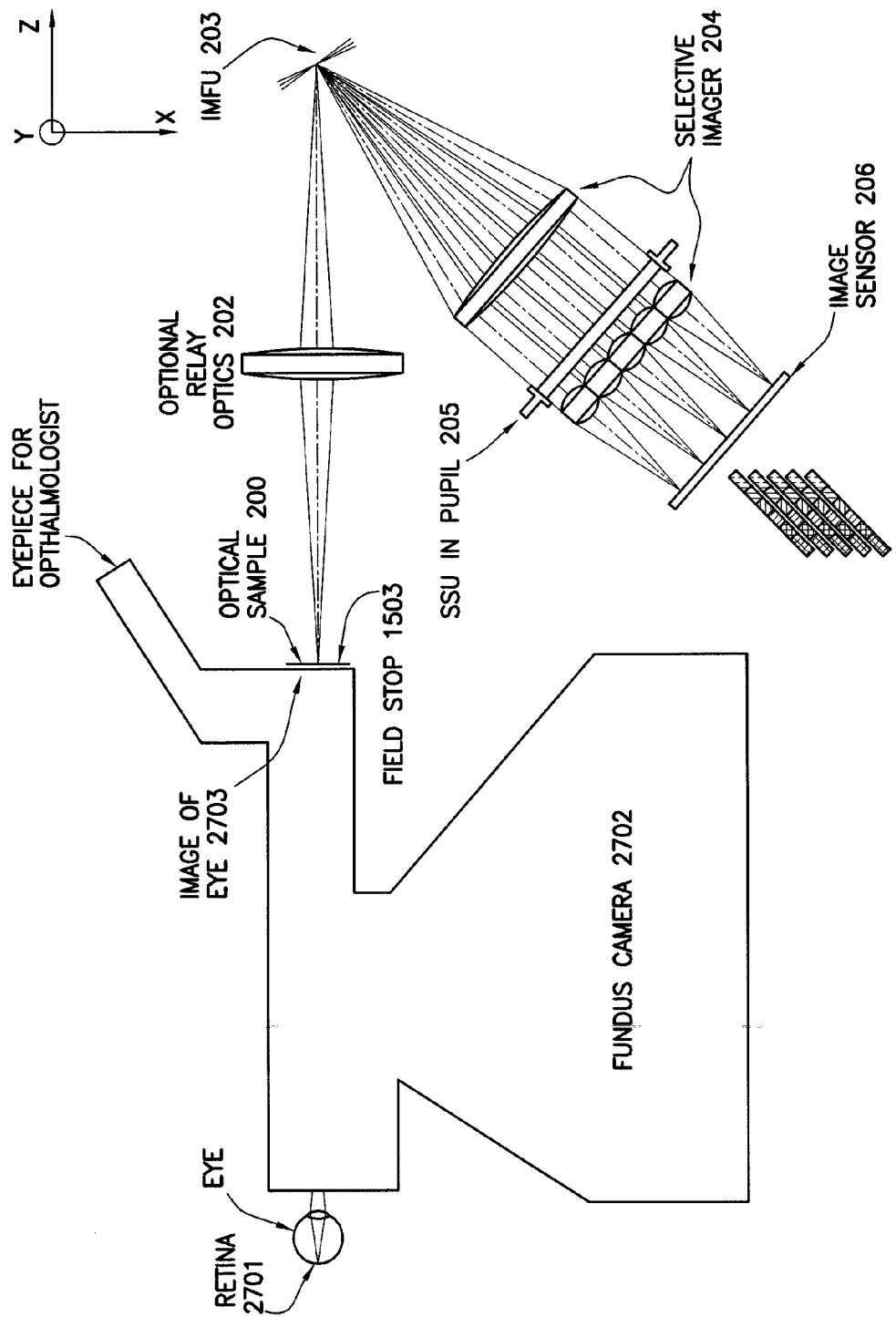
Figure 28:
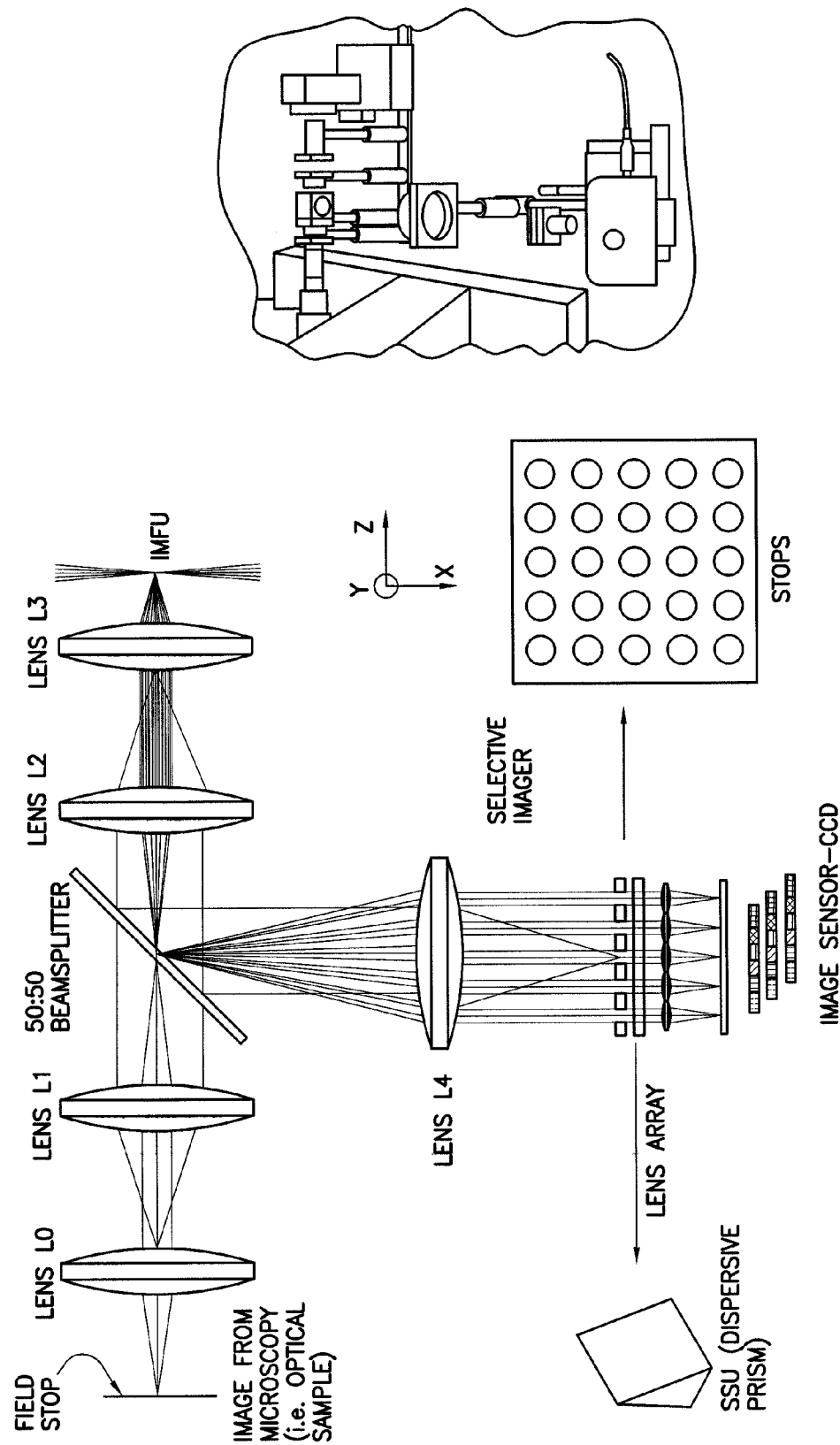

FIG. 27 illustrates an IMS system which may be well suited for ophthalmic applications, according to one embodiment of the disclosure FIG. 28 illustrates an example IMS system setup at the side port of an inverted microscope, according to one embodiment of the disclosure.

FIG. 29(*a*) shows an early IMFU, according to an embodiment of the disclosure. FIG. 29(*b*) shows the IMFU of FIG. 29(*a*) with a US Nickel for size reference. FIG. 29(*c*) illustrates a Zygo NewView 5000 3D image of the center region of ramp mirrors 1-5 of IMFU of FIG. 29(*a*); the false color shows depth information.

FIG. 30 illustrates images that results from the example system in FIG. 28. FIG. 30(*a*) illustrates a single sub-image of a 1951 USAF resolution test target; FIG. 30(*b*) illustrates a 1×5 pupil image; FIG. 30(*c*) illustrates an image from a halogen source; and FIG. 30(*d*) illustrates the spectral spread from source image spatial mapping lines.

Figure 31A:
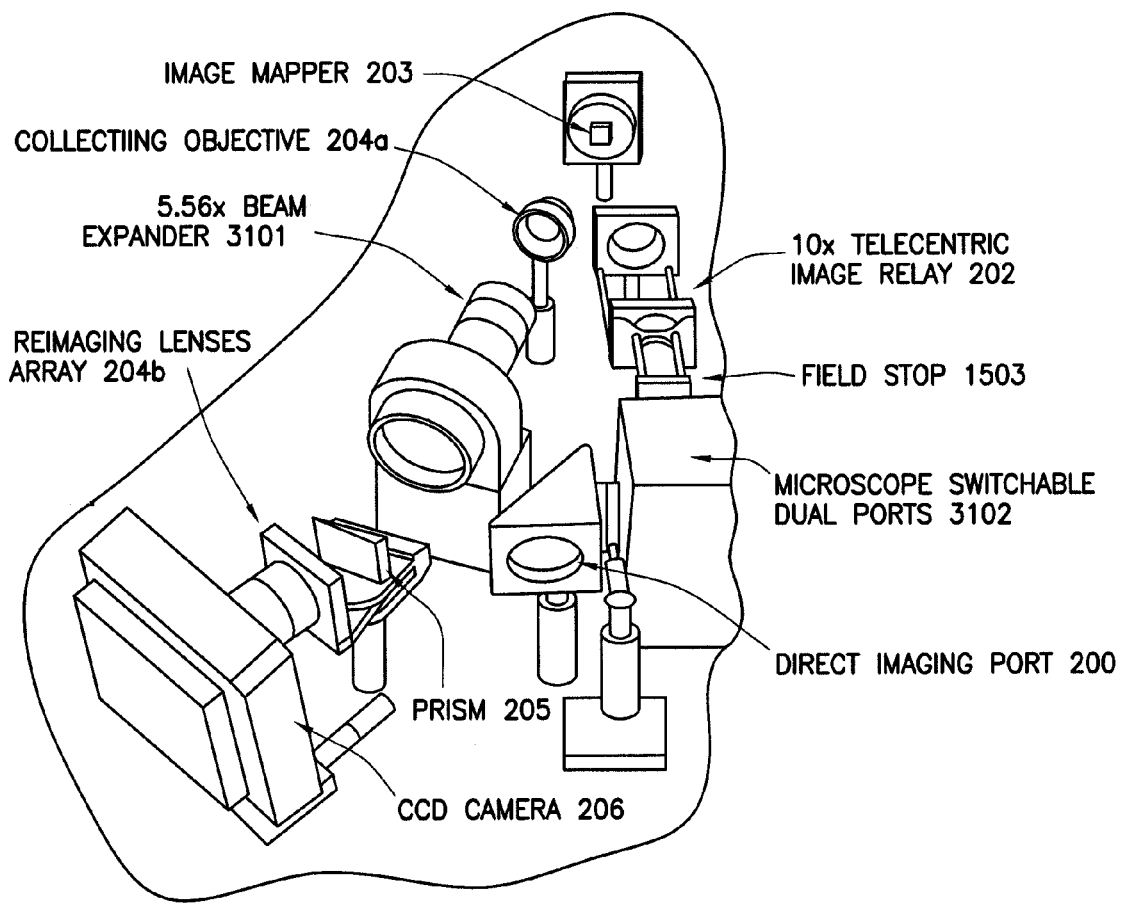
Figure 31B:
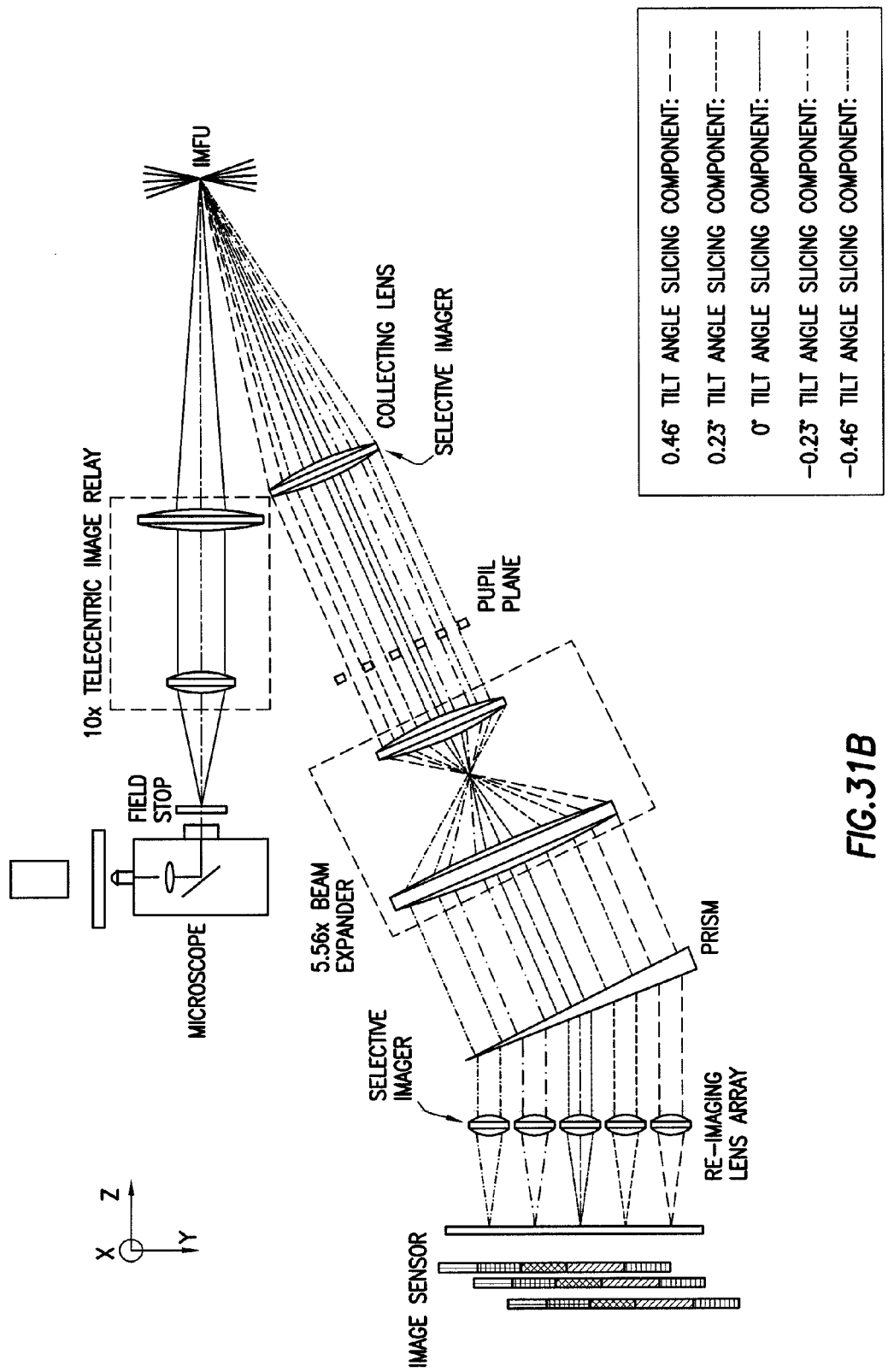

FIG. 31 illustrates an early IMS system, according to an embodiment of the disclosure. The IMS system may be capable of collecting a 3D (x, y, λ) datacube of 100×100×25 in a single integration event. FIG. 31(b) illustrates a schematic of the IMS system.

Figure 32:
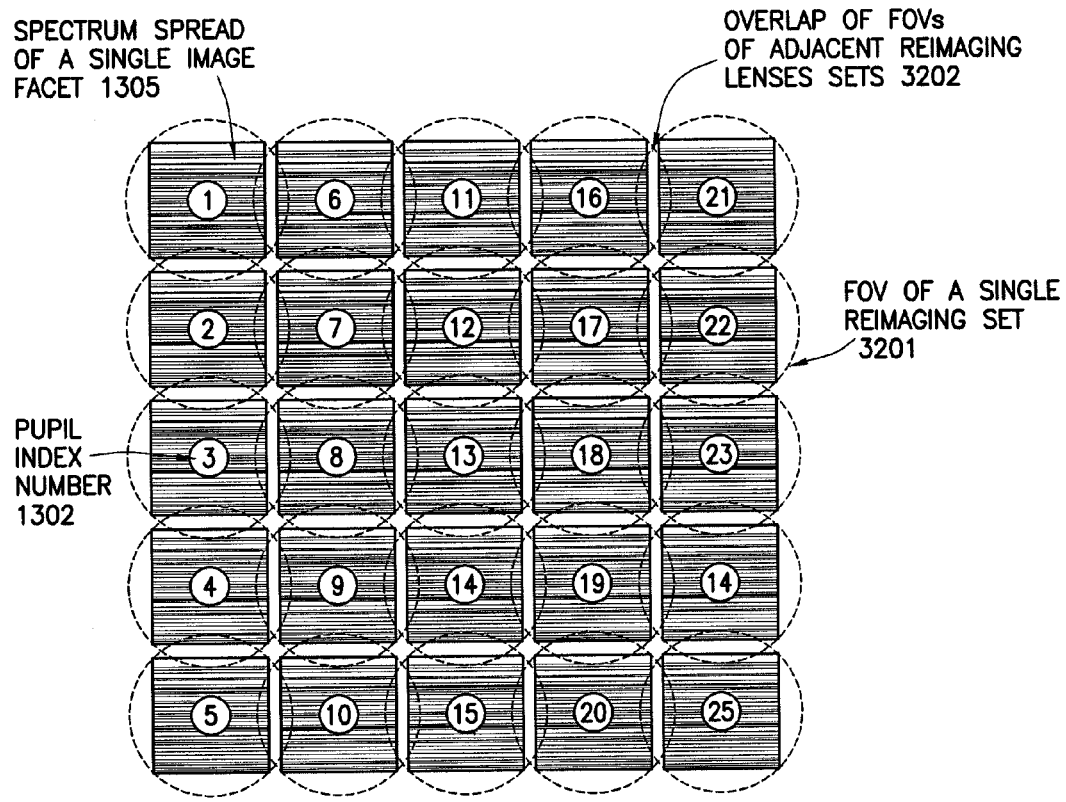

FIG. 32 illustrates overlap of the field of views ("FOVs") on the CCD camera, according to embodiments of the disclosure. The FOVs of adjacent reimaging lenses may overlap to fully utilize the CCD area.

Figure 33A:
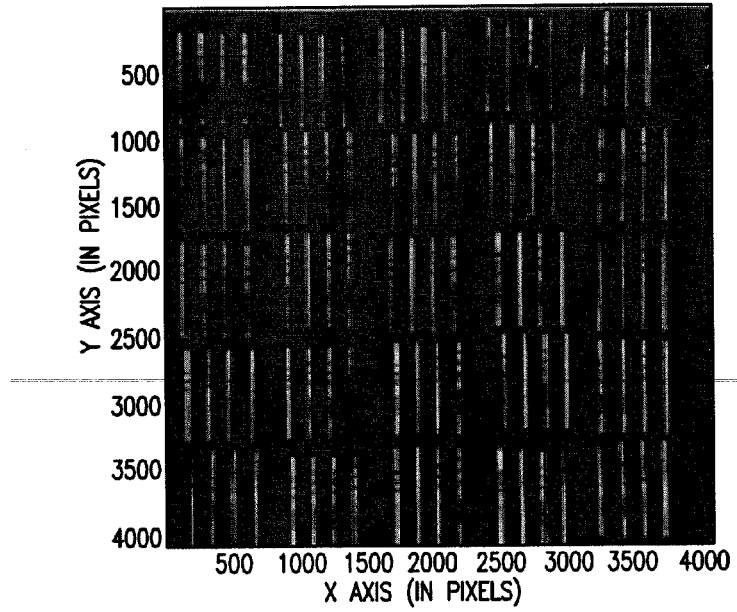
Figure 33B:
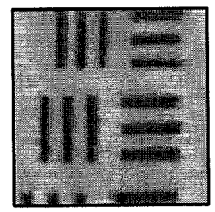
Figure 33C:
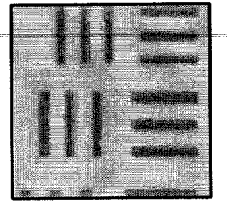

FIG. 33 illustrates a 1951 USAF resolution test target undispersed image, according to certain embodiments of the disclosure. The raw image (a) may be obtained using a 16-bit camera without binning (pixel size ~9 µm). FIG. 33(b) illustrates the reconstructed image. For comparison purposes, an image of the same bars is captured at the microscope side port directly using a monochromatic camera, as shown in (c). The top bars in the FOV belong to Group 7, Element 6 (bar width ~2.19 µm).

Figure 34:
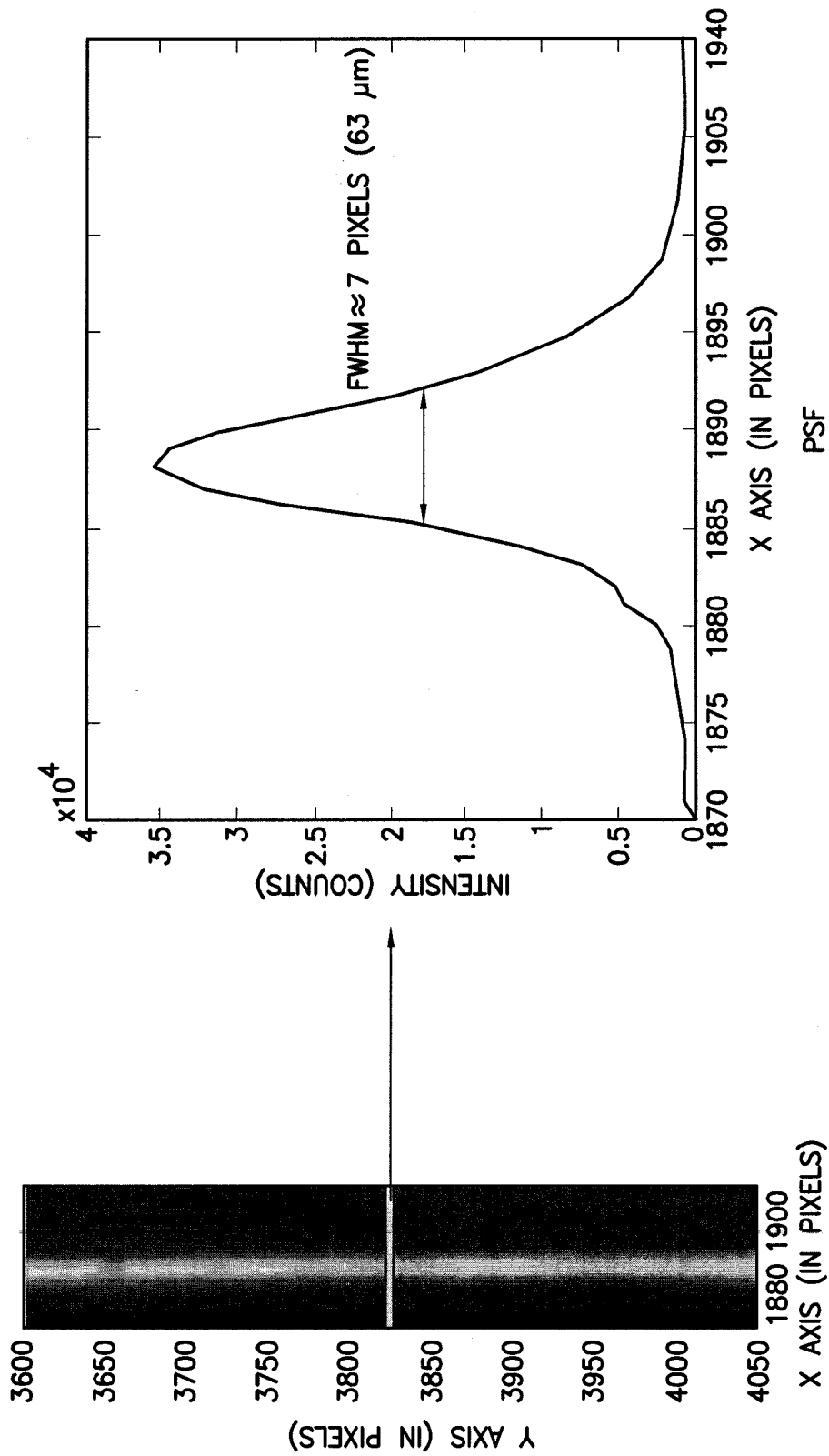

FIG. 34 illustrates the point spread function of a single mapping line from an undispersed image, according to an embodiment of the disclosure. The camera pixel size equals 9 µm. The x and y positions indicate the location in the image in the CCD camera's global coordinates.

FIG. 35 illustrates IMS images from a 100×100×25 system of green fluorescent beads, according to an embodiment of the disclosure. The raw image may be obtained using a 16-bit CCD camera with about 6 s integration time. The bead's spectrum may be obtained from point A in the reconstructed image.

Figure 36:
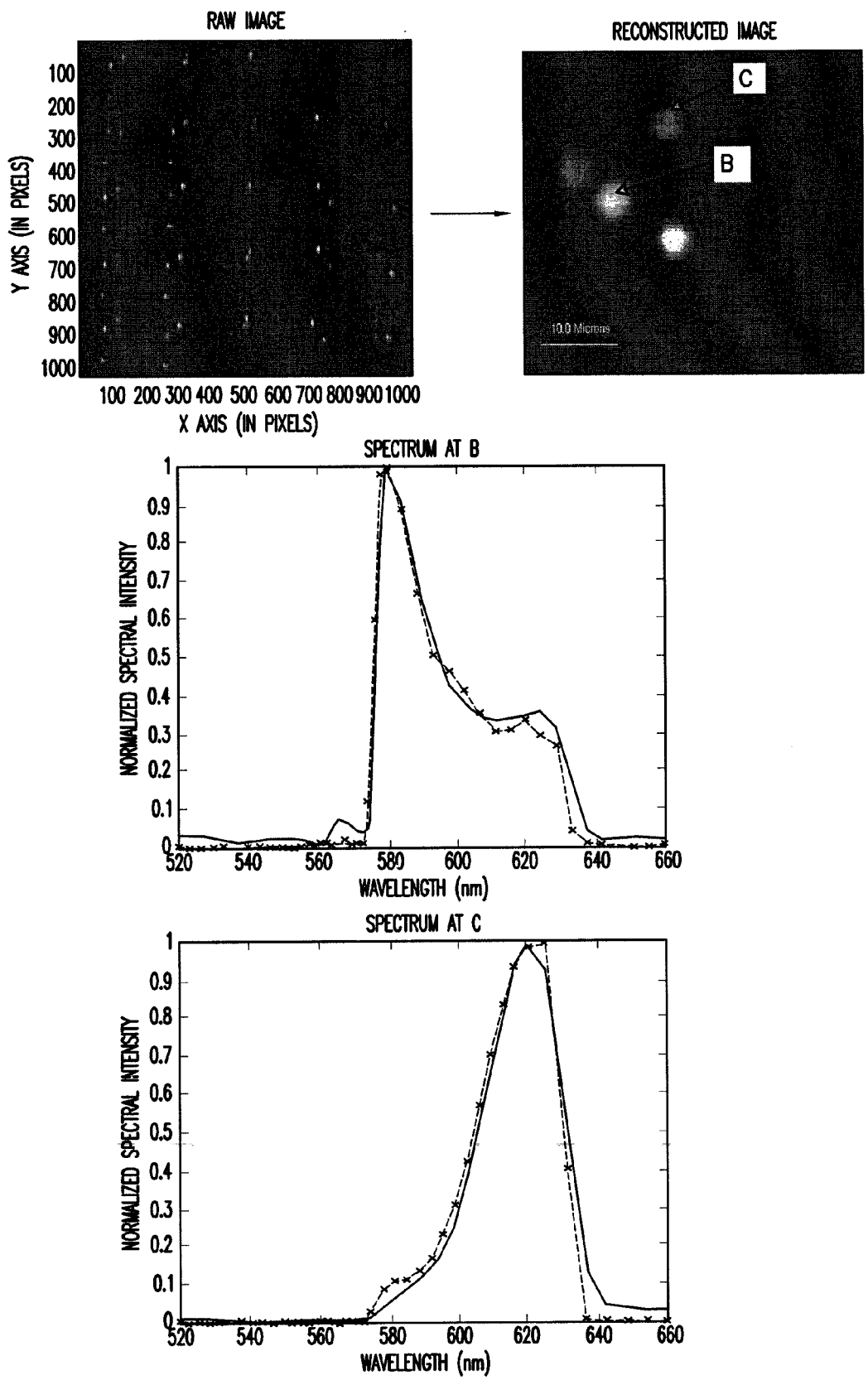

FIG. 36 illustrates IMS images of red and yellow fluorescent beads, according to an embodiment of the disclosure. The raw image may be obtained using a 16-bit CCD camera with about 2 s integration time. The yellow bead's spectrum may be from point B in the reconstructed image, and the red bead's spectrum may be from point C in the re-constructed image.

Figure 37:
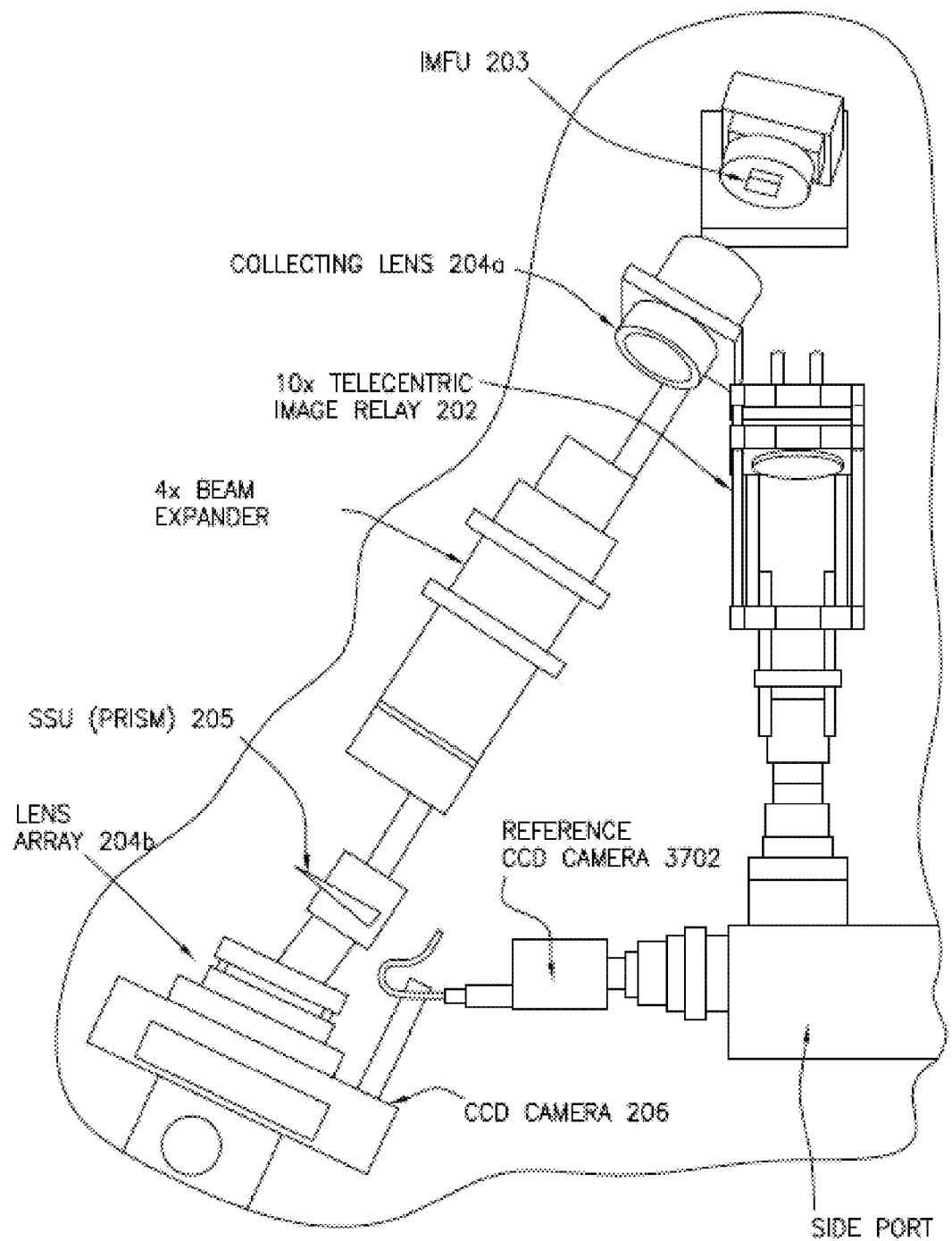

FIG. 37 illustrates a picture of an early IMS system, according to an embodiment of the disclosure. The IMS system may be capable of collecting a 3D (x, y, λ) datacube of 285×285×62 in a single integration event. The schematic for this system is similar to FIG. 31(b).

Figure 38:
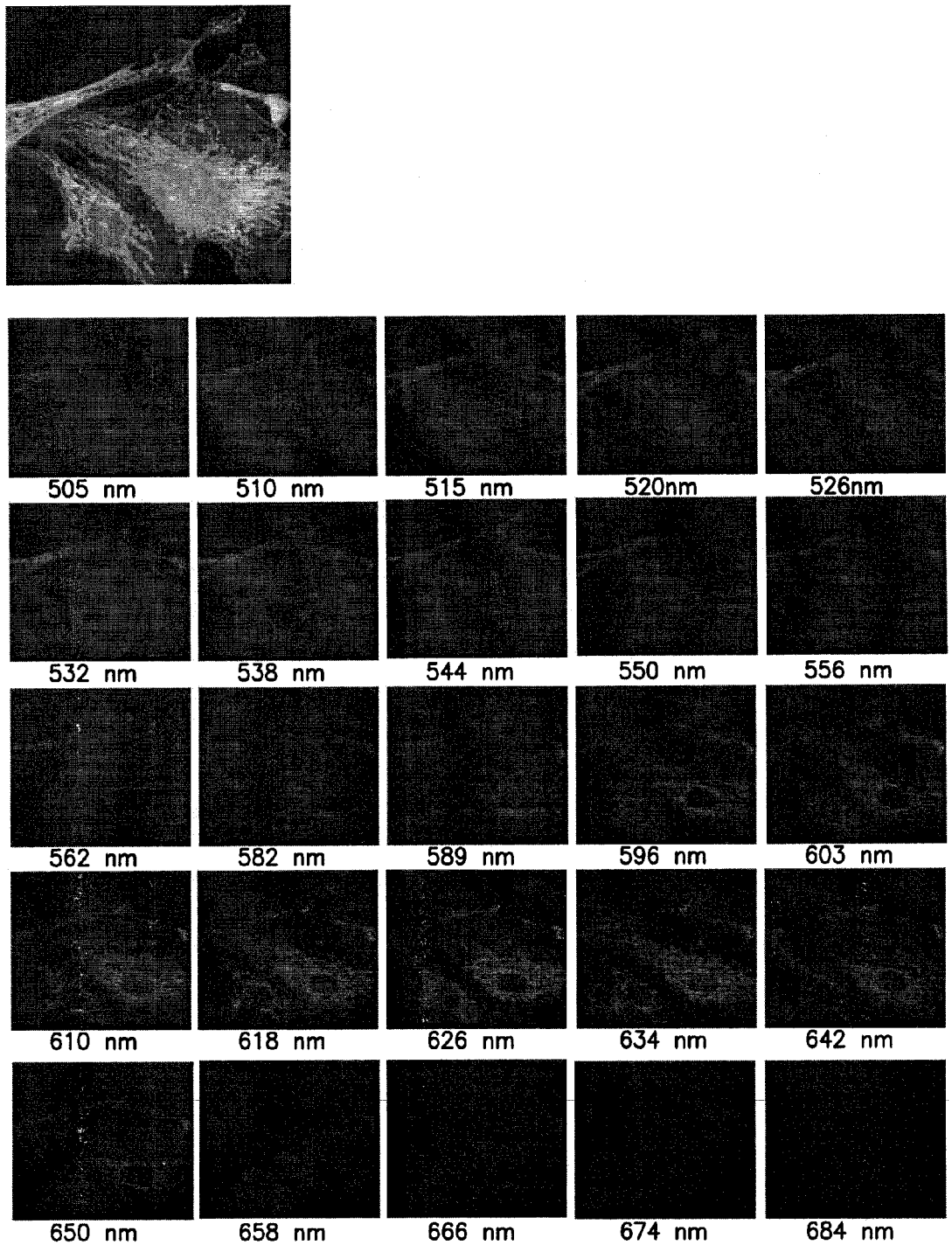

FIG. 38 (side) illustrates a biological sample imaged with a reference CCD. The biological sample comprises bovine pulmonary artery endothelial cells incubated with MitoTracker® Red CMXRos to label the mitochondria, BODIPY® FL phallacidin to label the filamentous actin (F-actin), and 4',6-diamidino-2-phenylindole ("DAPI") to label the nucleus. FIG. 38 (bottom) illustrates 25 spectral band images of the biological sample with about 5-8 nm spectral spacing from about 500-about 684 nm taken with IMS system, according to an embodiment of the disclosure.

Figure 39A:
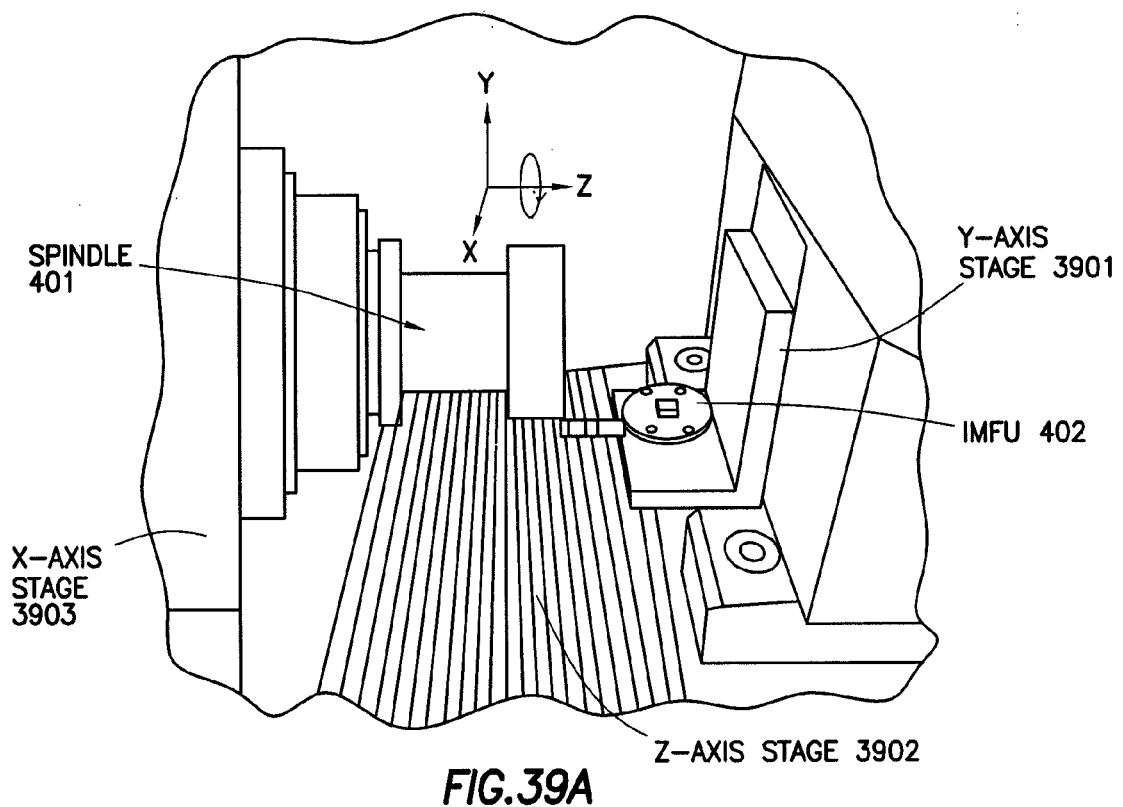
Figure 39B:
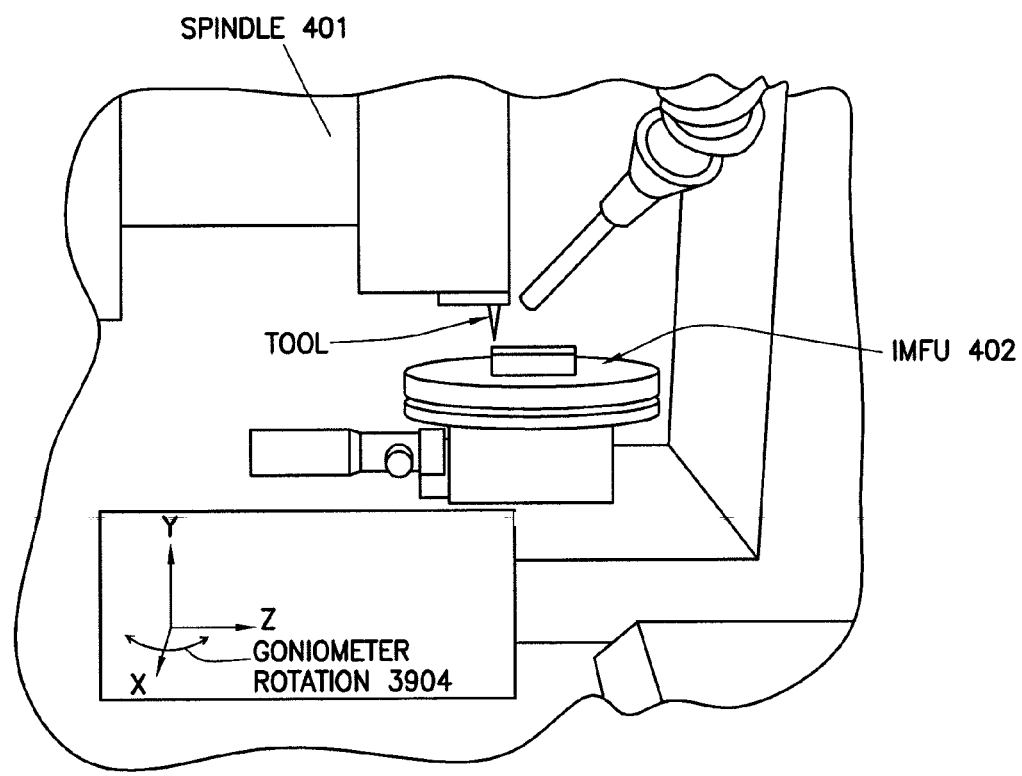

FIG. 39(a) illustrates a Nanotech 250 UPL Machine with axis labeled for manufacturing an IMFU, according to embodiments of the disclosure. FIG. 39(b) illustrates a close up of a goniometer fixture used to rotate the IMFU for fabrication of x-tilt mirror facets.

Figure 40A:
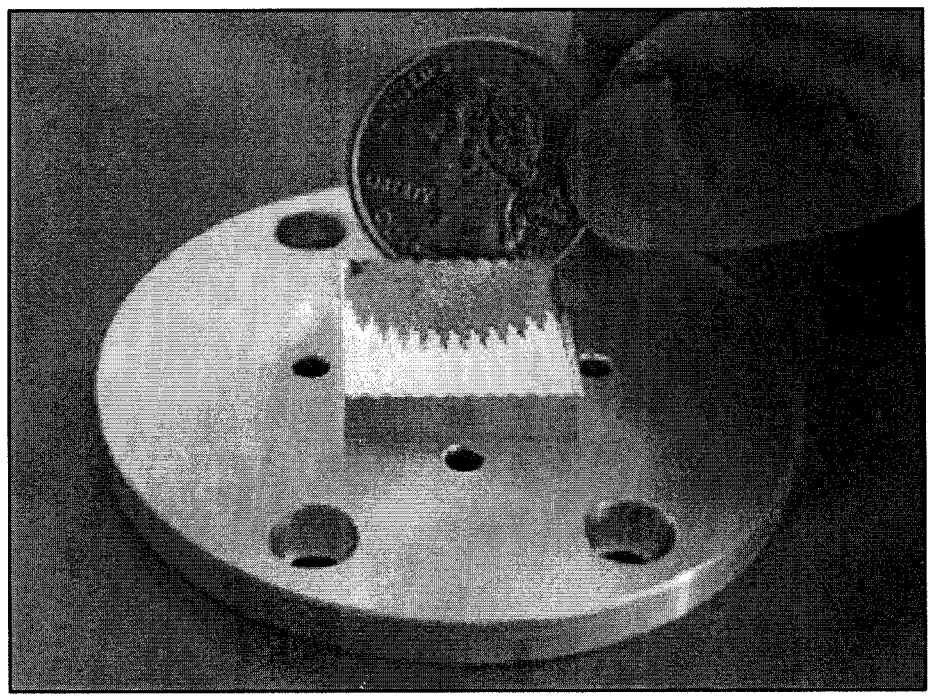
Figure 40B:
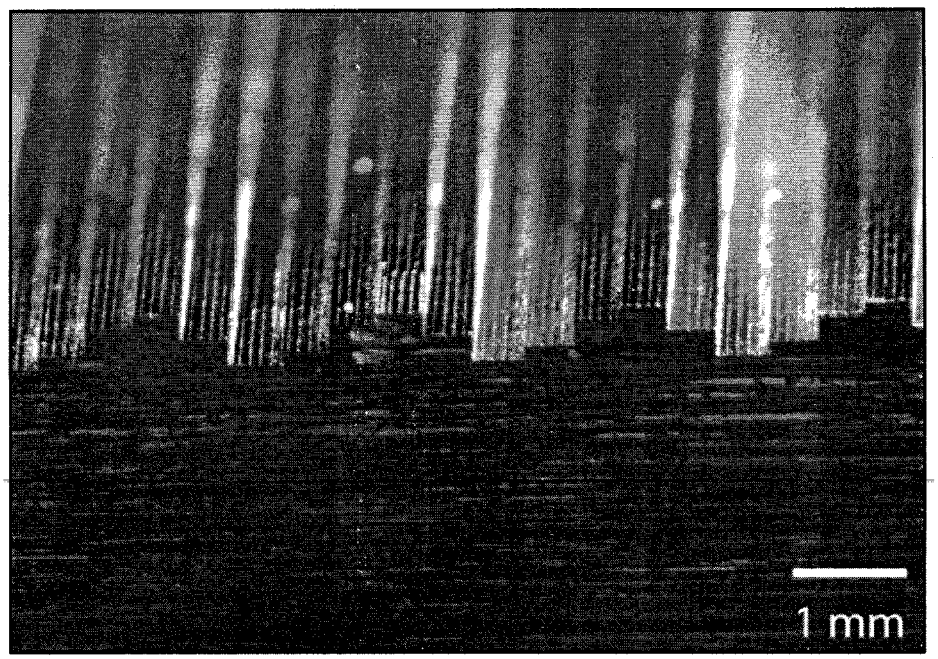

FIG. 40(a) illustrates a top view of a large format IMFU, having 285 mirror facets and 25 tilts in the x- and y-axis, with a US Quarter for size comparison, according to an embodiment of the disclosure. FIG. 40(b) illustrates a side view close-up of the large format IMFU of FIG. 29A.

Figure 41:
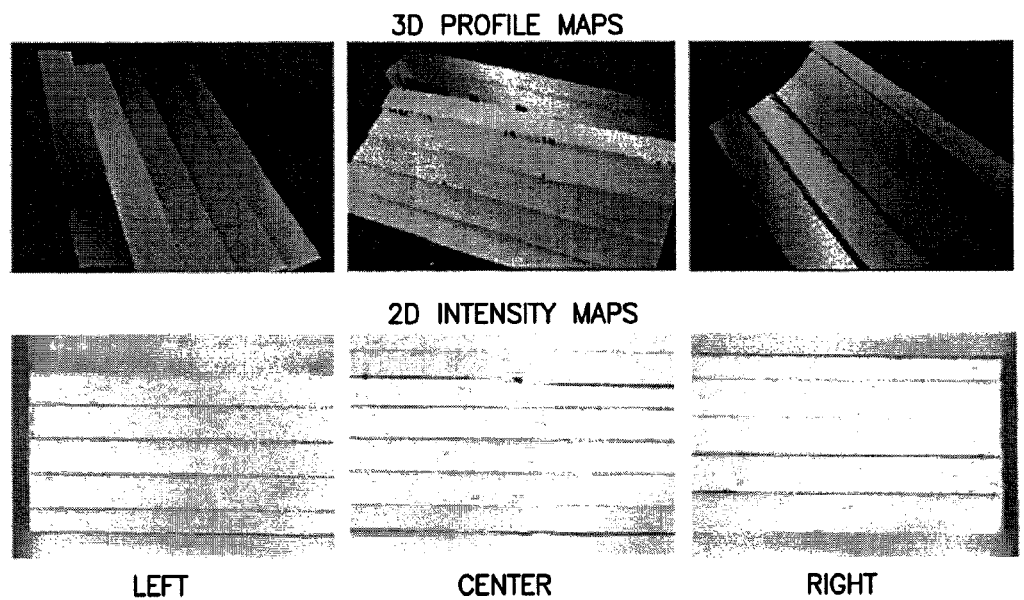

FIG. 41 illustrates white light interferometer surface profile measurements of individual mirror facets in a large format IMFU taken at the (a) left edge, (b) center, (c) right edge of the component, according to an embodiment of the disclosure.

Figure 42:
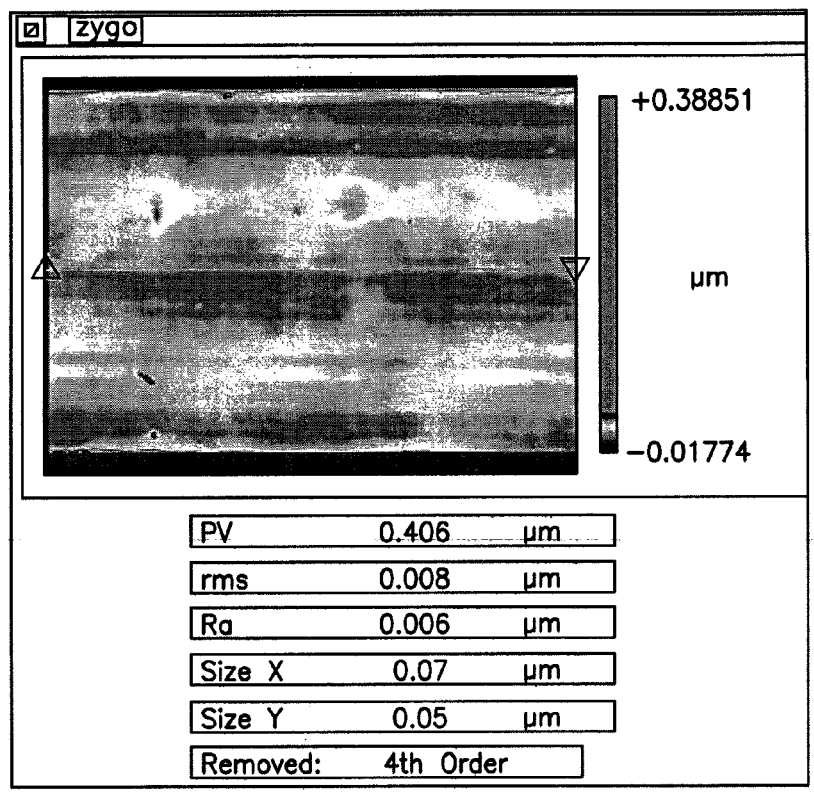

FIG. 42 displays typical roughness results obtained from a large format IMFU (285 mirror facets) fabricated using a 75 micron wide surface shaped diamond tool, according to an embodiment of the disclosure.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present disclosure is generally in the field of hyperspectral and multispectral imaging. More particularly, the present disclosure, according to certain embodiments, relates to compact Image Mapping Spectrometer ("IMS") systems and methods.

In the context of this document, the term "mapping" generally refers to a process by which data is transformed to form a final image. In a typical imaging system, a mapping transformation may be linear, often having axial symmetry. Mappings may also include any process that may be of a certain arrangement or orientation, thereby enabling spectral and spatial information to be collected in parallel.

As used herein, a "lens" generally refers to any optical component or combination of multiple optical components with a combined optical power. A lens may comprise one or more refractive components, one or more diffractive components, one or more reflective components, and any combination of refractive, diffractive, and/or reflective components.

As used herein, a "mapping line" generally refers to a 1-dimensional collection of points, either through the entire optical sample or a portion of the optical sample. A "mapping pixel" generally refers to a single point from any location within the optical sample. A "mapping region" generally refers to a 2 dimensional, contiguous collection of points, either through the entire optical sample or a portion of the optical sample. A "tilt" generally refers to the direction that the chief ray, or center optical ray, propagates to or from a point within the optical sample.

As used herein, an "aperture stop," or "stop," generally refers to a physical component that limits a bundle of light from an axial point in an optical sample. An image of the stop in any optical space in the optical system may be referred to as a "pupil." In some cases, the stop of an optical component may be referred to as the pupil, as they are conjugate images of one another, and they serve the same function for that example.

The present disclosure provides, according to certain embodiments, an Image Mapping Spectrometer (IMS) useful for hyper- and multispectral imaging based on image mapping principles. Devices and methods of this disclosure may be applied to biological and medical imaging, bio-computing, surveillance applications, remote sensing (for example missile defense, detection of improvised explosive devices, field detection, bio-chemical detection), atmospheric imaging (for example in meteorology or pollution screening), food inspection, and numerous other applications requiring real time spectral imaging (for example, Raman Spectroscopy, coherent anti-Stokes Raman scattering ("CARS"), and Spectro-Polarimetry and Polarimetry). An IMS may acquire spectral information instantaneously, without the need for scanning. An IMS may acquire a great deal of image and spectral data in parallel. For example, an IMS may acquire about 1 million voxels at once. In some embodiments, an IMS may acquire about 5.2 million voxels at once, while other embodiments may provide for simultaneous acquisition of between about 16 million and about 100 million voxels. An IMS may transmit image data to remote locations, for example, locations separated by great distances (longer than about 10 m) and/or locations which do not allow line-of-sight viewing. Advantages of a scan-less system include, for example, high optical throughput, fast image acquisition, and high spectral/spatial correlation. To create an image, an IMS may require very limited processing (image re-mapping), thereby providing a fast, unambiguous, and straightforward procedure. There are several applications in which this is beneficial; one such application is in the area of fluorescence spectral imaging for simultaneous high-resolution sub-cellular microscopy of multiple fluorescence probes in living cells.

The present disclosure also provides, according to certain embodiments, an IMS coupled with one or more other imaging systems such as, for example, microscopes, endoscopes, point-of-care ("POC") devices, cameras, night-vision instruments, and the like. An IMS also may be applied to any electromagnetic radiation, for example, spectral bands from ultraviolet, visible, and infrared radiation. It also may be possible to combine spectral ranges such as: visible and near infrared, midwave infrared, long-wave infrared, and many other regions to create multi-band implementations.

The present disclosure also provides, according to certain embodiments, a spectral imaging method capable of acquiring full spectral information simultaneously on an array detector or a combination of array detectors (for example a IMS may use a large format detector or several detectors). Without limiting the invention to a particular theory or mechanism of action, it is nevertheless currently believed that an IMS works by spatially redirecting image mapping regions to obtain space between the detectors/pixels. Then, through the use of diffractive, refractive, and/or combined components, an IMS may fill this space with spectral information from these redistributed image zones. This final spatially and spectrally redistributed image may be detected and/or recorded by an Image Sensor (for example a charge-coupled device ("CCD"), complementary metal oxide semiconductor ("CMOS"), array of photodiodes, avalanche photodiodes, array of photomultiplier tubes, thermal detectors, and others), thereby providing unambiguous 3-dimensional (x, y, λ) information (sometimes referred to as a "datacube") on the Image Sensor.

By way of explanation, and not of limitation, the operating principle of the proposed IMS instrument is shown in FIG. 1. As an example, consider a simple optical sample which consists of 4 spectral bands with no color overlap for various object points (FIG. 1A). First, selected rows of a 3D (x, y, λ) object may be shifted and imaged onto a large format Image Sensor to create an area for spectral spread (FIG. 1B). This area is represented in the figure with white squares (individual detectors of an Image Sensor 206). After the row shifts, they may be dispersed into the perpendicular direction to allow acquisition of 3D (x, y, λ) information in a single image (FIG. 1C). In other words, spatial and spectral information may be encoded in a single snapshot, and every spatial-spectral component may be mapped to a different detector of an Image Sensor. The significance of such an approach becomes profound for objects with numerous spectral bands at the same spatial location. An example of such an object is shown in FIG. 1D.) Using traditional imaging, several wavelength bands may be integrated by the same detector, and the spectral signature may be lost (FIG. 1E), while it is preserved with the IMS mapping techniques (FIG. 1F).

Note that the total number of x, y, and λ elements typically will not exceed the total number of detectors on the Image Sensor to provide unambiguous and direct spatial-spectral information. As used herein, "unambiguous" generally refers to a direct, one-to-one correspondence between the smallest data volume, commonly called a voxel, from the 3D (x, y, λ) datacube, and the individual detectors, from the 2D Image Sensor. For example, a 1024×1024 detector Image Sensor can acquire 256×256×16 or 512×512×4 datacubes unambiguously, where the first two numbers denote the quantity of spatial elements in the x and y directions, and the third number represents the number of spectral bands. After image acquisition, the data may be re-mapped and processed (commonly with the use of certain computers and/or software) to display a live color image on the computer screen from which a spectrum can be obtained in real time at each mapping pixel. Note that ambiguous data can also be collected to further enhance the spatial/spectral sampling; however this may require image processing techniques and may, therefore, result in slower image display.

Figure 1F:
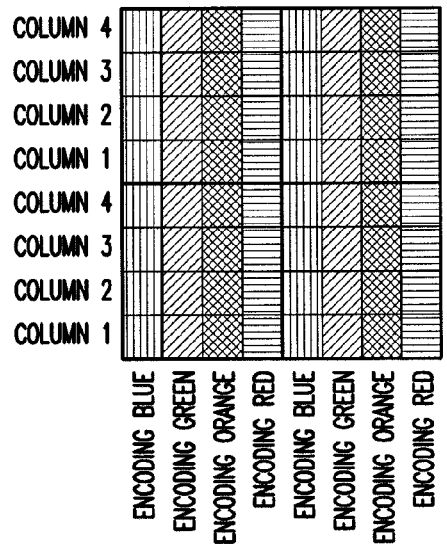
FIG. 1 illustrates an imaging sequence of 3D Object Cube to charge-coupled device ("CCD") array according to one embodiment of an Image Mapping Spectrometer ("IMS") system.
Figure 1C:
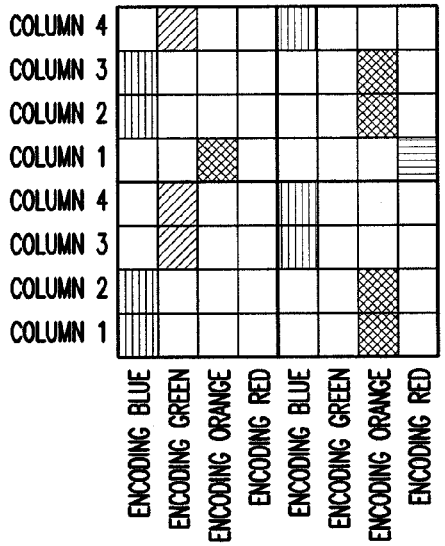
Figure 1E:
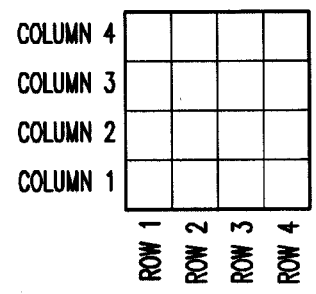
Figure 1B:
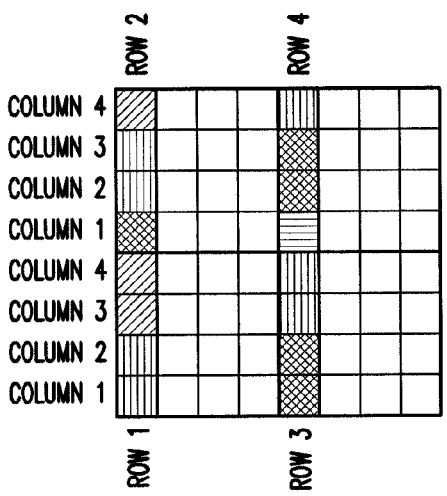
Figure 1D:
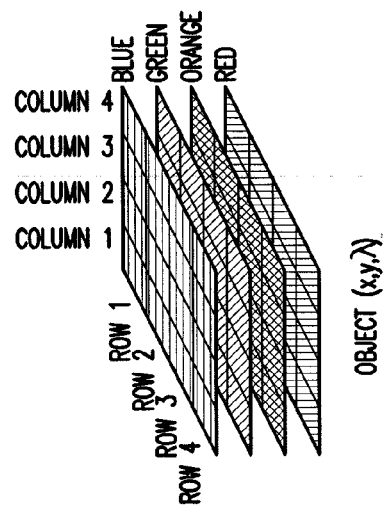
Figure 1A:
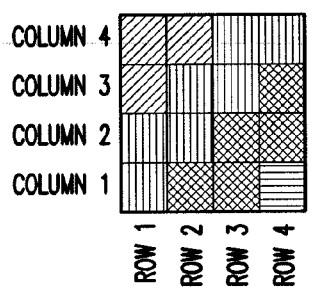
Figure 2:
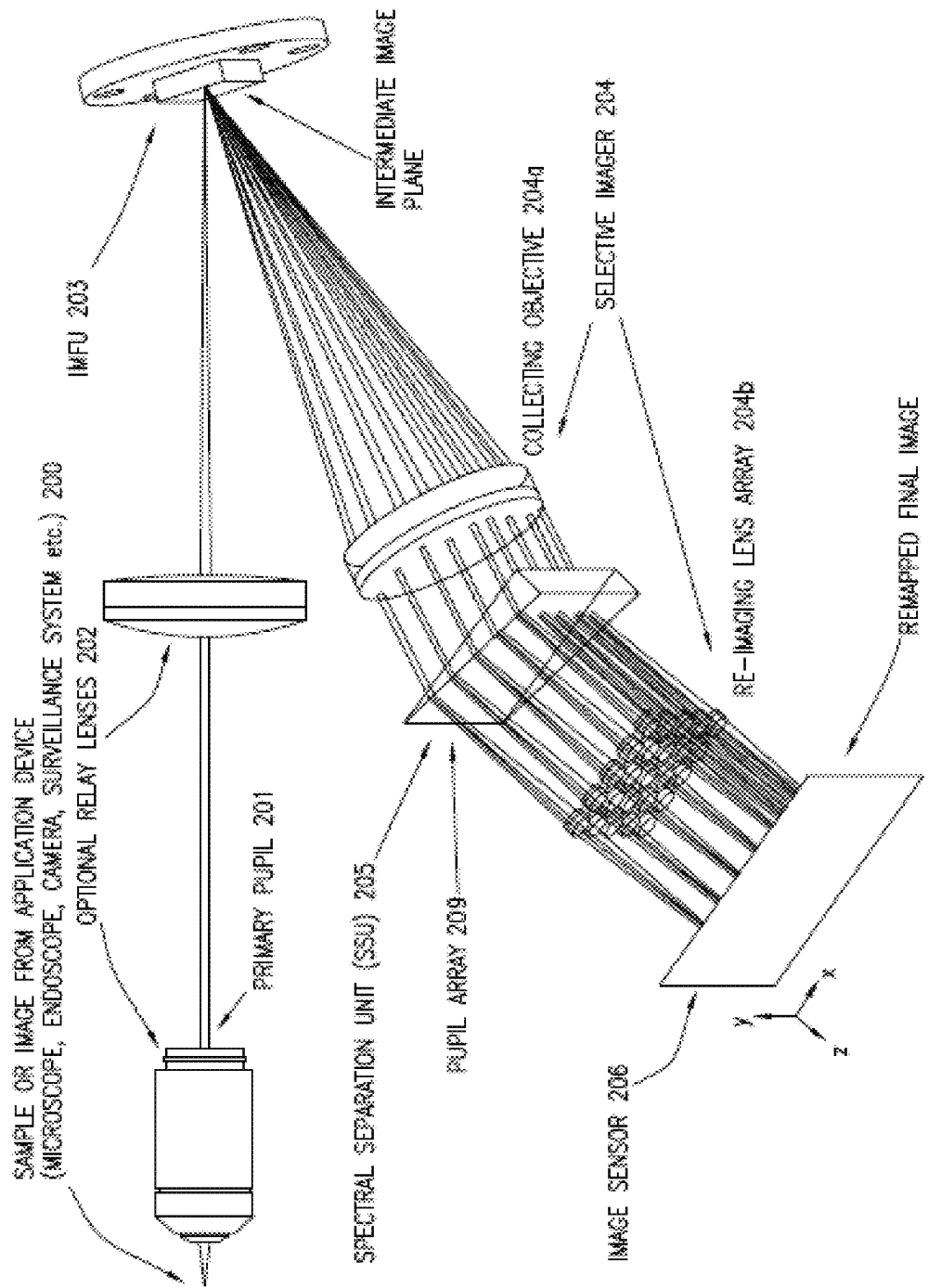
FIG. 2 illustrates the basic configuration for an IMS system, according to an embodiment of the disclosure.
Figure 3A:
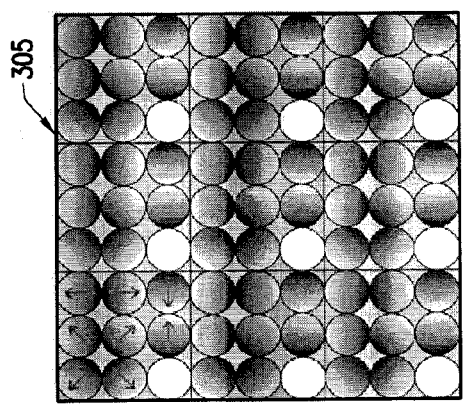
FIG. 3 illustrates examples of possible image mapping field unit ("IMFU") designs, according to embodiments of the disclosure.
Figure 3B:
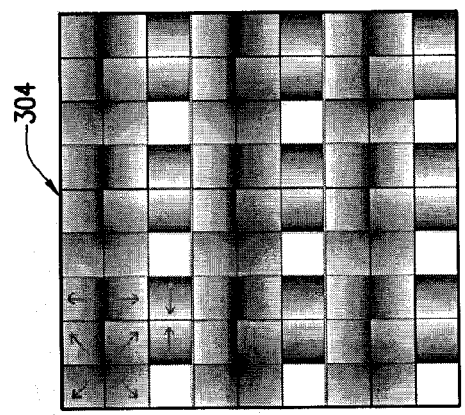
Figure 3C:
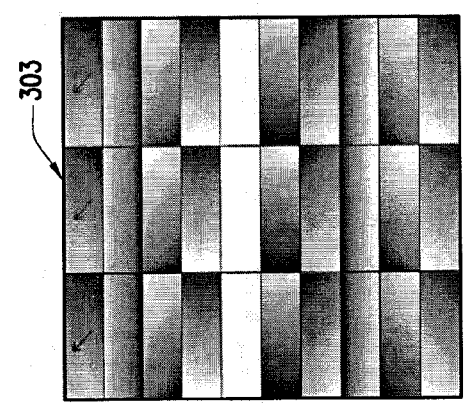
Figure 3D:
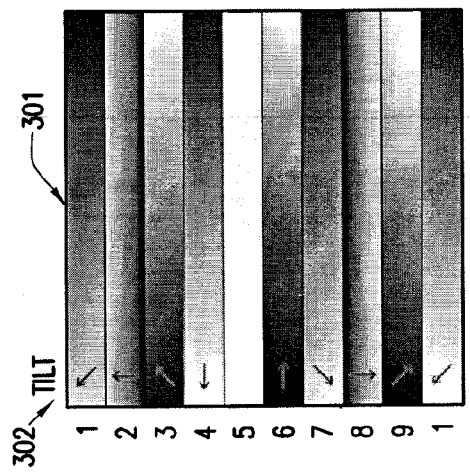
Figure 3G:
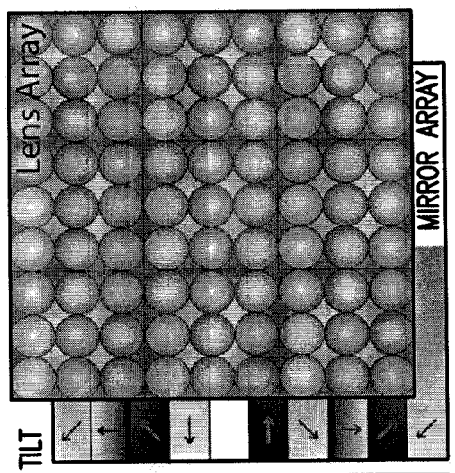
Figure 3F:
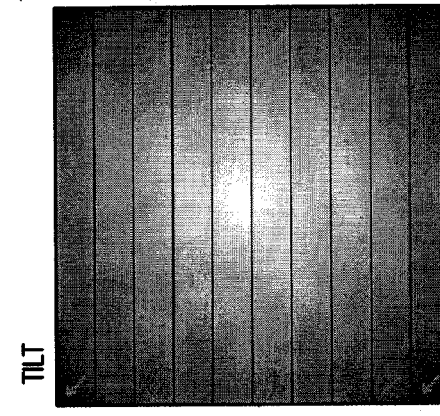
Figure 3E:
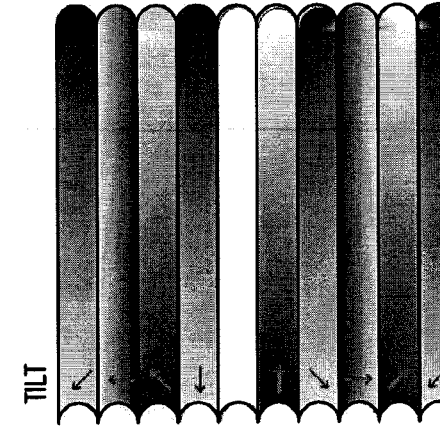

In general, an IMS of the present disclosure comprises an Image Mapping Field Unit ("IMFU"), a Spectral Separation Unit ("SSU"), and a Selective Imager. An IMS may be designed as an autonomous instrument that can be used on its own or combined with other research or diagnostic tools (inverted microscope 1705, endoscope, and the like). A conceptual view of an example IMS layout is presented in FIG. 2. Therein, an optical sample 200 (not shown) is imaged by the IMS. The optical sample may be a physical object, an image from a pre-imaging system, or a conjugate image of either. The optical sample may provide electromagnetic radiation for IMS imaging through any mechanism, such as transmission, reflection, or fluorescence. The electromagnetic radiation may be first collected through a primary pupil 201. The primary pupil 201 may be preceded and/or followed by one or more optional relay lenses 202. In the embodiment shown in FIG. 2, an optional relay lens 202 both precedes and follows the primary pupil 201. An optional relay lens may be any optical component which is capable of relaying an image from the optical sample to the IMFU 203. For example, an optional relay lens may be a lens, an array of lenses, a gradient-index ("GRIN") lens, an optical fiber or a bundle of optical fibers. (Fiber optic optional relay lenses may be especially beneficial in endoscopic applications.) The electromagnetic radiation then impinges upon the IMFU 203. As will be discussed further below, the IMFU 203 spatially reorganizes the image, also called "image mapping" or "mapping," as it redirects the electromagnetic radiation towards the Selective Imager 204. The IMFU may be located generally at any virtual or real image conjugate location, or field space, or within a millimeter or less from an image conjugate location. The Selective Imager 204 generally comprises two spatially separated components: (1) a collecting objective or array of collecting objectives 204a, and (2) an array of re-imaging lenses 204b. As shown in FIG. 2, the SSU 205 may be positioned between the two components of the Selective Imager 204. The SSU may be located generally at any pupil conjugate location, or aperture space, or within several millimeters or more from a pupil conjugate location. For example, the SSU 205 may be positioned between the primary pupil 201, and the IMFU 203, between the IMFU 203 and the Selective Imager 204, or between the Selective Imager 204 and the Image Sensor 206. Finally, the electromagnetic radiation may impinge upon the Image Sensor 206. The Image Sensor 206 may comprise any array of sensing units or detectors capable of quantitatively measuring electromagnetic radiation, such as a CCD. It should be understood that, for simplicity, this disclosure may discuss or illustrate any given optical component as a lens or a prism, but each component may comprise multiple lenses or prisms to achieve the desired effect. As used herein, the "configuration" of an IMS generally refers to the number, type, and layout of elements (including the optical sample 200, primary pupil 201, optional relay lenses 202, IMFU 203, Selective Imager collecting objective 204a, Selective Imager re-imaging lens array 204b, SSU 205, and Image Sensor 206) with respect to one another.

An IMFU 203, or mapper, spatially reorganizes an image to create optically void regions in the image space used for encoding spectral information. An IMFU 203 may comprise optical components spatially distributed on its face. Certain distributions may exhibit similar optical functions, thereby forming logical groupings of optical elements. For example, mapping regions 1, 4, and 7 shown in FIG. 3 may exhibit similar optical functions, and may be logically grouped as IMFU optical component group A; while mapping regions 2, 3, 8, and 9 shown in FIG. 3 may exhibit similar optical functions, different from those in IMFU 203 optical component group A, and mapping regions 2, 3, 8, and 9 may be logically grouped as IMFU optical component group B. In some embodiments, the IMFU optical component groups may be distributed symmetrically on the face of the IMFU. In some embodiments, the distribution of IMFU optical component groups may form geometric shapes and/or repeating patterns. The optical components may be spatially distributed in particularly useful mapping shapes, such as mapping lines, mapping pixels, and/or mapping regions, although other common shapes (e.g., square, triangle, "L", "O", etc.) may also be used. The optical components of a particular mapping line, mapping pixel, and/or mapping region may, therefore, exhibit similar optical functions specific to that shape. The distribution of IMFU optical component groups in other embodiments may be random or chaotic. The image created by an optical component group may be referred to as a sub-image. The particular distribution of IMFU optical component groups on the face of the IMFU may be referred to as the "geometry" of the IMFU. As would be understood by one of ordinary skill in the art with the benefit of this disclosure, the geometry of an IMFU uniquely defines the mapping. Moreover, the geometry of the IMFU may be static or dynamic, and the geometry may be controlled and varied in real-time without disassembly of the system or disturbance of the optical sample.

The IMFU optical components may redirect the chief ray from object points to new locations in the image. The IMFU optical components may be refractive, reflective, or waveguide. Refractive approaches may include, for example, arrays of prisms, lenses, and/or combination optical components. Reflective approaches may include, for example, arrays of mirrors and/or lenses, as in a catadioptric approach. Waveguide approaches may include, for example, fiber optics. Any type of mapper also may possess optical power, similar to a more traditional field lens or mirror, and may be capable of re-imaging an exit pupil from the relay optical system to the Selective Imager collecting objective's entrance pupil or array of collecting objective pupils. This may allow for a compact and optically efficient multi-imaging system. The mapper may also incorporate anamorphic or cylindrical curvature for each mapping component, which may enhance the spectral resolution of the system. Lastly, the IMFU may combine refractive and reflective components to perform these different tasks individually or in combination. The IMFU may be corrected for spectral separation.

FIG. 3 shows several examples of possible IMFU designs. For the purpose of the following discussion, only 9 unique tilt angles are discussed; however, in practice many more tilt angles may be used. Additionally, only mirror components are illustrated, while IMFU 203 components may also include, for example, prisms, lenses, and combination optical components. The geometry in FIG. 3(a) illustrates redirection of entire horizontal mapping lines 301 through the object into 9 different angular directions 302. Rotation may be performed around two x and y axes to provide large spectral sampling and/or resolution of the system. This approach may be advantageous in its simplicity in concept and fabrication. However, this approach may suffer in that, for larger tilted mirrors, the image being mapped may go out of focus, thereby decreasing the spatial resolution at the edge of the field. This disadvantage may be reduced in the second geometry shown in FIG. 3(b), wherein the image mapping line may be broken into 2, 3, or more segments in the horizontal (x-axis) 303. This geometry may have better mapping performance but might be more difficult to fabricate. The third exemplary IMFU 203 geometry, shown in FIG. 3(c), is a mapping pixel-sized mirror 304 approach, either static or active (e.g., MEMS mirrors, liquid crystal modulator, and the like). This concept is versatile and may provide any number of remapping schemes for recording both spectral and spatial information. Note that mapping pixels 304 do not need to be square or rectangular. An example of a circular mapping pixel 305 mapper is illustrated in FIG. 3(d) and is conceptually similar to that shown in FIG. 3(c). In addition to tilted mapping components, each tilt mirror facet may also have optical power 306 for focusing the reflected (or refracted) light. This focusing effect may be used for compressing the image mapping pixel size, thereby increasing the spectral sampling of the system, as shown in FIG. 3(e). The entire IMFU 203 may also have optical power 307 and may be used for re-imaging the exit pupil of the fore optics in the system, as illustrated in FIG. 3(f). In FIG. 3(g), a combination of two or more element mappers also may be used, combining tasks either individually or collectively for image mapping purposes.

As mentioned above, IMFUs 203 may be refractive or reflective. A refractive IMFU 203 may be similar in geometry to a reflective IMFU 203, but a refractive IMFU 203 may redirect the optical samples mapping pixel's chief ray as the light is transmitted through, not reflected from, the surface. Both refractive and reflective types may be used statically or dynamically. For example, dynamic microelectromechanical system ("MEMS") mirror arrays may be developed that function similar to a digital light processor ("DLP") device that may be used in high definition televisions ("HDTV"). For example, a suitable DLP may be commercially available from Texas Instruments of Dallas, Tex. The main drawback of existing DLPs for this application is that they are limited to only two possible positions (on and off), and therefore cannot provide enough flexibility for real time adjustment of spatial/spectral resolutions. Accordingly, an analog or high bit depth array, with several tilt positions in yaw and pitch to redirect individual optical sample mapping pixels to any region in the image plane to maximize applicability, may be used. Other examples of a dynamic IMFU 2302 may also include liquid crystal modulators and refractive liquid modulators (micro fluidic based). Such mappers may be combined with a tunable refractive or diffractive SSU 2303, like a liquid crystal modulator or MEMS based rotating prism and/or array of prisms. The IMS may be used as an adaptive device capable of adjusting its spectral and spatial resolution in real-time.

An IMFU 203 may be fabricated using any available method including, for example, precision diamond raster fly-cutting, diamond turning using slow slide servo, diamond turning using fast tool servo, micro-diamond milling, precision ruling, computer numerical controlled (CNC) based micro-grinding and polishing, grayscale lithography based on direct beam writing, grayscale lithography using masks, multistep reflow lithography. Diamond machining approaches may have several advantages over the other technologies. First, the size, angle, and relative position of each optical component may be held very accurately, since it is determined by precision numerically controlled stages. Second, complex mapping tilt geometries (including roll-yaw-pitch) may be possible with the addition of a precision tilt stage to the diamond turning lathe. Third, the initial prototype development cost and time may be less demanding. And fourth, precision alignment features may be incorporated into the IMFU 203, thereby increasing the alignment precision of the IMFU 203 with other components, such as baffles and lens focusing arrays.

In particular, an IMFU 203 may be fabricated using diamond raster fly cutting, which is an appealing diamond machining method for creating thin, straight, high aspect ratio features, such as mirror facets, for the IMFU 203. As should be understood by one of ordinary skill in the art with the benefit of this disclosure, the aspect ratio of an image is its width divided by its height. In diamond raster fly cutting, a tool may rotate about a spindle 401 and scoops material out of a workpiece 402 (i.e. IMFU), as illustrated in FIG. 4(*a*). For this example, the workpiece 402 may traverse the y-axis to create a thin mirror facet. To create adjacent facets, the workpiece may step over along the z-axis, as shown in FIG. 4*c*. This may be repeated down the length of the IMFU 402 until the entire surface is cut. FIG. 4(*b*) illustrates a close up of the tool 403 cutting the workpiece 402. Note that the different facet angles may correspond to height variations in the workpiece 402 at a specific x-z plane. An example of an IMFU 203 fabricated using diamond raster flycutting is shown in FIGS. 39(*a*) and 39(*b*). In some embodiments, a novel technique may be applied utilizing surface shaped diamond tools to create the individual facet's cross section profile in the IMFU substrate 402. In traditional raster flycutting, the individual optical components comprising the entire mapper may be created by passing a diamond tool across the mapper substrate material in both lateral (parallel to mapper surface) and axial (perpendicular to mapper surface) directions. With each pass of the tool, a small fraction of the required material may be removed. Consequently, multiple passes may be required to fabricate each optical component, which leads to an expensive and time consuming process. Fabrication with surface shaped diamond tools, on the other hand, may eliminate the need for these lateral translations, requiring only axial passes to create the individual (or group) of optical components.

Moreover, compact, higher sampling (>100 elements) IMFUs 203 may require much smaller mirror facets. By scaling down the width of the facets, tools that are pre-shaped for the cross section profile of the optical component may be used. This may have several advantages, including a significant reduction in fabrication time, program simplicity, more densely packed mirror facets, and high relative geometric accuracy independent of machine precision for axes perpendicular to the cutting direction.

Figure 5:
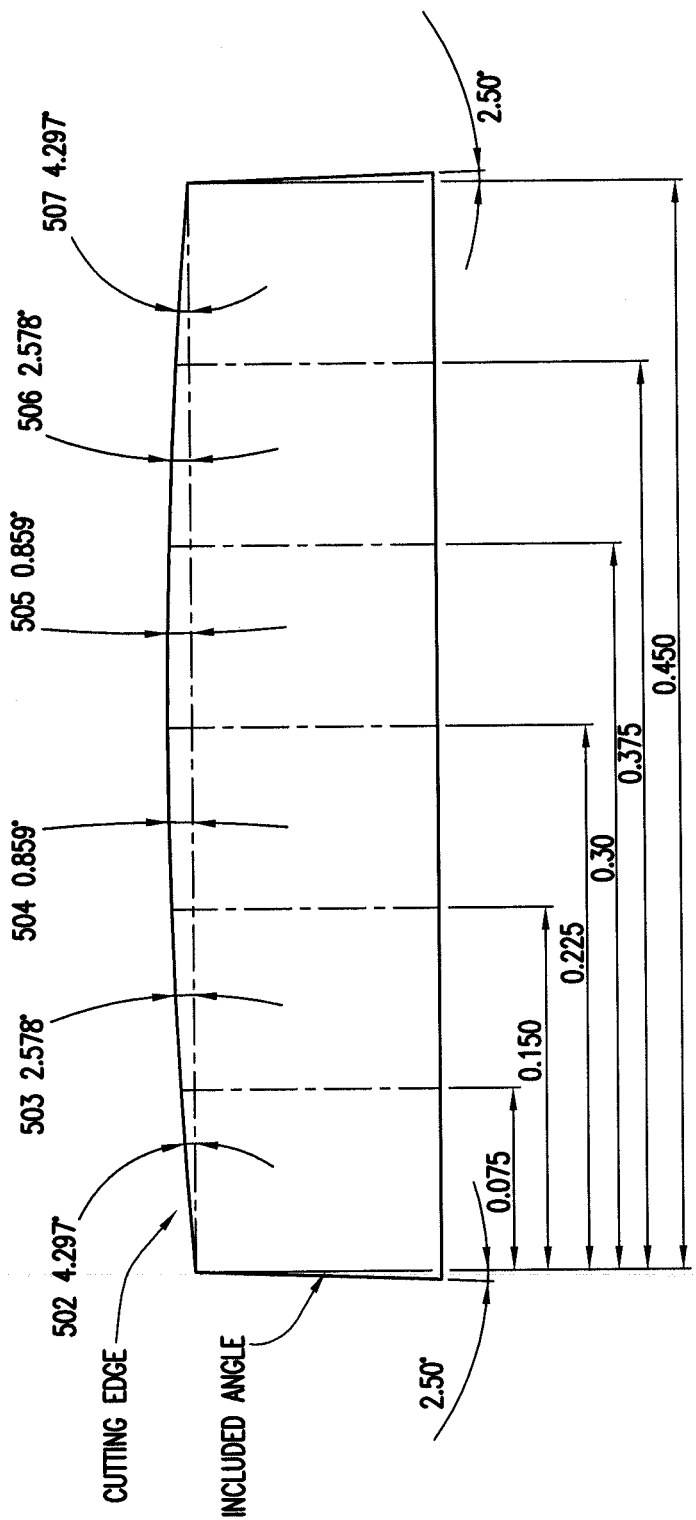
FIG. 5 illustrates a multi-faceted surface-shaped diamond tool, according to embodiments of the disclosure.

The disadvantage of this approach is that there may be little ability to correct for errors in the cross section of the mirror facet due to the tool shape, chips, and/or other defects. This may make the quality of the diamond tools a critical component in the fabrication process. An example of a surface shaped fabrication tool is shown in FIGS. 4(*b*) and 4(*d*). In addition to the tool shown, more complex geometries with multiple facets and/or features are also possible and, in some cases, advantageous to a single surface shaped tool. FIG. 5 illustrates an example of a surface shaped tool 501 with 6 facets 502-507 integrated into the surface. This method may be advantageous for fabrication of complex IMFUs 203 as it (1) decreases the fabrication time, (2) allows for multi-axis tilts, (3) enables densely packed features, and (4) is independent of the precision of the diamond machine for the axis parallel to the cutting direction.

There are several design parameters that may be considered for the surface shaped diamond tools, such as: included angle $\theta$ 407, primary side clearance angle $\alpha$ 404, primary tip clearance angle $\phi$ 405, top rake angle $\beta$ 406, tool width, maximum depth of cut, edge quality, and material. These geometric parameters are illustrated in FIG. 4B and FIG. 4D. The flat bottom tool tip width and the maximum depth of cut may be the key design parameters of the tool, as they are determinative of the optical design of the system. The tool tip width becomes the width of the mirror facet, while the maximum depth of cut determines the largest achievable y-axis tilt. Proper selection of the other tool parameters may be critical for optimum cutting performance, durability, tool manufacturability, and overall cost.

Figure 6A:
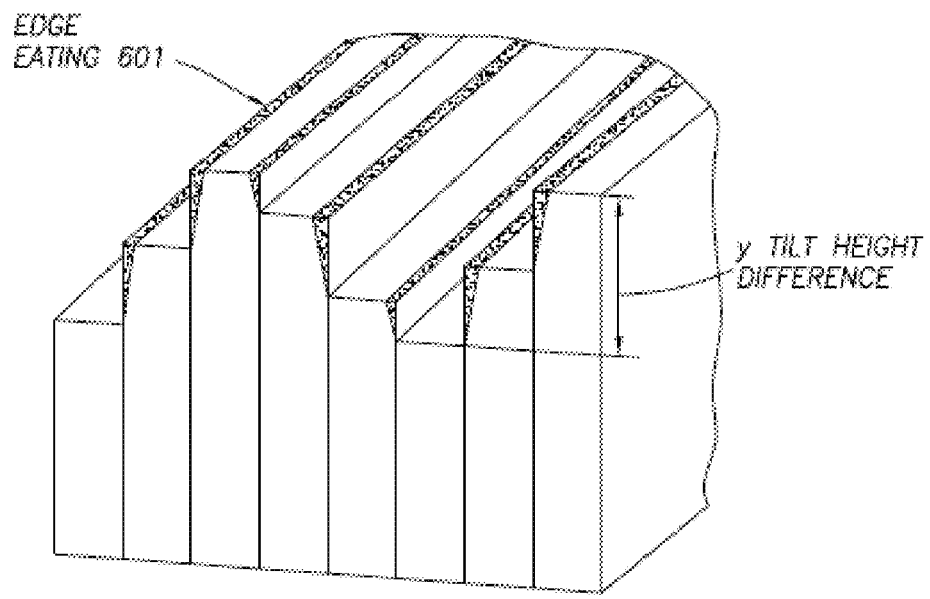
FIG. 6 illustrates a fabrication-related aberration known as "edge-eating," typically caused by diamond machining in raster-fly cutting.
Figure 6B:
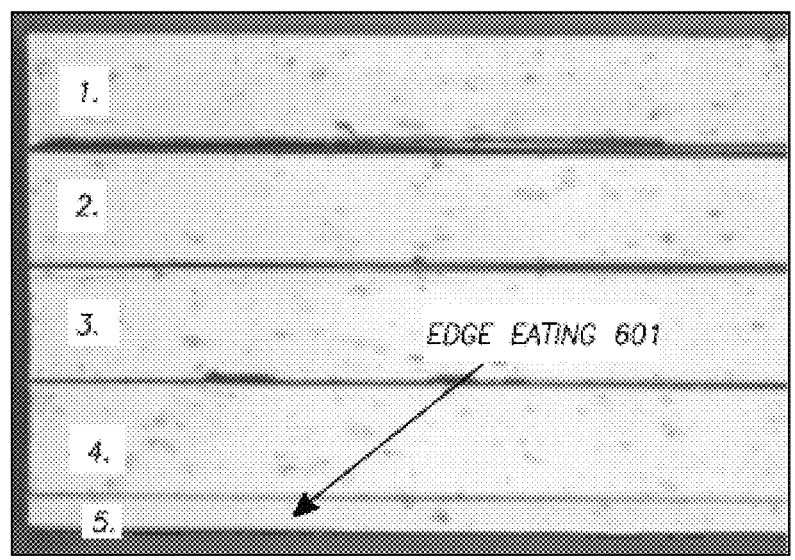

The geometry of the IMFU is also an important aspect in the fabrication process. To reduce the effects of edge eating 601 caused by the diamond tool geometry (included angle) shown in FIG. 6, the optical components may be (1) staggered in the y-axis, as shown in FIGS. 7(*a*) and 7(*b*), to minimize the step height difference 701 at the edges, (2) grouped in the x-tilts 702, as shown in FIGS. 7(*c*) and 7(*d*), which decreases the number of facets that have a step height difference 701, and/or (3) orientated in concave x-tilt facet positions, as shown in FIG. 7(*e*), which reduces the included angle 703 by the magnitude of the adjacent facet tilt 704.

Diffraction effects may be another important aspect of the IMFU 203 design, especially for large format spatial imaging situations, which typically require hundreds to millions of miniature optical components tightly packed together. The most dominate diffraction effect is thought to be caused by the width of the facets, which are on the order of 10's-100's of microns. In the pupil, this diffraction effect may stretch the geometric diameter in the axis conjugate to the width of the facet, as shown in FIG. 8(*a*), creating an elliptical pupil. This diffraction induced elliptical pupil has a two fold effect on the system. First, it may lead to crosstalk. Crosstalk generally refers to the phenomenon that occurs when light from one sub-image from the IMFU 203 enters into the optical path of another sub-image. The IMFU 203 optical component group creating the first sub-image may be adjacent to the optical component group creating the second sub-image. Crosstalk typically occurs at adjacent pupils, collective objectives, and/or re-imaging lenses and often leads to degradation of the final image For ~1% crosstalk, the minimum separation tilt angle should be approximately $$\alpha_{1\%} = \frac{x}{f} \sim \frac{1.35\lambda}{b},$$

where $\lambda$, is the wavelength of light, and b is the width of the facet. This crosstalk may be verified theoretically, as shown in FIG. 8(*b*). Note that the pupil distance can change depending on other factors associated with the IMFU 203, such as facet cross section, surface roughness, and the incident diffraction limited spot size to name a few. The pupil spacing is typically, but not always, related to the spacing of the collecting objectives 204*a* and/or the re-imaging lenses 204*b* of the Selective Imager 204, as it is often axially symmetric with at least one of the Selective Imager elements. Second, the elliptical pupil may create a "super resolution" effect in the spectral domain.

As used herein, "super resolution" generally refers to situations where it is possible to distinguish an image of one point source from an adjacent one closer than the Rayleigh criterion. It should be understood that the Rayleigh criterion is the generally accepted criterion for the minimum resolvable features where the first diffraction minimum of an image of one point source coincides with the maximum of an adjacent point.

For large format IMS systems, it is often important to maintain optics limited, or close-to optics limited, imaging resolution. For Nyquist sampling, which is the generally accepted minimum resolvable criteria, at least two IMFU optical components must reside within the incident diffraction limited spot to be able to resolve it. Therefore, the individual optical components for the IMFU 203 may range in width from approximately half the width of the incident diffraction limited spot size to a few spot sizes. The diffraction limited spot size may be commonly referred to as the aberration-free image of an infinitesimal point from the optical sample.

Figure 9D:
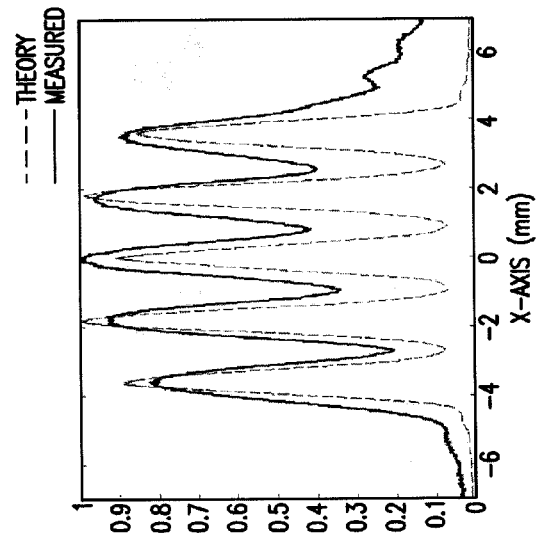
Figure 9B:
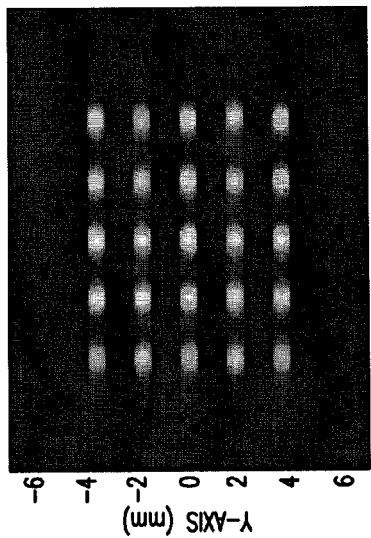
Figure 9A:
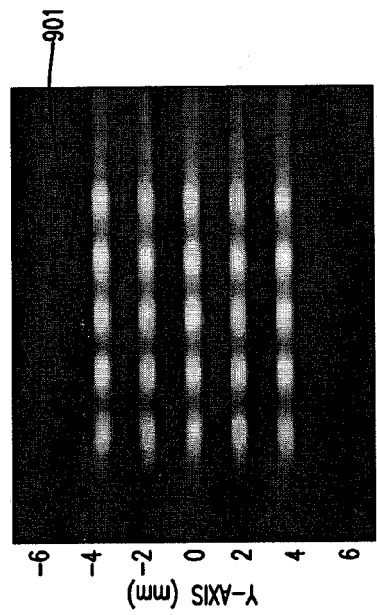
Figure 9C:
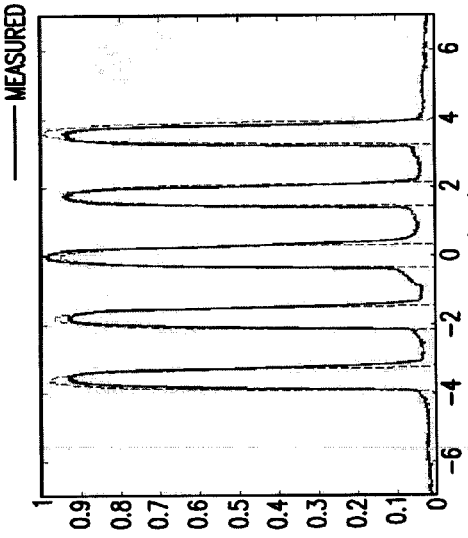
Figure 11A:
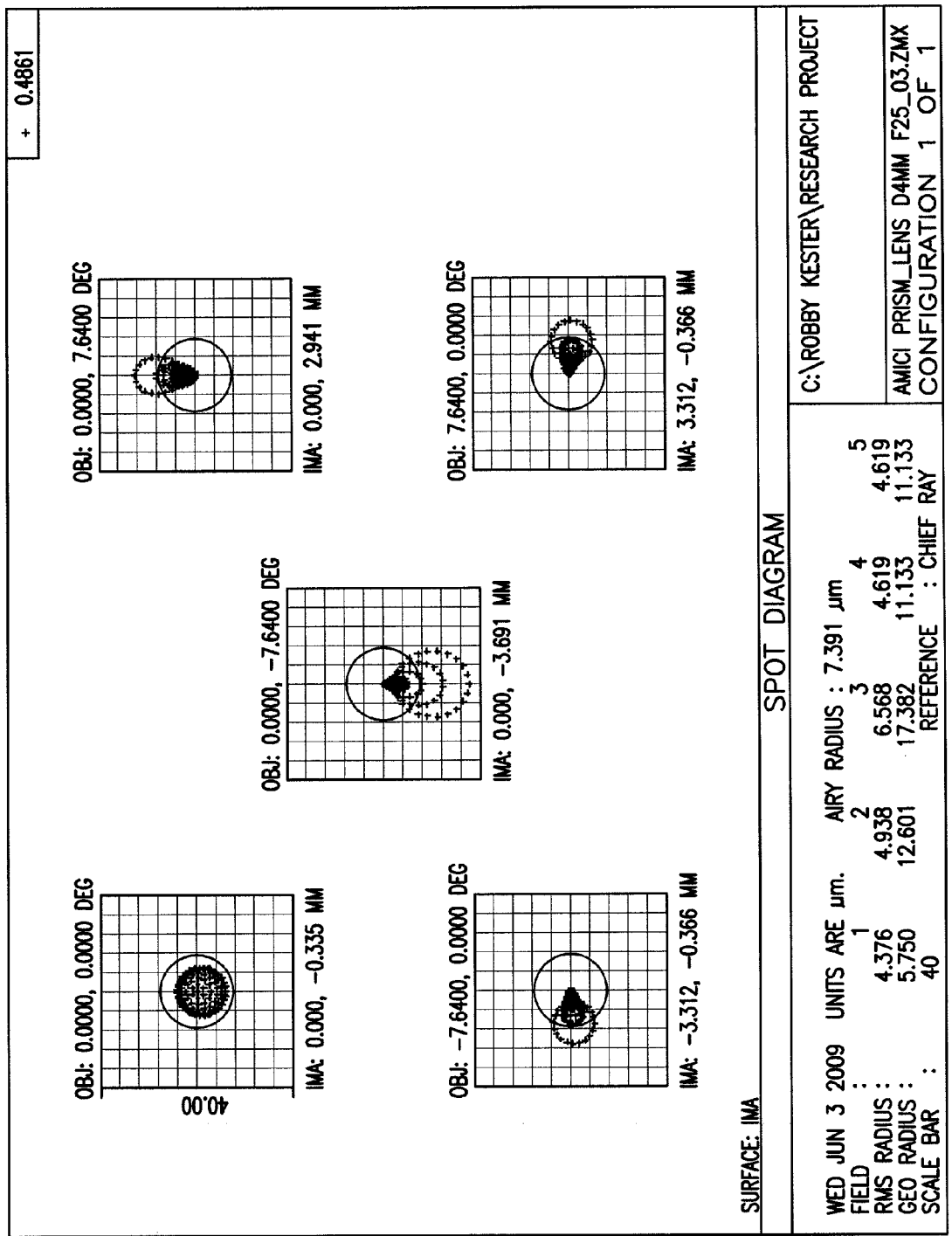
Figure 11B:
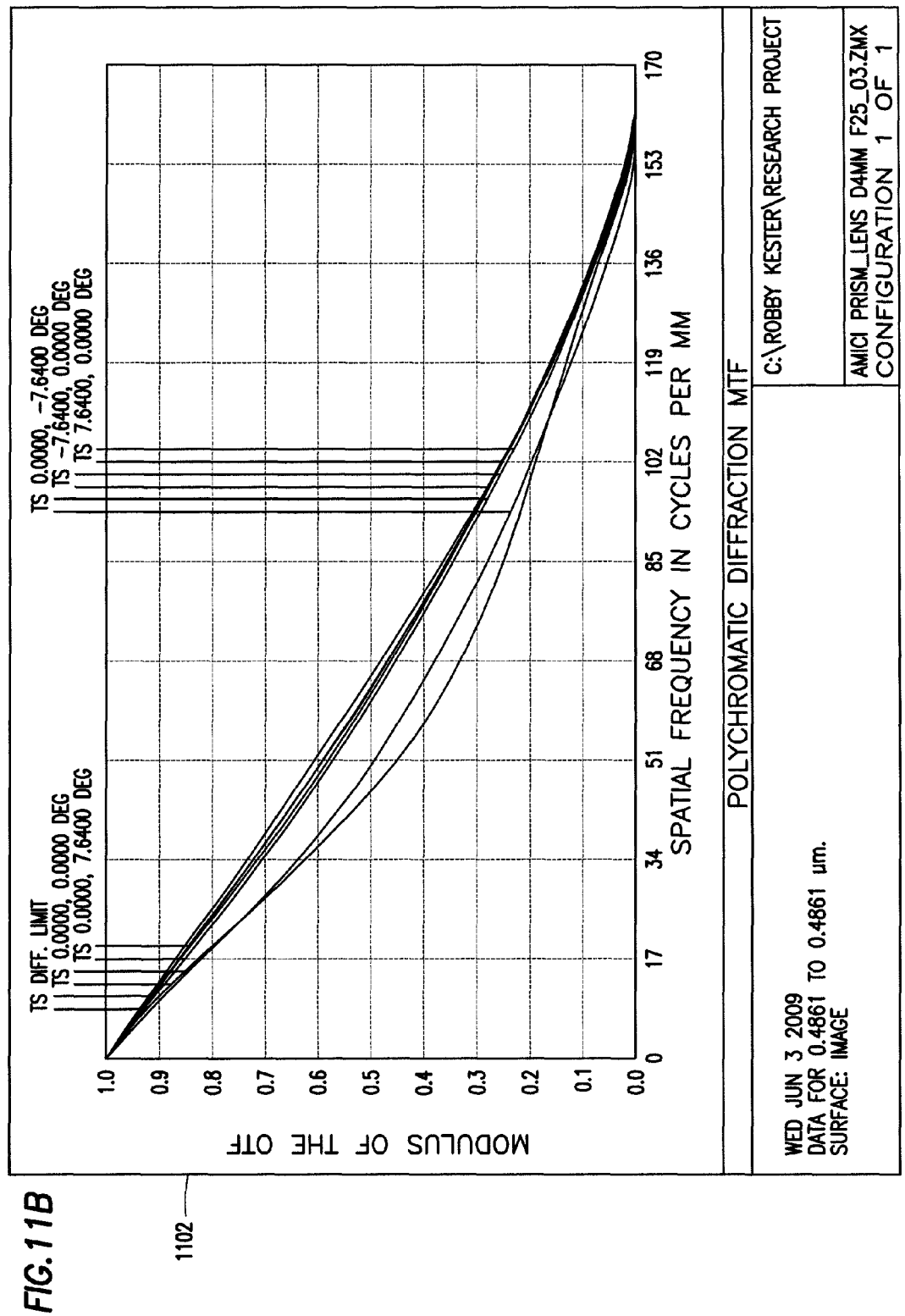
Figure 11C:
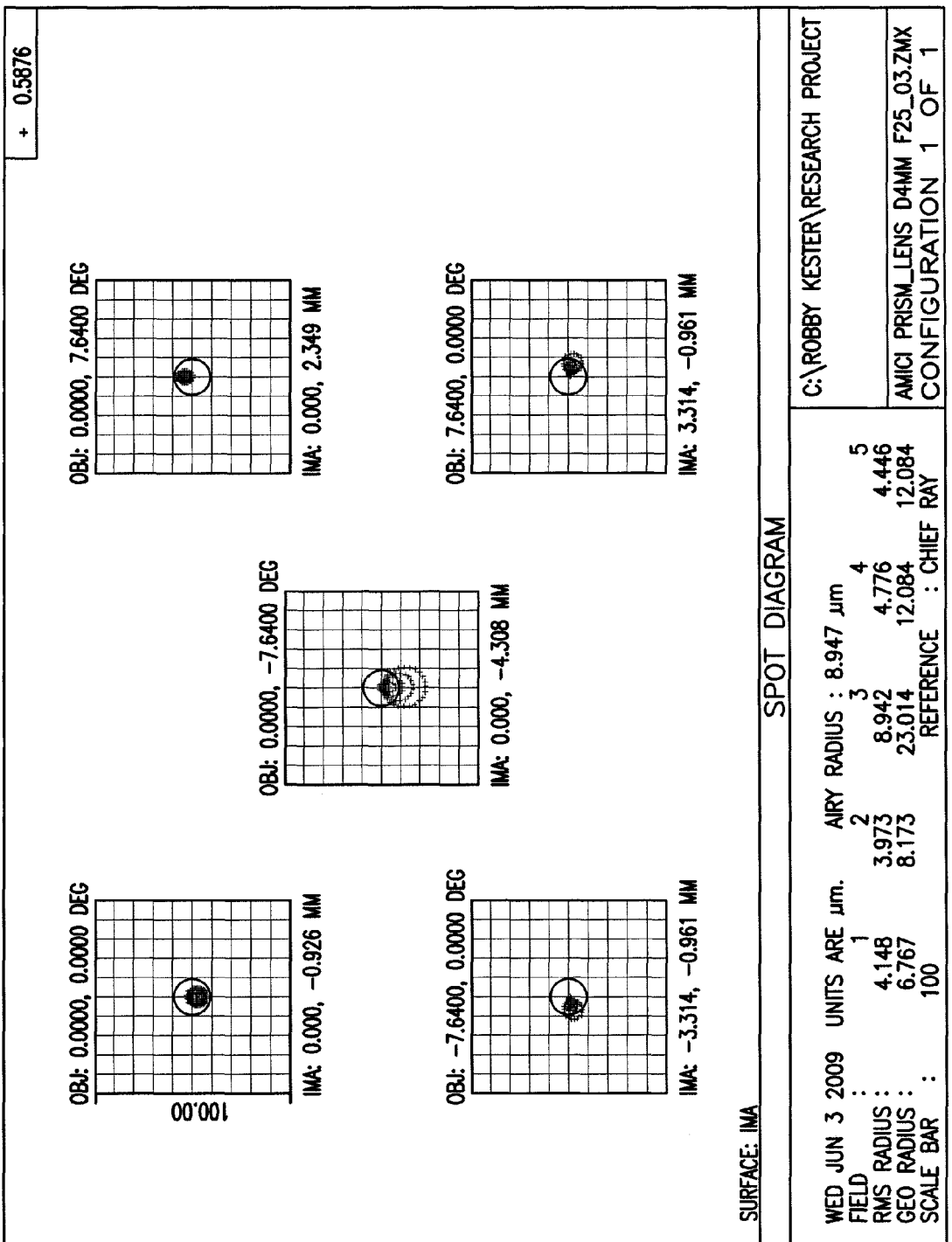
Figure 11D:
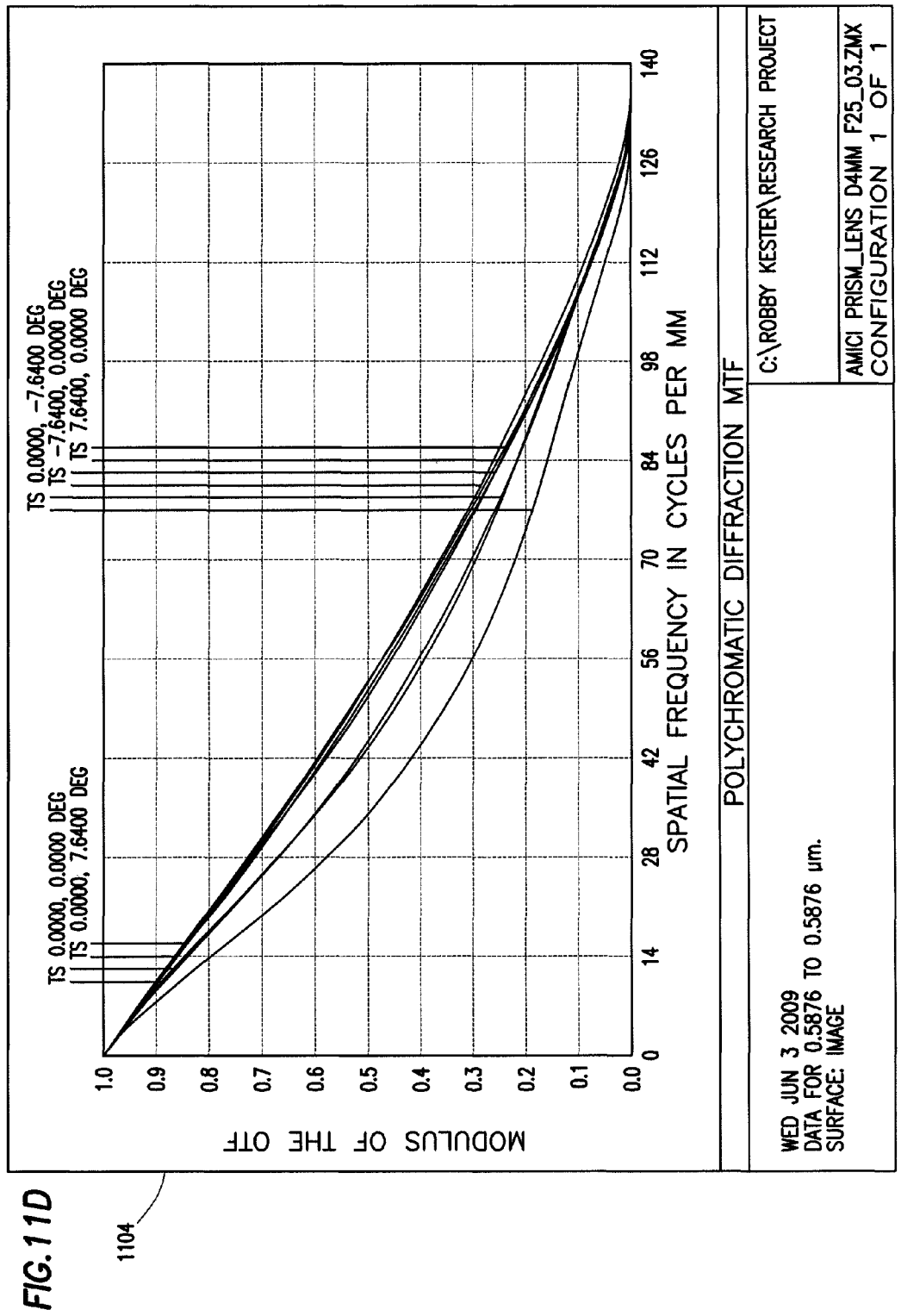
Figure 11E:
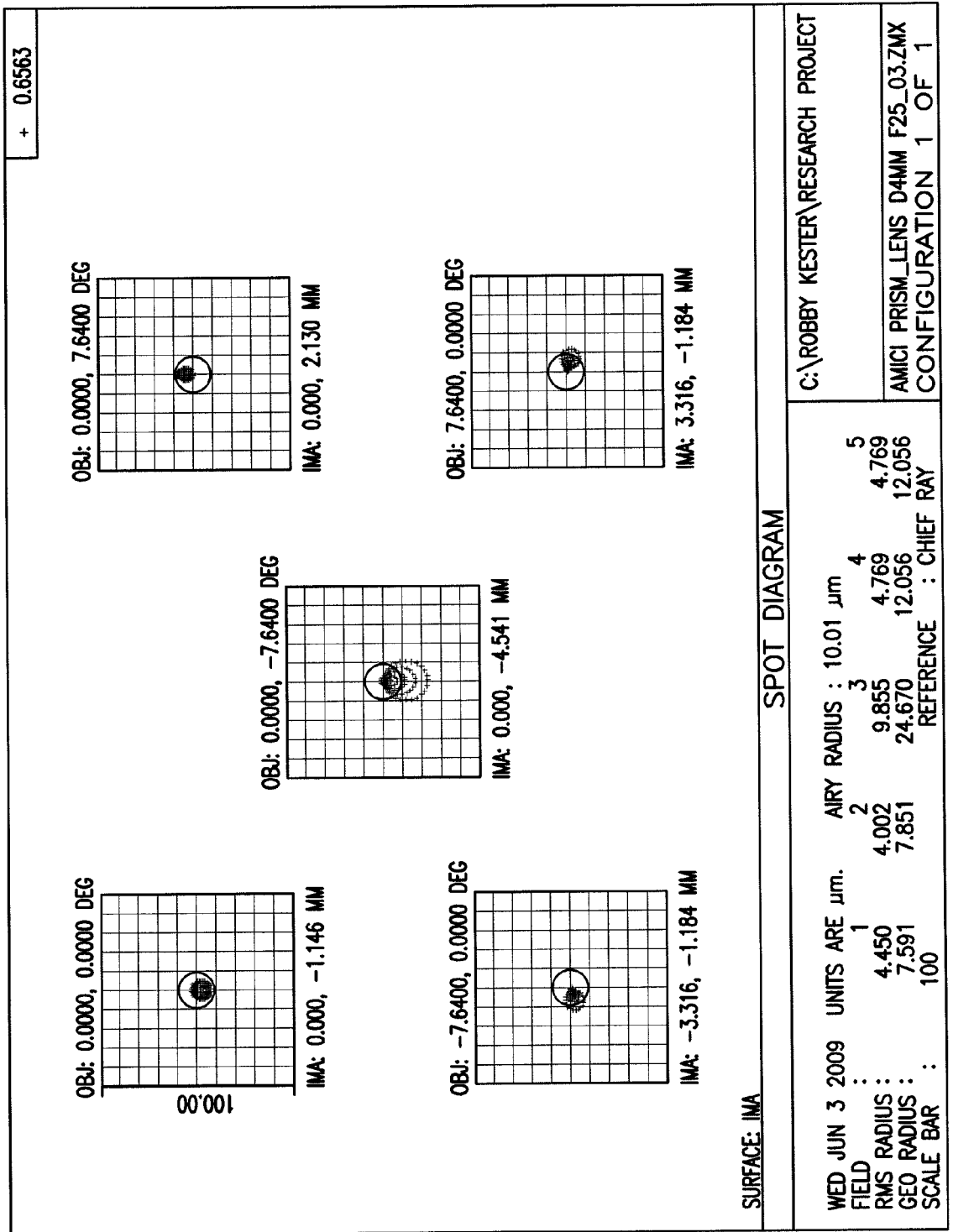
Figure 11F:
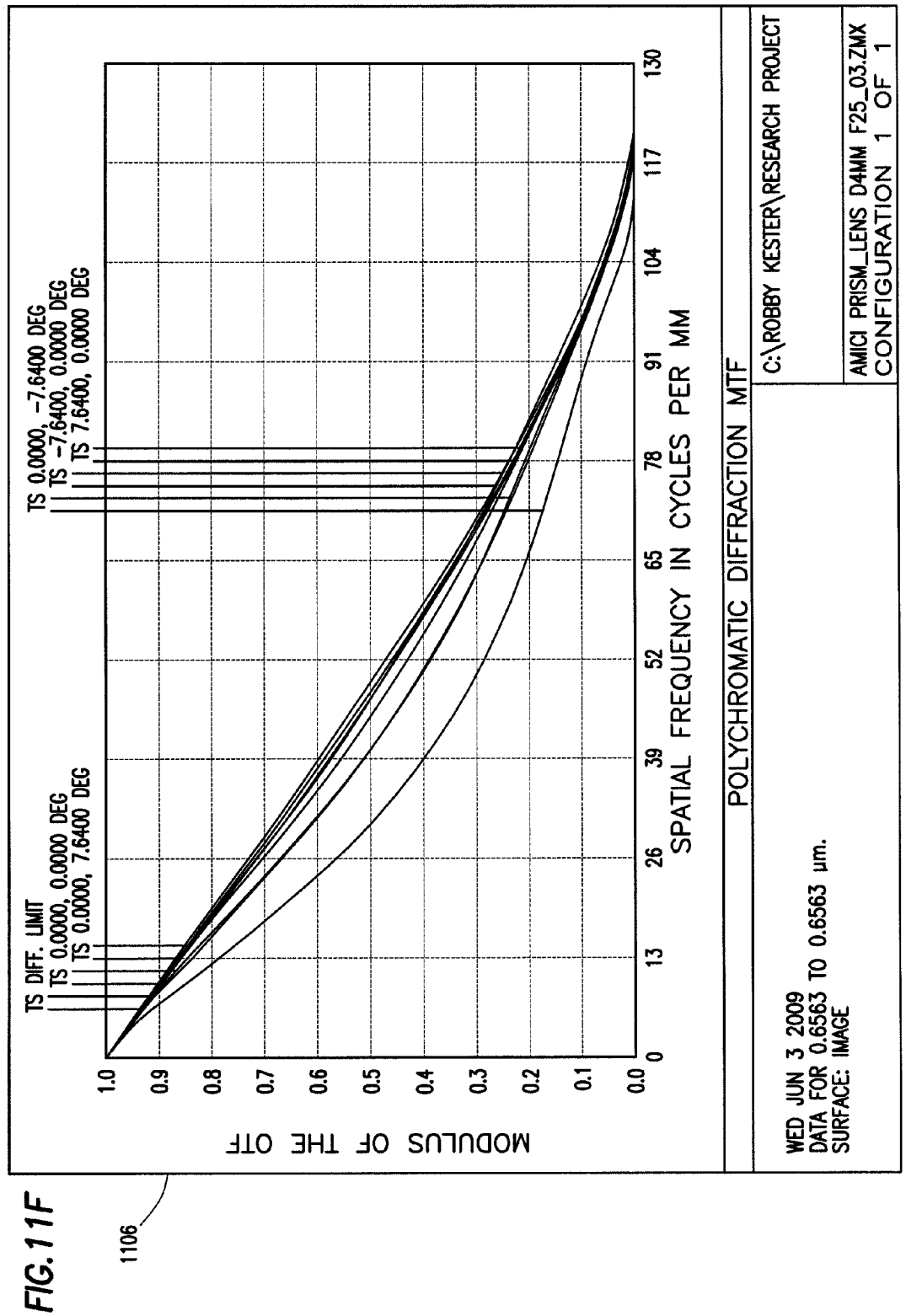

An elliptical pupil may create an asymmetric point spread function with a narrower axis in the spectral direction perpendicular to the spatial direction. This effect may be seen in FIG. 9 for an IMFU 203 with 285 facets that are 70 microns wide. The facets are arranged for 25 multi-axis tilts (5 x-tilts, 5 y-tilts). FIG. 9(a) shows the raw image of an actual pupil array 901. For comparison purposes, a theoretical pupil array image is shown in FIG. 9(b). Cross section profiles in both the y- and x-axis for both images are compared in FIGS. 9(c) and 9(d), respectively. For the y-axis (FIG. 9(c)), the theoretical and measured pupil diameters and positions may have excellent agreement. However, in the x-axis (FIG. 9(d)), the measured pupil diameters may be much larger than expected based on the simulation due to additional optical power for each mirror facet in the IMFU 203. This leads to the second method to increase the spectral resolution of the IMS system.

To enhance the spectral resolution of the IMS, the IMFU 203 individual optical components may have optical power for compressing the reflected mapping line widths smaller than the actual components themselves. Alternatively, a separate array of optical components may be added before or after the IMFU 203 to create this optical power. This optical power may be used to narrow the width of the mapping line smaller than the actual IMFU 203 component, creating additional optical space between adjacent mapping lines for added spectral spread, thereby increasing the spectral resolution of the system. In addition, IMFU 203 optical power may be used to re-image the entrance pupil 201 from the relay optics to the entrance pupil of a Selective Imager 204 collecting objective or array of collecting objectives, creating a more compact and optically efficient IMS design.

The SSU 205 generally is responsible for the spectral separation of the optical sample. It may be composed of either a refractive, diffractive 1702, or combination optical components. Examples of such components may include wedges, prisms, diffraction grating, grisms (a combination of a prism and grating arranged to keep light at a chosen central wavelength undeviated as it passes through a camera), computed generated holograms, and the like. The SSU 205 may be located in any optical space after the IMFU 203, although it is preferable to be located at the pupil position of the Selective Imager 204 because, among other things, light from all field points will illuminate the same region of the component providing more uniform chromatic separation. The dispersion direction, or directions, may be in any orientation except for the primary mapping axis of the image mapping field unit. If dispersion takes place in the mapping axis, then the chromatic and spatial information may be lost or diminished. The SSU 205 may be composed of either one continuous optical component over the entire pupil space or an array of smaller optical components. Different SSU 205 designs might be as simple as an optical component giving spectral separation identical for each object point or differentiate between these points. They can be designed as a single SSU 205 optical component or an array of such optical components. Both passive and active components are possible. Active components might be built using liquid crystal modulators (tunable prisms, wedges, diffraction grating, computer-generated holograms ("CGHs"), arrays of wedges having adjustable tilts and wedge angles (possibly MEMS based), electro-optical modulators, magneto-optical components, or a combination of gratings giving different grating constants with changing mutual grating angles. It also may be advantageous to design active or passive prisms with either uniform dispersion and/or zero displacement like that used in direct vision prisms (i.e. Amici type), as this may allow for a more compact, evenly sampled spectral design.

The Selective Imager 204 works in combination with the IMFU 203 and SSU 205 to rearrange and reimage the dispersed object onto the Image Sensor 206. As mentioned above, the optical sample 200 may be reorganized spatially and spectrally by the IMFU 203 and SSU 205, respectively. IMS configurations may include a number of possible Selective Imager 204 types and positions, including (a) optical systems to selectively separate each sub-image, (b) optical systems to selectively separate each tilt direction, and (c) mixed designs having a number of imagers between the total number of mapping angles.

Some embodiments provide IMS configurations having an array of Selective Imager re-imaging optical systems to match the same number of optical component groups and/or mapping tilt directions from the IMFU 203 geometry. The advantage of this solution is flexibility of providing various spacing between object zones, but it also may be complex in design and possibly require anamorphic optics for asymmetric mapping geometries. Such methods may be best suited for certain mapper geometries, such as those presented in FIGS. 3(c) and 3(d), as well as for tunable/dynamic IMS embodiments. Examples of fabricated Selective Imager re-imaging lens arrays 204b are shown in FIG. 10. The lens arrays 1001 may be composed of a single achromatized doublet lens 1002 or several lenses 1003, such as that shown in FIGS. 10 (b) and 10 (c). The Selective Imager may be corrected for chromatic aberrations, as shown in FIG. 11, with spot diagrams 1101, 1103, 1105 and modulation transfer function plots 1102, 1104, 1106 for the F (~486 nm), d (~587.6 nm), and C (~656.3 nm) bands. The design may be diffraction limited at these visible wavelengths. The spectral spread 1201 introduced by the SSU unit 205 is around 800 microns, as shown in FIG. 12, for various field positions. Mapping aberrations due to distortion also may be minimized, however, since the image may be remapped for display purposes. This may not be of critical importance. For alignment purposes, each sub system may have adjustable focus, either static or dynamic. Possible dynamic optical components may include, for example, MEMS, electro-wetted, micro-fluidic, and liquid crystal lenses, to name a few.

Other embodiments may provide IMS configurations having an array of optical systems, wherein the number of mapping angles may correspond to the number of required separation pixels for the spectral spread, as illustrated in FIG. 13. Note, however, that this correlation is not necessarily one-to-one, as the spectral spread may be tilted to cover more pixels than the number of mapping angles, but it should still be a linear relationship. The mapping optical components may be repeated down the IMFU 203 until the entire image is covered. In FIG. 13, for example, there are 9 unique tilt angles 1301 that are then repeated down the y axis.

The magnitude and direction of the IMFU 203 mirror tilt angles may determine where the light from each image mapping line will be directed in the stop, and likewise the intermediate pupil. The number of different mirror tilt angles may be directly proportional to the number of pupil sub regions. In the example shown in FIG. 13, there are 9 tilt angles and, therefore, 9 pupil sub regions 1302. Behind these sub regions may be an array of optical systems that re-image the light from each tilt mirror pupil sub region onto an Image Sensor (CCD or other array detector) 1303. Each lens may have a field of view ("FOV") 1304 of the entire optical sample but may only receive light from a particular mapping angle. Consequently, there may be a large dark region separating the image mapping lines 1306 (or, for more complex mappings, separating mapping line portions or mapping pixels). A SSU 205 may be placed at the intermediate pupil position to disperse the light from each image mapping region or mapping line into an angle that will correspond to these dark regions 1305. The final image on the Image Sensor 206 may look similar to the diagram in FIG. 13(*c*).

A simple software algorithm may re-map the optical sample as well as the spectral information for each object mapping pixel. Re-mapping might also be performed in hardware, for example using a digital signal processing ("DSP") unit. Both software and hardware solutions may allow real time display of the 3D (x, y, λ) datacube on a monitor screen. In some embodiments, it may be possible for the Image Sensor to comprise multiple detectors corresponding to one or more mapping angles, instead of a single, large format detector. Thus, using FIG. 13 as an example, a large format camera, or 9 low resolution cameras, or any number between assuring that all mapping angles are imaged, may be used. Using multiple cameras may be implemented to increase spatial and spectral resolution, minimize unused areas between images, or in applications like infrared ("IR") where large format detectors are generally very expensive or not readily available. A single component Image Sensor 206 may make the system more compact, provide a more uniform response, and simplify the image acquisition.

In certain embodiments, the IMS may comprise a single tilt axis IMFU 1401. This may be useful to, among other things, decrease the total number of components in the Selective Imager 204 and limit the number of mapping angles, while still providing sufficient separation for spectral spread. For example, the IMFU may only require a few tilts in one direction (around y axis) 1402 and, using a slit or pinhole mask in an intermediate image plane, may achieve more separation at the Image Sensor 206. In other embodiments, increased separation may be achieved by using arrays of spherical or cylindrical reimaging systems. Systems utilizing the arrays of lenses may require an asymmetric shape which may result in an asymmetric point spread function. To compensate, these systems may require an anamorphic relay imaging system. An example of such a unidirectional tilt mapper is shown in FIG. 14.

As mentioned above, the IMS may be reflective. Examples of reflective IMS systems are presented in FIGS. 15 through 17. FIG. 15 illustrates a reflective system with tilted annular mirror 1501. FIG. 16 shows a reflective IMS with beam splitter 1601, and in FIG. 17, a reflective IMS with a tilted IMFU 203 is shown. In these systems, any choice of SSU 1701 as described above may be used. In addition, the Selective Imager 206 might have many different configurations, for example, consisting of a single collimating objective 204*a* and array of re-imaging objectives 204*b* or an array of collimators 1703 with an array of re-imaging objectives 204*b*. The number of array components may also change depending on the design approach and selected critical component configurations.

One specific example IMS configuration of the present disclosure is a reflective system with annular mirror 1501. This embodiment of the IMS generally maintains high optical throughput with a reflective image mapping field unit. This may be accomplished by placing an annular fold mirror at the stop position between objective 1502 and the collecting objective 1503 (see FIG. 15). Light rays from the optical sample 200 (located at the field stop 1504) may be imaged by objective 1502, passing unobscured through a small, central opening in the annular mirror that serves as the stop for that objective. These light rays (depicted by black lines) may be imaged onto the IMFU 203 by the collecting objective 1503. The image may be "mapped" into horizontal sub mapping regions by tilted rectangular mirrors, for example, as illustrated in FIG. 13. Each mirror may be the entire length of the image but only one mapping pixel in width. The different mirror angles may be repeated down the IMFU 203 until the entire image is covered. In FIG. 13, there are 9 unique tilt angles 1301 that are then repeated down the y axis. Light reflected from these mirrors (depicted by colored lines in FIG. 15) may travel back through the collecting objective 1503, but to the annular mirror region outside of the first objective's stop 201. The annular mirror surface may act as the stop 201 for the collecting objective 1503, and may reflect light out of the path of the original system toward a pupil relay 1505. Note that the collecting objective 1503 and re-imaging lens array 204*b* form the Selective Imager 204.

The pupil relay 1505 placed between the collecting objective 1503 and the re-imaging lens array 204*b* may image the annular mirror (stop) 201 to a more accessible intermediate pupil location while adding the appropriate magnification for fitting the final image onto an Image Sensor 206. The magnitude and direction of the mapping mirror tilt angles may determine where the light from corresponding image mapping line will be directed in the stop or its conjugate intermediate pupil location. The number of different mapping angles may be directly proportional to the number of pupil sub regions. An array of lenses may re-image the light from each sub-pupil of a particular mapping sub region onto an Image Sensor 206, such as a CCD detector or other array detectors. Each lens may have a FOV of the entire optical sample 1304, but each may only receive light from a particular mapping angle 1306. A SSU 205 may be placed at the Selective Imager stop or its conjugate pupil position to disperse the light from each mapping line or mapping region into an angle that will correspond to these dark regions.

This above described system may have the following slight modifications while still maintaining its overall functionality. The annular mirror may be faceted to deviate some of the mapped light into different directions out of the path of the original system. The annular mirror may have the unobscured region located at any position on the surface although the central region is preferable. The mirror surface does not have to be flat, but may have some optical power associated with it. The collecting objective 1503 may be arrayed to accept unique (or a few) mapping angles. The pupil relay 1505 also may be arrayed and/or made anamorphic for compression of the spatial data. The SSU 205 also may be a single or array of systems. The SSU 205 may be a refractive, diffractive, and/or combination component. The lens array 204*b* may be made anamorphic. The annular mirror 1501 may have the SSU 205 placed on its surface or close to the surface.

Another specific example of an IMS configuration of the present disclosure is a reflective IMS with beam splitter. This reflective IMS with beam splitter may consist of two optical paths connected by a beam splitter 1601. One is called the "re-imaging" optical path (composed of 1602, 1603, 1604, 1605, and IMFU 203), and the other is called the "mapping" optical path (composed of IMFU 203, 1605 1604, 1606, array of optical systems 204b, SSU 205, and Image Sensor 206). One embodiment of the system is depicted in FIG. 16. Therein, the IMFU 203 reflects light into N=25 different pupils 901, but any number can be used. The size of the void region on the Image Sensor may be proportional to N. The apertures of the 1602, 1603, and 204b array are conjugated by image relay systems. A dispersive prism 205 may be placed at the entrance pupils of the 204b array to spread the spectrum from the mapping line from the optical sample, thereby functioning as the SSU 205. After passing through 1605, 1604, 1606, and 204b, the image of the optical sample may be mapped; the beams may be collimated, dispersed, and re-imaged. In effect, an image may be mapped onto the Image Sensor 206 in a pattern of mapping lines dispersed over the detector area. Each x, y, and λ component may be directly mapped to a different camera pixel. The imaging system may be telecentric in both object space and image space, providing lower sensitivity to defocus. Unfortunately, this setup may be quite energy inefficient, and it may lose up to about 75% of light (due to two passes at a 50% beam splitter). Its biggest advantage may be simplicity and symmetry, which may allow an easy use of entire Image Sensor 206 array.

Another specific example of an IMS of the present disclosure is a Reflective and Tilted IMS. One such IMS system is illustrated in FIG. 17, consisting of optional relay lens 202, the IMFU 203, array of collimating lenses 1703, a blazed diffraction grating 1701, array of re-imaging objectives 204b, and an Image Sensor 206 located in the image plane. Note that the diffraction grating rulings lie parallel to the plane of the page of this document, so the dispersive effect is not seen in the cross-section presented. The IMFU 203 modeled here has four tilted facets (mapping lines) located on different image heights. It may enable re-organization of the image into mapping lines along the x direction separated by multiple mapping pixel rows, as illustrated in FIG. 17. The diffraction grating may spread these mapping lines in the y-direction, which may enable both spatial and spectral information to be recorded simultaneously without scanning. One advantage of this system is that it avoids light losses by a beam splitter. Its biggest disadvantage may be a tilt of the mapping component, which may increase result some IMFU 203 regions being out-of-focus. This may be compensated by tilting an object/intermediate image 200 to optimize conjugate planes.

As mentioned above, the IMS may be refractive. Such IMSs are similar in concept to the reflective systems, except the IMFU 203 may be a refractive component instead of being reflective. One advantage of such IMSs is the fact that the system can remain unfolded, making the opto-mechanics less complicated and more compact. Refraction effects may also introduce some undesired dispersion, creating spectral separation. As should be understood by one of ordinary skill in the art with the benefit of this disclosure, spectral separation during mapping may cause neighboring image point to overlap in the final image, obscuring the information, and requiring image processing correction. This may compromise one of the main advantages of the IMS system: direct unambiguous data acquisition for real-time image display. Therefore, it may be advantageous for the refractive optical components in the IMFU 203 to be corrected for this spectral separation and other chromatic aberrations. This can be done a number of ways, including, but not limited to: combining two or more refractive materials with different dispersion, combining a refractive and reflective component, and combining a diffractive and refractive component. Light from the optical sample may be relayed onto the IMFU 203 by Relay Optics 202 (for example, as illustrated in FIG. 18). The image may be "mapped" into many sub regions or individual mapping pixels by tiny prisms. These prisms may have different angles associated with them and may cause the light to travel along different paths, as shown in FIG. 18 by the different colors. The different optical paths from the "mapped" image may be collected by Objective L2 204b and directed to specific sub regions in the pupil. The SSU 205 may disperse the light in these sub regions into different angles that correspond to the dark regions created by the IMFU 203 in the final image. Immediately following the SSU 205, an array of lenses 204b may re-image the light onto an Image Sensor 206 (e.g., CCD, CMOS, or similar detector), where a simple software algorithm can re-map the optical sample with its spectral information.

This above described system may have the following slight modifications while still maintaining its overall functionality. Objective 204a may be arrayed to accept unique (or a few) mapping angles. The spectral separation unit 205 also may be a single or array of systems. The spectral separation unit 205 may be a refractive or diffractive component. The lens array 204b may be made anamorphic for spectral or spatial information compression.

Another approach to certain IMSs of the present disclosure is based on the application of an "array of lenses" 1901 located such that the field stop 1503 coincides with the focal plane of lenses. Such IMS configurations may use reflective and refractive approaches. The micro lens array may play the role of a parallel sampling probe. FIG. 19 illustrates this concept. The overall imaging principle remains the same, and the IMS may be supplemented with other components similar to those used in the layouts presented above. The spatial resolution of the system in this case may be determined by the packing density of lenses in the array, since each lens may be responsible for a single image point. Light rays launched from the field stop 1503 may emerge parallel to the optical axis after passing the micro lenses. On reflection at the mapper, the optical rays may propagate into specific directions to achieve the required image mapping. One advantage of this approach is its insensitivity to defocus. The system's accuracy may rely on the uniformity of lenses in the array and quality of beam collimation.

To capture a greater quantity and/or quality of spectral information, a dichroic mirror may be added to the image space of the Selective Imager 204, as shown in FIG. 20. The dichroic mirror 2001 may enable the system to collect spectral information from the optical sample in two or more distinct spectral bands, including adjacent spectral bands, such as visible and near infrared, and non adjacent spectral bands, such as ultraviolet and midwave infrared. In addition, the spectral information also may be enhanced within a single spectral band, increasing the spectral resolution by two or more times the original system. The configuration illustrated in FIG. 20 may utilize an additional camera (Image Sensor detector #2 2002) to collect the second band of information. In this diagram, Image Sensor detector #1 2003 may collect light from the red to green region 2004 of the visible band, and Image Sensor detector #2 2002 may collect light from green to UV 2005. However, this concept also may be applied to a single camera Image Sensor 206 in which filters of selected wavelength regions are placed in front of rows of neighboring detector pixels as illustrated in FIG. 21. The unfiltered Image Sensor detector may only spread spectrum from one mapping line from the optical sample (line #1) 2101 to the next mapping line from the optical sample (line #2) 2102, as shown in FIG. 21(a). For this example, there is no room for the Blue-UV spectrum from line #1 2103. By adding filters (for example, see FIG. 21(b)) 2104 to the Image Sensor and oversampling the point spread function 2105 of the image, it may be possible to obtain the additional spectrum from line 2 (for example, see FIG. 21(c)). The tradeoff with this approach is that the optical throughput of the system may be decreased. This may be overcome with lens arrays similar to those already used in CCD and CMOS image detector to overcome fill factor issues.

Another IMS configuration may use micro lens arrays 2201 and/or micro field stop arrays 2202 to optically compress the facets on the mapper, creating additional space for spectrum. One possible embodiment is illustrated in FIG. 22. In this example, a set of micro cylindrical lens arrays 2205 are placed near the sub-image plane after the Selective Imager 204. The lens array 204b and/or micro stop array 2202 may add additional optical power in the sagittal plane of the image 2203, but not the meridonal plane 2204. This may create an asymmetric point spread function 2105 on the final image plane that is narrower in the sagittal plane 2203, which is also the direction used for spectrally spreading the image.

A dynamic IMS system is presented in FIG. 23. This system has the ability to act like a digital and optical zoom camera system for the entire 3D (x, y, λ) datacube, changing IMS configuration during operation to obtain different spatial and spectral sampling from one or multiple mapping regions of the optical sample. It may be possible to zoom into one or more regions of interest ("ROI") 2301 and obtained higher spectral and spatial resolution. As used herein, "zoom" generally refers to increasing the number of samples over a ROI 2301 of an image of the optical sample 200. Digital zoom may be an electronic reconfiguring of the array of sensors comprising the Image Sensor 206 to change the number of samples in selected regions of the Image Sensor 206. Optical zoom generally means hardware reconfigurations, whereby the image of the optical sample 200 is altered to change its sampling by the Image Sensor 206. Spectral zoom generally means increasing the number of sensing elements over a given spectral range, or decreasing the spectral range over a given number of sensing elements. Spatial zoom generally means increasing the number of sensing elements over a given spatial mapping region, or decreasing the spatial mapping region over a given number of sensing elements. This may be accomplished by utilizing dynamic components for one or more of the critical components of the system: IMFU 2302, SSU 2303, Selective Imager 2304, and, optionally, the image relay lens 2305. The relay lens 2305 may change the size of an image of the optical sample, increasing the image sampling on the IMFU 2302, and thereby zooming the spatial domain. If multiple IMFUs 2302 and/or dynamic relay lenses 2305 are used, similar to FIG. 25, it may be possible to provide optical zoom to for more than one location on the image. The dynamic IMFU 2302 may use MEMS techniques to adjust mirror tilts to selectively reflect image mapping pixels of interests toward the Selective Imager 2304, creating zoom in spectral and spatial domain. These mapping pixels may then be spectral spread more or less by dynamically adjusting the dispersion of the SSU 2303. One possible approach for adjusting the spectral spread of the SSU 2303 is to use a plano-convex and plano-concave lens pair or similar materials to create a prism like structure (for example, see FIG. 23(a)). By rotating the plano-convex lens, the angle of the prism may change, causing the dispersion of the prism to change as well. The last component that can dynamically change is the lens array 2305 in the Selective Imager 204. By adjusting the power of the lens array 2305, the final image size also may scale, creating increased sampling of the image both spectrally and spatially. This may also make it possible to image faster (by binning the camera) and/or improve dynamic range.

As an alternative to the previously mentioned refractive or reflective approaches, the IMS system may use a waveguide mapper 2401 to create an optically void region between adjacent image points, as shown in FIG. 24(a). The relay optics 202 (primary pupil 201 and zero, one, or more optional relay lenses) image the optical sample 200 onto the input face of the waveguide mapper 2401. As shown in FIG. 24(b), the waveguide mapper 2401 may guide light from each individual waveguide 2402 to an isolated mapping pixel at the output of the mapper face 2403. Note that this mapping may be coherent or incoherent between the mapper input end 2404 and output end 2403. The mapper face 2403 may be imaged by a large FOV objective 204a, dispersed by the SSU 205, and imaged by the re-imaging lens 204b onto an Image Sensor 206, such as a CCD detector. This configuration may utilize a less complicated Selective Imager 204 than the refractive and reflection components, however, it may have lower optical throughput due to the cladding 2404 around each waveguide structure.

Another embodiment of an IMS system includes two or more IMFU 203 elements that are imaged onto each other. In other words, they are image conjugates of each other. This multiple IMFU conjugate configuration is shown in FIG. 25. In this design, the optical sample 200 may be imaged on the first IMFU 2501 through the optional relay lenses 202. This relay system 202 is optional, as the optical sample 200 may be imaged directly onto the first IMFU 2501 with any fore optics. The first IMFU 2501 may be imaged onto the second IMFU 2502 by the IMFU relay lens 2503. There may be multiple IMFU relay lens 2503 and multiple IMFUs 203, either sequentially cascaded one after another or in parallel, forming and array of IMFUs 203 and relay lenses 202. The array approach may be beneficial for keeping the system compact. For FIG. 25, only two IMFUs 203 are shown for simplicity, not limitation of the design concept. After the last IMFU 203 (the second IMFU 2502 in FIG. 25) and Selective Imager 204, the SSU 205 and Image Sensor 206 function in a similar way as the prior concepts for example FIG. 18. The IMFUs 203 in this design may be either static or dynamic or a combination. This type of IMS system may be advantageous in dynamic systems (FIG. 23), allowing for the first component to select one or more ROIs 2301 from the optical sample 200, and direct these ROIs 2301 to the second IMFU 2501 for higher sampling and mapping to one or more Image Sensor 206 detectors. This approach also may be capable of simplifying the design of each IMFU 203 with each conjugate IMFU 203 responsible for only one aspect of the final mapping. For instance, the first IMFU 2501 may be responsible for tilts in the x-axis, while the second IMFU 2502 may be responsible for tilts in the y-axis. This implies that each IMFU 203 for this embodiment does not have to have the same geometry or function as the other IMFUs 203, and each IMFU 203 may act independently or dependently.

As mentioned earlier, the IMS may be adapted for many various applications. For example, the IMS may be particularly well suited for endoscopy. An endoscope version of the IMS concept is illustrated in FIG. 26. Discussion of the IMS system operation begins at the tissue (distal) side of the coherent multi-fiber bundle ("MFB") 2601, where a broadband source may illuminates an area of the tissue (either macroscopic or microscopic in size) which becomes our optical sample 200. Other endoscopic imaging components also may be used in substitution or addition to the MFB presented in FIG. 26. These endoscopic imaging components may include: incoherent fiber bundle, miniature objective 2602, miniature lenses and grin lenses. Reflected and/or fluorescent light from the tissue may be collected and imaged through a miniature objective 2602 onto the MFB 2601 distal tip and then transferred to the proximal end. The image relay system 202 may magnify and re-image the tissue image from the MFB 2602 proximal face onto the IMFU 203. For this illustration, the IMFU 203 may be composed of an array of mirror facets with dimensions that correspond to 1×200 mapping pixels at the image plane. Note that the IMFU 203 also may be composed of an array of prisms, lenses, and/or a combination of components. Each mirror facet may deviate a portion of the tissue image (optical sample 200) to a particular region in the pupil of the Selective Imager 204 (shown by different ray colors). The light may be spectrally separated (i.e. dispersed) in the pupil by a SSU 205 (i.e. prism array) into a range of angles in a plane different in direction then the mapping plane. A re-imaging lens 204b array may image each sub-region onto an Image Sensor 206. Each sub-image may contain spatial and spectral information for a set of mapping regions. Finally, through simple software remapping, the sub images may be recombined to form an "unmapped" image of the optical sample (tissue) while preserving the spectral signature for each mapping region. Since there is no scanning or image processing, the system may acquire and display hyperspectral images in real time which is important for endoscopy applications.

Ophthalmologists have long relied on optical devices for evaluation of various eye conditions and diseases. Of particular importance is imaging the retina of the eye 2701, which is located at the back inner surface of the eye and contains the light sensitive photoreceptors for converting the optical signals to signals that can be processed by the brain. Retinal observation and image capture requires the use of a complex optical device, called a Fundus camera 2702, which is capable of illuminating and imaging the retina simultaneously. There are two main types of Fundus camera designs that vary based on the illumination system, either external or internal illumination. The incident illumination provided by either type is scattered by the retina and then captured by the imager portion of the Fundus camera where it can be viewed by the ophthalmologist directly and/or captured by an image sensing device. Ophthalmologists are increasingly using digital detectors such as CCD or CMOS cameras to record a picture of the retina. These digital pictures can be used to identify certain illnesses as well as track their development over the lifetime of the patient. In this context, an IMS system may become an important imaging tool for ophthalmology, where it can obtain a 3D (x, y, λ) image of the retina 2703 with additional diagnostic information contained in the spectrum from each mapping pixel within the image. FIG. 27 shows an example of an IMS system that is incorporated into a Fundus camera. The IMS system is positioned at the sideport or camera port of the Fundus camera where an image of the retina 2703 is located. The IMS system also may be used as a standalone system for imaging the eye. For a standalone IMS system, the illumination may be integrated into the IMS system, either external or internal to the system in a similar fashion to that commonly used in Fundus cameras. The main advantage of an IMS system for ophthalmic applications is that the IMS system may collect its 3D datacube in a true parallel fashion for quick real-time imaging. This may be important for mitigating any temporal ambiguities due to involuntary eye movements. The parallel acquisition may also decrease the intensity of illumination, since the collected signal from every image point is integrated at the same time, making it is less irritating for the patient's eye. The simple software image remapping needed for the IMS system may also allow for real-time feedback for the ophthalmologist, helping to direct the examination and provide better quality diagnostic information.

To facilitate a better understanding of the present invention, the following examples of specific embodiments are given. In no way should the following examples be read to limit or define the entire scope of the invention.

EXAMPLES

A working bench top prototype IMS and prototype of a mapping element (or mapper, Image Mapping Field Unit, or "IMFU") were assembled, configured as a reflective Image Mapping Spectrometer ("IMS") with beam splitter. A schematic of the prototype system and a picture of the actual setup are presented in FIG. 28.

The optical sample for this IMS configuration came from an inverted microscope, namely, an Axio Observer A1 or AX10, commercially available from Carl Zeiss, Inc. For demonstration purposes, the Selective Imager lens array was replaced with a single lens (low magnification microscope objective) and was moved to different pupil locations to image the corresponding tilt angle field of views ("FOVs"). The IMFU 203 prototype was fabricated using raster fly cutting in high purity aluminum. The mapping element had 5 tilt angles in one direction only (175 ramp mirrors total). To fabricate the IMFU 203, a Nanotech 250 UPL Diamond Turning Lathe was used. The cutting process was lengthy for the first optical component, as it took about 120 hours. Once the desired mapping element has been made, it may be mass produced either by replication or molding processes (e.g., injection molding, stamp molding, etc.) to make it more affordable.

FIG. 29(*a*) shows the first prototype IMFU 203. The individual optical component facets have further been characterized to verify angles and surface quality using a white light interferometer, a NewView 5000, commercially available from Zygo Corporation, as shown in FIG. 29(*c*). Baffles may be added in front and to the sides of the mapping element to reduce scattered light from the transitions mapping optical components. Lens arrays may also be added to the mapper to help reduce scattered light by focusing it away from the edges of the mapper's optical component and more to the center of the surface of mapping optical components. Lens arrays also may reduce the effects of neighboring IMFU 203 optical component shadowing. This is especially important at the edges of the optical components, where the height differences may be the largest. Although the prototype IMFU 203 was made using diamond fly cutting technology, it also may be produced using other technologies, like diamond milling and grayscale lithography, depending on the desired geometry. Grayscale lithography is an alternative technology for mass producing this element, but it may require significant process development time and cost in the initial development stage.

FIG. 30 shows initial imaging experiments performed with the system prototype. FIG. 30(*a*) shows an image of a 1951 USAF resolution test target for the central FOV. Only one mapping direction is demonstrated in the figure and no dispersion was introduced in this case. FIG. 30(*b*) shows an image of the Selective Imager pupil 209 when the IMS is imaging the output from a single mode (λ~630 nm) fiber laser (object) onto at least five mapping lines of the image mapper 203. In this example, each mapping line of the IMFU 203 is generally a miniature ramp mirror that may be able to reflect a single (possibly discontinuous) line of the incident image into a unique direction. The five bright regions correspond to light from the object reflected from the different line optical components and their corresponding angles. Diffraction and stray light effects caused by the linear IMFU 203 geometry and surface roughness account for the light intensity outside of these central regions. When the re-imaging lens 204b is moved from one pupil position to the next, the resulting image is similar to the one shown in FIG. 30(a) but for a different set of linear mappings.

FIG. 30(c) presents an image taken with the prototype system (minus the IMFU 203 and the SSU 205) of a fiber optic illuminated with a halogen light source. This polychromatic image is composed of a broad spectral band and represents a typical image one would obtain from a standard imaging system. This image typically would appear as a white circle, and all of the spectral information would be lost. In this image, there are some blue and red outer bands in the image due to lateral chromatic aberrations which may be corrected in the final system. When the prototype system is reconfigured to include IMFU 203 and the SSU 205, the full spectral signature of this polychromatic image may be obtained. This is illustrated in FIG. 30(d) for a set of ramp mirrors with identical tilt angles. As one can see with the spectral data for the image, mapping lines may be dispersed into the void regions between the neighboring mirrors—mapping components (repeated red to green regions). To reconstruct the final image, the re-imaging lens 204b may be translated to the other pupil positions to capture images of the other mapping lines, and simple image processing may be done to reconstruct the original image with its spectral signature.

A second working prototype IMS was constructed to demonstrate its ability to obtain fluorescence microscope images. The IMS could obtain a 3D (x, y, λ) datacube of 100×100×25 sampling, which corresponds to about 0.45 microns and about 5.6 nm resolution in spatial and spectral domains respectively. The IMS system was coupled to an AX10 inverted microscope, commercially available from Carl Zeiss, Inc., as the fore optics. A photograph of the prototype system is shown in FIG. 31(a), and the schematic layout is presented in FIG. 31(b). Specimens were placed on the microscope stage and illuminated by a 120 W X-cite® arc lamp, commercially available from EXFO Life Sciences & Industrial Division. The fluorescent signal was collected by an EC Plan-Neofluar, commercially available from Carl Zeiss, Inc., 40×/N.A. ~0.75 objective. The intermediate image was formed outside of the microscope side image port 3102, co-located at the field stop 1503 of the IMS system. The intermediate image at the field stop was first re-imaged by an about 10× magnification image relay system 202 (telecentric both in object and image space) onto a custom-fabricated image IMFU 203. One role of this image relay system 203 is to preserve the image resolution by matching the size of image PSF with that of IMFU 203. The other is to provide strict telecentricity at the side of IMFU 203, which provides correct guidance of chief rays. The IMFU 203 was a one-dimensional mirror array that had 25 different two-dimensional tilt angles (0°, ±0.23°, ±0.46° with respect to both x and y-axes), and which could reflect zones of mapped image into 25 different directions. The total number of mapping optical components on the IMFU 203 was 100, and each one had dimensions of about 16 mm×about 160 μm in length and width respectively. In FIG. 31(b), only tilt angles with respect to the y-axis are shown. The redirected light was gathered by the collecting lens 204a (about 130 mm Tube lens, commercially available from Carl Zeiss, Inc., N.A. ~0.033, FOV ~25 mm), and formed 25 separate pupils at the pupil plane 901. An about 5.56× beam expander 3101, commercially available from Edmund Optics (Gold Series Telecentric Lenses 58258, FOV ~8 mm), adjusted the pupil dimensions to match those of the re-imaging lens array optics 204b. The magnified pupils were dispersed by a custom prism, SF4, about 10° wedge angle, commercially made by Tower Optics, and re-imaged onto a large format CCD camera 206 (Apogee U16M, 4096× 4096 pixels, about 9 microns pixel size, RMS noise: 10.5 e-, Dark current: 0.13 e-/pixels) by a 5×5 array of reimaging systems 204b. Each re-imaging lens 204b was composed of an about 60 mm F.L. positive achromatic doublet (Edmund Optics 47698, dia ~6.25 mm) and an about 12.5 mm F.L. negative achromatic doublet (Edmund Optics 45420, dia ~6.25 mm) to form a long focal length lens (F.L. ~350 mm) Note that the IMS prototype presented here does not use the full CCD resolution. However, this large Image Sensor 206 may allow improved resolution of the system resolution in future system development.

The format of the final image may be very important for maximizing the mapping of the 3D (x, y, λ) datacube onto the recording 2D Image Sensor 206. In many cases, it is advantageous for each detector, or pixel, on the Image Sensor 206 to record a signal from the optical sample 200. For unambiguous data collection, each voxel in the datacube may correspond to about one pixel on the Image Sensor 206. Unambiguous mapping that efficiently utilizes all of, or a large number of, the available detectors in the Image Sensor 206 may require the sub-images from the IMFU 203 to be in close proximity to each other. Note that in the majority of configurations, the Image Sensor 206 may have more than one sub-image of the IMFU 203. To correct for fabrication errors, optical aberrations, stray light, other unaccounted for fabrication errors, and optical effects, the IMFU 203 geometry may provide for some distance between adjacent sub-images. Ideally, this unused Image Sensor 206 surface area should be no greater than about 40% of the total detecting surface area. On the other hand, it may also be beneficial for the sub-images to overlap to include both ambiguous and unambiguous data, which may improve the available spectral and spatial content of the system. This overlap may be as small as a few detectors on the Image Sensor 206, and may range up to every detector on the Image Sensor 206. As previously mentioned, the disadvantage of too much sub-image overlap is that software reconstruction algorithms may become quite time consuming, eliminating the ability of the IMS to display data in real-time. It also may be advantageous for the sub-images of the final mapped image to be arranged to match industry standard camera formats and aspect ratios like those listed in Table 1, although custom formats also may be used.

TABLE 1

Image sensor formats

| Imager Format | Aspect Ratio | Width (mm) | Height (mm) | Diagonal (mm) |
|---|---|---|---|---|
| ¼ in. | 4:3 | 3.2 | 2.4 | 4 |
| ⅓ in. | 4:3 | 4.8 | 3.6 | 6 |
| ½ in. | 4:3 | 6.4 | 4.8 | 8 |
| ⅔ in. | 4:3 | 8.8 | 6.6 | 11 |
| 1 in. | 4:3 | 12.8 | 9.6 | 16 |
| 4/3 in. | 4:3 | 17.8 | 13.4 | 22.3 |
| APS | 3:2 | 25.1 | 16.7 | 30.1 |

TABLE 1-continued

Image sensor formats

| Imager Format | Aspect Ratio | Width (mm) | Height (mm) | Diagonal (mm) |
|---|---|---|---|---|
| 35 mm | 3:2 | 36.0 | 24.0 | 43.3 |
| 48 × 36 mm | 4:3 | 48.0 | 36.0 | 60.0 |
| 645 | 4:3 | 56.0 | 41.5 | 69.7 |
| 10.5/16.8 MP | 1:1 | 36.8 | 36.8 | 52.1 |
| 4.3 MP | 1:1 | 50.02 | 50.02 | 70.7 |

The listed dimensions in Table 1 are approximate, as each Image Sensor 206 manufacturer varies slightly. Some of the most common aspect ratios may be 1:1, 3:2, and 4:3

The FOV of the reimaging lens set 3201 in this prototype IMS was designed to be overlapped 3202 with adjacent lens sets to maximize the usable area of the CCD camera. As the whole IMFU 203 plate's image had a square shape, while the FOV of the reimaging lens 3201 set was circular, four void regions outside the IMFU 203 plate's image but inside the FOV 3201 existed (see FIG. 32). Because of these void regions, the FOV of neighboring reimaging lens sets 3201 were allowed to overlap. This allowed a fully utilized imaging area on the CCD camera. The CCD camera used a 10.5/16.8 MP format chip comprising 16 megapixels within a square (36.8×36.8 mm) surface area.

To verify the image performance and test the spatial and spectral resolution of the IMS prototype, an undispersed 1951 USAF resolution test target was imaged, and the point spread function ("PSF") of a single image mapping line (from single mirror mapping component) was measured. Spectra images of test samples made with fluorescent beads were obtained. The results are shown in FIGS. 33-36.

A third prototype IMS was constructed to demonstrate a large format configuration capable of collecting a 3D (x, y, λ) datacube of 285×285×62 for fluorescence specimens. The layout of the IMS configuration is similar to the 2$^{nd}$ prototype and is shown in FIG. 37. This IMS configuration represents major technology advancements in a large format IMFU. The IMFU 203 had densely packed mirror facet optical components that are only about 70 microns wide, enabling 285 facets to reside within the FOV of the relay optics. Due to the small size of the facets, diffraction effects had to be considered in the design, and additional tilt angles were applied to minimize crosstalk between sub-imaging systems. Lastly, the IMFU 203 geometry was optimized to reduce edge eating effects and improve system throughput.

The biological imaging capability of the third prototype was evaluated by imaging bovine pulmonary artery endothelial cells incubated with MitoTracker Red CMXRos to label the mitochondria, BODIPY FL phallacidin to label the filamentous actin (F-actin), and DAPI to label the nucleus. A reference image taken with a color CCD 3702 camera is shown at the top left corner of FIG. 38 for comparison purposes. The lower sequence of images was taken with an IMS system in a single, about 4 sec integration event. A sample of 25 spectral images are display over an about 505 to about 684 nm spectral range, with an average sampling of about 5 nm. Spectrally encoded features within the cell are easily identifiable and show a strong correlation with the reference image.

To manufacture IMFUs 203 with a variety of geometries, three different surface shaped tool designs have been developed. Table 2 lists the different design specifications for each surface shaped tool. Tool #1 was the first surface shaped tool used to fabricate the 100 component IMFU 203 used in the IMS fluorescence hyperspectral microscope shown in FIG. 31. This surface shaped tool has an about 160 micron wide flat bottom tip and was used to create a square shaped IMFU 203 with a side length of about 16 mm Tool #2, an about 75 micron flat bottom surface shaped tool, was developed for the larger format IMS system, shown in FIG. 37, which still resides within the FOV constraint of the collecting objective. This surface shaped tool increases the spatial sampling to a 250 component IMFU. Tool #3 is also about 75 microns wide, but it has a reduced included angle to minimize the effects of edge eating.

TABLE 2

Surface Shaped Flat Bottom Tool Design Parameters

| Parameter | Tool #1 | Tool #2 | Tool #3 |
|---|---|---|---|
| Included Angle, θ, (deg) | 20 ± 0.5 | 20 ± 0.5 | 5 ± 0.5 |
| Side clearance angle, α (deg) | 3 | 3 | 3 |
| Tip clearance angle, φ (deg) | 6 | 5 | 5 |
| Top rake angle, β (deg) | 0 | 0 | 0 |
| Tool Tip Width, (μm) | 150 ± 15 | 70 ± 7 | 70 ± 7 |
| Max. Depth of Cut, (μm) | 500 | 300 | 300 |
| Edge quality | 750 X | 750 X | 750 X |
| Material (Diamond) | Synthetic | Synthetic | Synthetic |

For fabrication of the IMFUs 203, a high precision CNC 4-axis diamond lathe (Nanotech 250UPL) was used. This machine has about 200 mm of travel for each axis (x, y, z) with nanometer level precision. The workpiece 402 was mounted on two stages, with y 3901 and z axis 3902 movement, while the spindle 401 and diamond tool were mounted on the x axis stage 3903 see FIG. 39(a). The mirror optical component facets were cut by moving the workpiece 402 up and down in the y axis. Tilts in the y direction were achieved by moving in both the x and y directions while cutting each mapping line optical component. After cutting a mapping line optical component, the spindle 401 and tool moves away from the workpiece 402, rewinds, and begins cutting the next mapping line optical component. The workpiece 402 also steps over in the z axis by the tool width prior to cutting the next mapping line optical component. The x-tilts were obtained by mounting the workpiece 402 to a goniometer (Newport P/N: GON40-U with manual high resolution micrometer P/N: HR-13) with its cutting surface coincident with the goniometers axis of rotation 3904 (see FIG. 39(b)). Due to the manual rotation of the goniometer, x-tilts were fabricated at the same time. When finished, the goniometer is adjusted to the next x-tilt, and the process is repeated until all mirror optical component facets are fabricated. Y height compensation factors were applied for the different x-tilts. For large x-tilt angles, z-axis compensation factors also may be used to compensate for the cosine effect.

To manufacture an IMFU optical component, in general, a rough cut is performed initially to get the different mirror facets into the aluminum substrate. The substrate also may be made out of any other diamond machinable material, such as those listed in Table 3. After this step, a fine cutting program is used to clean up the IMFU 203 optical component, producing the best surface roughness and removing cosmetic imperfections, such as metal flaps, chips, and other debris.

TABLE 3

Possible IMFU substrate Materials

| Metals | Polymers | IR crystals |
|---|---|---|
| Aluminum | Acetyl | Cadmium Sulfide |
| Alloys | Acrylic | Cesium Iodide |
| Brass | Fluoroplastic | Indium Antimonite |
| Copper | Nylon | Magnesium Fluoride |
| Gold | Polycarbonate | Phosphate (KDP) |
| Nickel | Polypropylene | Tellurium Dioxide |
| Silver | Polysulfone | Cadmium Telluride |

TABLE 3-continued

Possible IMFU substrate Materials

| Metals | Polymers | IR crystals |
|---|---|---|
| Tin | Silicone | Gallium Arsenide |
| Zinc | Olefin | Iridium |
| | Zeonex (polyolefin) | Potassium Bromide |
| | | Silicon |
| | | Zinc Selenide |
| | | Calcium Fluoride |
| | | Germanium |
| | | Lithium Niobate |
| | | Potassium Dehydrogenate |
| | | Sodium Chloride |
| | | Zinc Sulfide |

FIG. 40(a) shows a picture of the final large format (250 component) IMFU 203 fabricated using tool #3. FIG. 40(b) shows a close up side view of the IMFU 203, showing the excellent alignment of the facets. The x-tilt grouping and concave orientation are easily observed as well as the staggered y-tilts.

The mirror optical component facet tilts and widths were measured using a white light interferometer (Zygo NewView). Before component testing, the IMFU 203 was placed on the interferometer's motorized 4-axis stage (X, Y, $\theta_x$, $\theta_y$) and adjusted to align the reflected light from the zero tilt (x- and y-axis) mirror facet of the IMFU 203 with the optical axis of the system. Any residual tilt was recorded and subtracted from the other facet tilt measurements. A 10× Mirau Objective with a 1.0× field lens (FOV=0.72 mm×0.54 mm, Res.=1.12 microns) was used to collect the data. Ten measurements were taken for each tilt position and averaged together. Table 4 shows the final results, comparing the measured values to the designed tilt values. The results from this study demonstrate an excellent agreement between the desired tilt values and those actually measured. The largest tilt error was −2 mrad for the x-tilt ($\alpha_2$=0.010 rad.), with most of the tilts having no significant error.

TABLE 4

Comparison of IMFU tilt designed and measured values

| x-tilt ($\alpha$'s) | v-tilt ($\beta$'s) | Ideal (rad.) | Measured ($\alpha$'s) | ($\beta$'s) | Error ($\alpha$'s) | ($\beta$'s) |
|---|---|---|---|---|---|---|
| $\alpha$1 | $\beta$1 | +0.020 | +0.020 | +0.020 | 0 | 0 |
| $\alpha$2 | $\beta$2 | +0.010 | +0.098 | +0.010 | −0.002 | 0 |
| $\alpha$3 | $\beta$3 | 0 | — | — | — | — |
| $\alpha$4 | $\beta$4 | −0.010 | −0.010 | −0.010 | 0 | 0 |
| $\alpha$5 | $\beta$5 | −0.020 | −0.021 | −0.020 | +0.001 | 0 |

The width of each optical component facet was measured by taking a cross section profile across its surface at the left, center, and right edge of the facet. FIG. 42 shows typical results obtained from these measurements. During the fabrication process, an approximate 5 micron overlap was introduced to remove a thin metal flap between adjacent facets. This overlap changes the designed width of the facets from about 75 microns to between about 70-65 microns, depending on facet position. For the center x-tilts (2-4) the measured widths were within about +/−1 micron of the 70 microns; however, for the edge positioned x-tilts (1 & 5) this changes to about 50-70 microns, depending on the y-tilt. The highest mapping line optical component due to the y-tilt will be the thinner due to this overlap as well as some edge eating, as shown in the 2D intensity maps in FIG. 41.

The roughness of the mirror optical component facet surfaces reduces the final image contrast and throughput of the IMFU 203. To quantify this effect, a white light interferometer with a 50× Mirau Objective, 2.0× field lens (FOV=0.07 mm×0.05 mm, Res.=0.11 microns) was used. FIG. 42 shows a typical roughness result obtained from a single facet. For this fabrication method, the tool imperfections create lines along the length of the facets. To gain a more statistical estimate of the IMFU's 203 surface roughness, ten randomly selected facet surface regions were measured and found to have an average rms roughness of 5.3+/−1.2 nm. The optical throughput of the IMFU 203 was estimated to be approximately 97% based on this roughness value.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

What is claimed is:

1. A system, comprising:
an image mapping field unit configured to receive an image and output a plurality of image mapping shapes, wherein the image mapping field unit comprises:
a first optical component configured to redirect a first image mapping shape along a first angle to generate a redirected first image mapping shape;
a second optical component configured to redirect a second image mapping shape along the first angle to generate a redirected second image mapping shape, and
a third optical component configured to redirect a third image mapping shape along a second angle to generate a redirected third image mapping shape,
wherein the first image mapping shape and the second image mapping shape are part of a sub-image of the image,
wherein the sub-image is two-dimensional.

2. The system of claim 1, wherein the system is configured to optically transform at least one selected from a group consisting of the redirected first image mapping shape, the redirected second image mapping shape, and the redirected third image mapping shape.

3. The system of claim 2, wherein optically transforming the at least one selected from the group consisting of the redirected first image mapping shape, the redirected second image mapping shape, and the redirected third image mapping shape comprises:
receiving at least one image mapping shape, wherein the received image mapping shape is one selected from the group consisting of the redirected first image mapping shape, the redirected second image mapping shape, and the redirected third image mapping shape;
spectrally separating the at least one image mapping shape to generate at least one spectrally separated image mapping shape; and
outputting the at least one spectrally separated image mapping shape.

4. The system of claim 3, further comprising:
a selective imager, wherein the selective imager is configured to re-image the at least one spectrally separated image mapping shape onto at least one location on a detector.

5. The system of claim 4, wherein the selective imager comprises a plurality of selective imager optical components and wherein at least one of the plurality of selective imager optical components is dynamic.

6. The system of claim 5, wherein at least one of the plurality of selective imager optical components is configured to receive at least the first and the second image mapping shapes that are each redirected along the first angle.

7. The system of claim 4, wherein the detector comprises a two-dimensional (2D) array of electromagnetic radiation detectors.

8. The system of claim 4, wherein the detector is configured to output the at least one spectrally separated image mapping shape to a digital signal processing unit.

9. The system, of claim 8, wherein the digital signal processing unit is configured to remap the at least one spectrally separated image mapping shape to obtain an optical image and a spatially resolved spectrum.

10. The system of claim 9, wherein the digital signal processing unit is further configured to output the optical image and the spatially resolved spectrum to a display.

11. The system of claim 1, wherein the first optical component is one selected from a group consisting of a refractive component, a reflective component, and a waveguide.

12. The system of claim 1, wherein the first optical component is dynamic.

13. The system of claim 1, wherein the image mapping field unit simultaneously redirects the first image mapping shape, the second image mapping shape, and the third image mapping shape.

14. The system of claim 13, wherein the image mapping field unit simultaneously obtains the first image mapping shape, the second image mapping shape, and the third image mapping shape.

15. The system of claim 1, wherein the image mapping field unit comprises a plurality of mirror facets, wherein the first optical component is a first one of the plurality of mirror facets, the second optical component is a second one of the plurality of mirror facets, and the third optical component is a third one of the plurality of mirror facets.

16. The system of claim 1, wherein the image mapping field unit comprises a plurality of prisms, wherein the first optical component is a first one of the plurality of prisms, the second optical component is a second one of the plurality of prisms, and the third optical component is a third one of the plurality of prisms.

17. The system of claim 1, wherein each of the first optical component, the second optical component and the third optical component has at least one spatial dimension no larger than an incident diffraction limited spot size of the system.

18. A method for sampling an image, comprising:
receiving a first image mapping shape, a second image mapping shape, and a third image mapping shape of the image, wherein the first image mapping shape and the second image mapping shape are part of a sub-image of the image, and wherein the sub-image is two-dimensional;
redirecting the first image mapping shape along a first angle to generate a redirected first image mapping shape;
redirecting a second image mapping shape along the first angle to generate a redirected second image mapping shape;
redirecting a third image mapping shape along a second angle to generate a redirected third image mapping shape;
optically transforming at least one selected from a group consisting of the redirected first image mapping shape, the redirected second image mapping shape, and the redirected third image mapping shape to obtain at least one spectrally separated image mapping shape; and
re-imaging the at least one spectrally separated image mapping shape onto a first location on a detector.

19. The method of claim 18, further comprising:
remapping the at least one spectrally separated image mapping shape to obtain an optical image and a spatially resolved spectrum.

20. The method of claim 19, further comprising:
outputting the optical image and the spatially resolved spectrum to a display.

* * * * *